US005480627A

United States Patent [19]

Takei et al.

[11] Patent Number: 5,480,627

[45] Date of Patent: Jan. 2, 1996

[54] METHOD FOR TREATING SUBSTRATE FOR ELECTROPHOTOGRAPHIC PHOTOSENSITIVE MEMBER AND METHOD FOR MAKING ELECTROPHOTOGRAPHIC PHOTOSENSITIVE MEMBER

[75] Inventors: Tetsuya Takei; Hirokazu Ohtoshi, both of Nagahama; Ryuji Okamura; Hiroyuki Katagiri, both of Shiga; Yasuyoshi Takai, Nagahama, all of Japan

[73] Assignee: Canon Kabushiki Kaisha, Tokyo, Japan

[21] Appl. No.: 200,651

[22] Filed: Feb. 23, 1994

Related U.S. Application Data

[62] Division of Ser. No. 841,989, Feb. 26, 1992, Pat. No. 5,314,780.

[30] Foreign Application Priority Data

| | | | |
|---|---|---|---|
| Feb. 28, 1991 | [JP] | Japan | 3-55598 |
| May 30, 1991 | [JP] | Japan | 3-153720 |
| May 30, 1991 | [JP] | Japan | 3-153748 |
| May 30, 1991 | [JP] | Japan | 3-153753 |
| Jul. 3, 1991 | [JP] | Japan | 3-188300 |

[51] Int. Cl.$^6$ ............ G03G 5/10; B23B 51/06

[52] U.S. Cl. ............ 430/127; 430/128; 82/1.11; 29/DIG. 95; 408/56

[58] Field of Search ............ 430/127, 128; 82/1.11; 29/DIG. 95; 408/56

[56] References Cited

U.S. PATENT DOCUMENTS

| | | | |
|---|---|---|---|
| 5,080,993 | 1/1992 | Maruta et al. | 430/128 |
| 5,170,683 | 12/1992 | Kawada et al. | 82/1.11 |

FOREIGN PATENT DOCUMENTS

| | | | |
|---|---|---|---|
| 54-86341 | 7/1979 | Japan . | |
| 54-145540 | 11/1979 | Japan . | |
| 57-119357 | 7/1982 | Japan . | |
| 58-14841 | 1/1983 | Japan . | |
| 59-193463 | 11/1984 | Japan . | |
| 60-168156 | 8/1985 | Japan . | |
| 60-186849 | 9/1985 | Japan . | |
| 60-178457 | 9/1985 | Japan . | |
| 60-225854 | 11/1985 | Japan . | |
| 61-171798 | 8/1986 | Japan . | |
| 61-231561 | 10/1986 | Japan . | |
| 61-283116 | 12/1986 | Japan . | |
| 61-273551 | 12/1986 | Japan . | |
| 63-264764 | 11/1988 | Japan . | |
| 307463 | 12/1988 | Japan | 430/127 |
| 1-130159 | 5/1989 | Japan . | |
| 826264 | 4/1981 | U.S.S.R. | 430/127 |

OTHER PUBLICATIONS

Patent Abstracts of Japan, vol. 7, No. 82 (P–189), Apr. 6, 1983.

Patent Abstracts of Japan, vol. 13, No. 375 (P–921) [3723], Aug. 21, 1989.

Patent Abstracts of Japan, vol. 14, No. 521 (P–1131), Nov. 15, 1990.

*Primary Examiner*—Roland Martin

*Attorney, Agent, or Firm*—Fitzpatrick, Cella, Harper & Scinto

[57] ABSTRACT

A method of treating a substrate for an electrophotographic photosensitive member by a process comprises the steps;

a) cutting the surface of the substrate to remove the surface in the desired thickness; and b) bringing the cut surface of the substrate into contact with water having a temperature of from 5° C. to 90° C., having a resistivity of not less than 11 MΩ·cm at 25° C., containing fine particles with a particle diameter of not smaller than 0.2 μm in a quantity of not more than 10,000 particles per milliliter, containing microorganisms in a total viable cell count of not more than 100 per milliliter and containing an organic matter in a quantity of not more than 10 mg per liter, for at least 10 seconds at a pressure of from 1 kg·f/cm$^2$ to 300 kg·f/cm$^2$.

20 Claims, 24 Drawing Sheets

METHOD FOR TREATING SUBSTRATE FOR ELECTROPHOTOGRAPHIC PHOTOSENSITIVE MEMBER AND METHOD FOR MAKING ELECTROPHOTOGRAPHIC PHOTOSENSITIVE MEMBER

This application is a division of application Ser. No. 07/841,989 filed Feb. 26, 1992, now U.S. Pat. No. 5,314, 780.

BACKGROUND OF THE INVENTION

1. Field of the Invention

The present invention relates to a method for treating a support or substrate for an electrophotographic photosensitive member comprising a substrate having thereon a non-monocrystalline film containing at least a silicon atom and a hydrogen atom. The present invention also relates to a method for manufacturing an electrophotographic photosensitive member, making use of the method for treatment of such a support or substrate. More particularly, the present invention is concerned with a method for treating a substrate for an electrophotographic photosensitive member comprising a metallic substrate having thereon a non-monocrystalline deposited film containing a silicon atom and a hydrogen atom, formed by plasma CVD, end is also concerned with a method for manufacturing an electrophotographic photosensitive member, making use of the method for treating such a substrate.

RELATED BACKGROUND ART

As photosensitive materials used in electrophotographic photosensitive members, non-monocrystalline deposited films have been proposed, as exemplified by amorphous deposited films comprising an amorphous silicon or the like compensated with hydrogen and/or a halogen such as fluorine or chlorine, some of which have been put into practical use.

As processes for forming such deposited films, a number of processes are conventionally known, as exemplified by sputtering, thermal CVD (a process in which a starting material gas is decomposed by heat), optical CVD (a process in which a starting material gas is decomposed by light), and plasma CVD (a process in which a starting material gas is decomposed by plasma). In particular, plasma CVD, i.e., a process in which a starting material gas is decomposed by direct current, high-frequency or microwave glow discharge to form a thin-film member deposited film on a substrate is most suited for the process for forming an amorphous-silicon deposited film used in electrophotography. This process has been put into practical use or is being more and more improved.

For example, Japanese Patent Application Laid-open No. 54-86341 discloses an example of such an amorphous silicon photosensitive member.

This amorphous silicon photosensitive member can be free from environmental pollution, and is characteristic of a high image quality and a high durability. Amorphous silicon photosensitive members presently put into practical use well have such characteristic features. However, in order for the amorphous silicon photosensitive members to become more and more widespread, it is sought to reduce cost, to improve electrical characteristics, and also to enhance durability.

In recent years, global environmental pollution has also been questioned, and now improvements must be urgently made on not only elimination of what may result in environmental pollution but also in the manner of handling something harmful at the stage of manufacture. Although the amorphous silicon photosensitive members are free from any environmental pollution in themselves, review has become necessary from such a viewpoint on the various matters including the cleaning of cylinders which are substrates of photosensitive members and even the packaging of products after the manufacture.

Incidentally, glass, quartz, silicon wafer, heat-resistant synthetic resin film, stainless steel, aluminum, etc. have been proposed as materials for the substrate on which the non-monocrystalline film comprising an amorphous silicon film or the like is formed. Of these materials, as materials for the substrate on which the amorphous silicon photosensitive material is deposited, metals are used in many instances so that the substrate can endure the electrophotographic process comprising charging, exposure, development, transfer and cleaning and also because positional precision can be maintained at a high level so as to prevent lowering of image quality. As such metals, aluminum alloys are widely used and have, in particular, a superior workability, dimensional stability, etc.

For example, Japanese Patent Application Laid-open No. 59-193463 describing a technique relating to the materials for substrates of electrophotographic photosensitive members making use of amorphous silicon, discloses a Technique in which the substrate comprises an aluminum alloy with an Fe content of not more than 2,000 ppm and by which an electrophotographic photosensitive member that can give a good image quality can be obtained.

This publication discloses a procedure comprising cutting a cylindrical (or cylinder-like) substrate by means of a lathe, and mirror-finishing the surface, followed by glow discharging to form an amorphous silicon film. In general, when the substrate is worked in this way, it is lathed using an oily substance such as cutting oil. Hence, a residue of the oily substance always remains on the substrate having been worked, and also cutting scrap produced during working, dust in the air, etc. adhere to the substrate. If these residues remain thereon because of insufficient cleaning, a fault-free, uniform deposited film can not be formed, and satisfactory electrical characteristics can not be obtained. These residues cause a defective image particularly when the substrate is used for a long period of time. Such problems are known to occur. Accordingly, the substrate must be well cleaned with a great care when electrophotographic photosensitive members are manufactured.

Under such circumstances, for example, Japanese Patent Application Laid-open No. 61-171798 discloses a technique relating to a method of working substrates for electrophotographic photosensitive members. This publication discloses a technique in which a substrate is cut using a cutting oil composed of specific components to give an electrophotographic photosensitive member comprising amorphous silicon of a good quality. This publication also discloses that the substrate is cleaned with triethane (herein referred to as trichloroethane: $C_2H_3Cl_3$) after cutting. The photosensitive members manufactured using the substrate cleaned by such a method can achieve a certain degree of performance, without causing any particular problems on performance, and are now in wide use.

Besides the cleaning method described above, the following method is employed as a cleaning method by which the oily substance and other deposits are removed after cutting of the substrate (mainly those made of aluminum alloy) for an electrophotographic photosensitive member.

(1) Ultrasonic cleaning using an organic solvent:

A substrate is subject to ultrasonic cleaning in a hot medium bath, rinsing in a cold medium bath, finish cleaning by vapor cleaning in a vapor bath, and drying. Optionally a hot medium bath may be further provided or a surfactant is added to the solvent.

The following are used as the solvent.

(i) Chlorine types: Trichloroethylene, perchloroethylene, methylene chloride, 1,1,1-trichloroethylene.

(ii) Fluorine types: Flon-113, Flon-112, other flon (chlorofluorohydrocarbon) mixed solvents.

(iii) Other types: Benzene, toluene, isopropyl alcohol, methanol, ethanol, acetone.

This method may achieve only a weak cleaning power, and in particular, may give insufficient cleaning power against the aforesaid deposits in the case of substrates having been left for a long time after cutting, and also has the problem that the organic solvents are harmful to human bodies and may adversely affect the work environment depending on how they are used.

(2) Chemical cleaning using acid or alkali:

(i) Acids: Sulfuric acid, hydrochloric acid, nitric acid, phosphoric acid, hydrofluoric acid, chromic acid (removal of scales, decomposition of oxides).

(ii) Alkalis: NaOH, $NaCO_3$, $NaHCO_3$, $Na_3PO_4$, $Na_2HPO_4$, $Na_4P_2O_7$ (sodium pyrophosphate) (decomposition of proteins, degreesing action)

(iii) Peroxides: Hydrogen peroxide, sodium perborate (oxide decomposition action).

In this method, there is a possibility of the substrate surface being corroded which causes a change of the surface state, sometimes resulting in a lowering of electrophotographic performance of photosensitive members. In particular, it may have a very bad influence upon a substrate with a mirror-finished surface. An attempt to avoid this problem tends to result in incomplete cleaning. The cleaning power also is susceptible to changes depending on the concentration of a cleaning solution and hence great care must be taken to the handling of the cleaning solution.

Nonetheless, in any or all the above cleaning methods, it is difficult to completely remove the aforesaid deposits adhered to the substrate, so that the deposits may often remain on the surface of the substrate. This deposits are presumed to cause a local change in electrophotographic performance to give the aforesaid defective image.

Such problems may occur not only in the substrates made of aluminum alloy but also any substrates made of nickel, iron or copper.

As stated above, the substrate must be so disposed that the surface stains due to the cutting oil are removed as far as possible so as not to have an adverse influence on the electrophotographic performances of photosensitive members and also not to bring about a decrease in yield in the manufacture of photosensitive members. The above cleaning methods, however, have been often unable to completely answer such requirements. Moreover, the organic solvents including halogenated hydrocarbon solvents have an undesirable influence not only on human bodies but also the global environment, and hence their use must be avoided as far as possible.

To solve these problems, in recent years, several proposals were made for a method of cleaning the substrate with water in place of the cleaning solution described above.

Techniques relating to the surface treatment of substrates for electrophotographic photosensitive members by the use of water are proposed in Japanese Patent Applications Laid-open No. 58-014841, No. 61-273551, No. 63-264764 and No. 1-130159.

Japanese Patent Applications Laid-open No. 58-014841 discloses a technique in which a natural oxide film on the surface of an aluminum substrate of a selenium photosensitive member is removed and thereafter the substrate is immersed in water kept at a temperature of 60° C. or higher to give a uniform oxide film.

Japanese Patent Application Laid-open No. 61-273551 discloses a technique in which the substrate is pretreated by alkali cleaning, trichloroethylene cleaning, or ultraviolet irradiation cleaning using a mercury lamp, when an electrophotographic photosensitive member is manufactured using an aluminum substrate provided thereon with selenium or the like, though admittedly different from amorphous silicon, by vacuum deposition. It also discloses that liquid degreasing and pure-water cleaning are carried out as a pretreatment of the ultraviolet irradiation cleaning to remove fats and oils having adhered to the surface of a cylindrical substrate.

Japanese Patent Application Laid-open No. 63-264764 discloses a technique in which the substrate surface is roughened by a water jet, a technique different from cleaning.

Japanese Patent Application Laid-open No. 1-130159 discloses a technique in which the support or substrate of an electrophotographic photosensitive member is cleaned with a water jet. This publication discloses examples of a photosensitive member, which includes those comprising a selenium, organic photoconductor and, at the same time, those comprising amorphous silicon, suggesting that this cleaning technique can be also applied to the amorphous silicon photosensitive member. This publication, however, actually does not refer at all to the problem that occurs when a substrate for the amorphous silicon photosensitive member is cleaned with the water jet, in particular, the problem peculiar to the case when the photosensitive member is formed by plasma CVD.

Meanwhile, there has been a steady progress in making higher quality amorphous silicon photosensitive members as a result of studies on layer configuration.

For example, Japanese Patent Application Laid-open No. 54-145540 discloses that superior electrophotographic performances, e.g., a high dark resistance and a good photosensitivity, can be attained when an amorphous silicon containing carbon in a concentration of from 0.1 to 30 atomic % as a chemical modifier is used in a photoconductive layer of an electrophotographic photosensitive member.

Japanese Patent Application Laid-open No. 57-119357 also discloses that en electrophotographic photosensitive member with superior performances can be obtained when carbon atoms are distributed in amorphous silicon film in a larger quantity on the side of the substrate.

These techniques are bringing about improvements in the performances of electrophotographic photosensitive members. Under existing circumstances, however, there is much room for further improvement.

In the first place, it is earnestly desired to decrease black-spot or white-spot faulty image, called dots. At present, to make image quality much higher, it is desired to reduce minute dots that have not been of much concern.

Analysis of the cause of the dots has been gained by daily progress, and some findings have been obtained. The dots are mostly caused by abnormal growth called spherical protuberances ascribable to dust or the like produced when amorphous silicon is deposited as a film. Besides, there is also what is called running dots that may increase as the running is continued, which are caused by scattering of toner or inclusion of paper dust into a separation zone electric assembly. In order to decrease the defective or faulty image caused by such problems, those who are engaged in the manufacture of photosensitive members must take measures for not only increasing cleanness of the inside of a deposited film forming apparatus but also increasing breakdown voltage of an amorphous silicon photosensitive member with approaches from an improvement in the method of forming deposited films or from the manufacturing process.

In recent years, electrophotographic photosensitive members are also desired to have a higher image quality and a higher function. For this reason, it is required to faithfully reproduce an original containing a halftone as in photographs, while achieving a decrease in nonuniform performance, in particular, nonuniformity of the halftone. In the case of full-color copying machines having come into wide use in recent years, this nonuniformity results in a delicate unevenness of colors which becomes visually clearly recognizable, and hence has become of great importance.

In addition, electrophotographic photosensitive members are also desired which maintain a high image quality and a high sensitivity and to have greatly improved running performance in every environment. The running performance, in which the amorphous silicon photosensitive member most excels, makes it unnecessary to change the photosensitive member for new one until the service life of a copying machine itself has come to an end. This allows us to regard the photosensitive member as not an article for consumption but a component part of the copying machine, and thus has brought about a prospect for a possibility of liberation from routine maintenance such as replacement of the photosensitive member. Now, further new products are sought to have a durability of the same level as, or higher level than, the copying machine itself, and such durability is desired to be more greatly improved. Under such demands, it has been hitherto difficult, and is still unsatisfactory, to attain both the charge performance and the prevention of smeared images at high levels and to greatly improve the durability in every environment.

In order to meet such demands, it is required under the existing circumstances to reconsider the whole process starting from the step of cleaning a conductive substrate up to the step of manufacturing an electrophotographic photosensitive member.

An example of the method for manufacturing an electrophotographic photosensitive member in the instance where an aluminum alloy cylinder is used as the substrate and triethane is used in cleaning can be specifically shown as follows.

To a precision cutting lathe (manufactured by Pneumo Precision Inc.) provided with an air damper, a diamond cutting tool (trade name: MIRACLE BITE; manufactured by Tokyo Diamond K.K.) is so set as to be at a rake angle of 5° with respect to the center line of the cylinder. Next, the substrate is vacuum-chucked to the rotating flange of the lathe, and mirror cutting is carried out so as to give an outer diameter of 108 mm under conditions of a peripheral speed of 1,000 m/min and a feed rate of 0.01 mm/R, in combination with the spraying of white kerosene from attached nozzles with the vacuuming of cuttings through similarly attached nozzles.

Next, the substrate thus cut is cleaned with triethane to clean off the cutting oil and cuttings adhered to the surface.

Next, on this mirror-finished and cleaned substrate, a deposited film mainly composed amorphous silicon is formed using an apparatus for forming a photoconductive member deposited film by glow discharge decomposition, as shown in FIG. 1.

In FIG. 1, a reaction vessel 101 is comprised of a base plate 102, a wall 103 and a top plate 104. Inside this reaction vessel 101, an electrode 105 (the cathode) is provided. A substrate 106 on which the amorphous silicon deposited film is formed is disposed at the center of the cathode 105 and serves also as the anode.

To form the amorphous silicon deposited film on the substrate 106 using this deposited film forming apparatus, firstly a starting material gas inlet valve 107 and a leak valve 108 are closed and an exhaust valve 109 is opened to evacuate the reaction vessel 101. At the time when a vacuum indicator points to about $5\times10^{-6}$ torr, the starting material gas inlet valve 107 is opened to allow starting material gases as exemplified by $SiH_4$ gas and other gas adjusted to a given mixing ratio in a mass flow controller 111, to flow into the reaction vessel. Then, after the surface temperature of the substrate 106 has been confirmed to be set at a given temperature by means of a heater 112, a high-frequency power source 113 set to the desired power is switched on to generate glow discharge in the reaction vessel.

During the formation of the deposited film, the substrate 106 is rotated at a constant speed by means of a motor 114 to form a deposited film uniformly. In this way the amorphous silicon deposited film can be formed on the substrate 106.

However, in such a method for manufacturing an electrophotographic photosensitive member, there is a region in which the deposited film is formed at a higher rate, and hence it is difficult to constantly stably obtain at a high yield a deposited film having a uniform film quality, satisfying requirements for optical and electrical characteristics and also giving a higher image quality when images are formed by electrophotography. This is a problem remaining unsettled.

Namely, the electrophotographic photosensitive member prepared by the method of manufacturing an electrophotographic photosensitive member, comprising the step of forming on a metal substrate a non-monocrystalline deposited film such as the amorphous silicon deposited film by plasma CVD, often causes density unevenness and spots on an image which are not removable even at optimized conditions for the formation of the deposited film.

Hitherto, since copies have been made mainly for the purpose of copying originals printed or written exclusively in type (what is called line copying), such unevenness and spots have not been questioned. However, with a recent improvement in the quality of images formed by copying machines, originals containing halftones as in photographs have been copied and such unevenness and spots have become questioned. In particular, in the case of full-color copying machines recently having come into wide use, such unevenness and spots result in unevenness of colors which becomes visually more apparent, and hence has become very important.

These changes of the substrate surface are so minute that they can not be detected even if the conductivity is measured by attaching electrodes at the upper part. When, however, charging, exposure and development are carried out by electrophotography using such an electrophotographic photosensitive member, in particular, when a uniform image is formed in halftone, even a small difference in potential on the surface of the electrophotographic photosensitive member results in unevenness of image density, and comes to be visually recognizable.

In addition, the plasma CVD in which a starting material gas is decomposed by microwave glow discharge, i.e., microwave plasma CVD, has recently attracted notice on an industrial scale as a method of forming deposited films.

The microwave plasma CVD is advantageous over other processes because of its higher deposition rate and a higher efficiency of starting material gas utilization. U.S. Pat. No.

4,504,518 discloses an example of the microwave plasma CVD making the most of such advantages. The technique disclosed in this patent is a technique in which a deposited film with a good quality is obtained at a high deposition rate by microwave plasma CVD at a low pressure of 0.1 torr or less.

Japanese Patent Application Laid-open No. 60-186849 also discloses a technique by which a starting material gas can be utilized at a higher efficiency by microwave plasma CVD. The technique disclosed in this publication is, in summary, a technique in which substrates are so arranged that they surround a microwave energy introducing means to form an internal chamber, i.e., a discharge space, thereby greatly improving the efficiency of starting material gas utilization.

Japanese Patent Application Laid-open No. 61-283116 also discloses an improved microwave technique for producing a semiconductor member. More specifically, this publication discloses a technique in which an electrode (a bias electrode) is provided in the discharge space as a plasma potential controller, and the desired voltage (a bias voltage) is applied to this bias electrode to form a deposited film while controlling ion bombardment against the deposited film, thereby improving the characteristics of the deposited film. An electrophotographic photosensitive member prepared by such microwave plasma CVD, however, often is a serious cause of the aforesaid problems.

On the other hand, none of such image density unevenness and spots occur in electrophotographic photosensitive members prepared by processes other than the microwave plasma CVD, i.e., selenium electrophotographic photosensitive members prepared by vacuum deposition, OPC electrophotographic photosensitive members prepared by blade coating or dipping, even with use of the substrate having been cleaned by the process previously described.

Even in devices prepared by plasma CVD, none of the above problems also occur in devices since a delicate positional difference on the substrate does not affect their performances as, for example in solar cells.

SUMMARY OF THE INVENTION

An object of the present invention is to overcome the problems as discussed above, involved in the conventional methods for manufacturing an electrophotographic photosensitive member having a light receiving layer comprising non-monocrystalline silicon, and provide a method for manufacturing a ready-to-use electrophotographic photosensitive member, that can form photosensitive members at a low cost, consistently in a good yield and at a high speed.

Another object of the present invention is to solve the problem of causing image density unevenness inevitably involved in plasma CVD, and to provide a method for manufacturing an electrophotographic photosensitive member that can give a uniform and high-grade image.

Still another object of the present invention is to solve the problems as discussed above, involved in an electrophotographic photosensitive member having a light receiving layer formed of a material mainly comprising silicon atoms, and to supply photosensitive members at a low cost and in a good yield, having very good electrical characteristics and promising a great decrease in faulty images.

A further object of the present invention is to provide a method for manufacturing an electrophotographic photosensitive member, that uses no organic solvent in the manufacturing process, can therefore be advantageous for environmental conservation, can greatly improve the yield that may be lowered because of a poor appearance of the surface of electrophotographic photosensitive members produced, and can produce at a low cost a photosensitive member having particularly superior performance to prevent faulty images, halftone unevenness, etc. and usable without regard to environment.

A still further object of the present invention is to provide an electrophotographic photosensitive member having a superior adhesion between a conductive substrate and a layer provided on the conductive substrate or between layers laminated thereon, and having a uniform and high-quality light receiving layer formed of a material mainly comprising silicon atoms.

A still further object of the present invention is to provide a method for manufacturing an electrophotographic photosensitive member having a light receiving layer formed of a material mainly comprising silicon atoms, which, when applied as an electrophotographic photosensitive member, has a sufficient charge retention during charging for the formation of an electrostatic image, can readily obtain a high-quality image with a sharp halftone and a high resolution, and can exhibit superior electrophotographic performance in conventional electrophotography.

A still further object of the present invention is to provide a method that can produce an electrophotographic photosensitive member by plasma CVD, particularly without use of any halogenated hydrocarbon organic solvents having a possibility of adversely affecting the local environmental.

Other objects and preferred embodiments of the present invention will become apparent from the following description.

DESCRIPTION OF THE PREFERRED EMBODIMENTS

Figure 1:
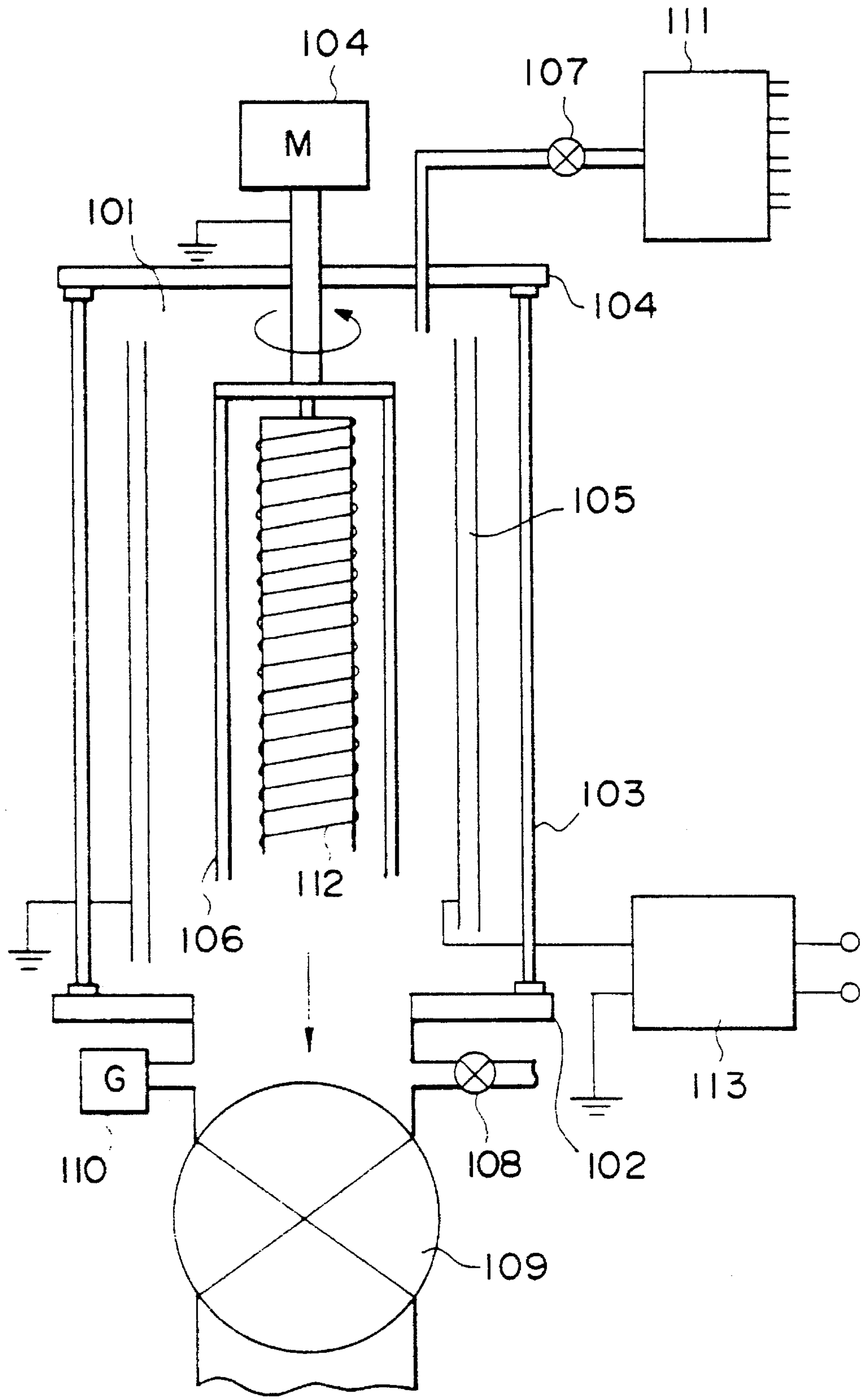
FIG. 1 is a schematic longitudinal cross-section of a deposited film forming apparatus used to form a deposited film on a cylindrical substrate by RF plasma CVD.

The present inventors made extensive studies, taking note of any possibility of preventing the aforesaid unevenness in performance of the deposited film by cutting the substrate surface and further applying any pretreatment before the film formation, and as a result have accomplished the present invention.

The mechanism of the present invention is still unclear in many respects. At this time, the present inventors presume it is as follows: In the case when an amorphous silicon deposited film is formed on the substrate, the reaction can be considered to be separated into three steps, i.e., the step of decomposing a starting material gas in a gaseous phase, the step of transporting active species from the discharge space to the substrate surface and the step of surface reaction on the substrate surface. In particular, the step of surface reaction plays a very important role as a factor of determining the structure of a deposited film thus formed. Such surface reaction is greatly influenced by the temperature, material, shape, absorption material and so forth of the substrate surface.

A metal substrate, in particular, a high-purity aluminum substrate is employed in a state such that water is adsorbed on the substrate surface in a partly different state, when the substrate is kept as it is without any treatment after cutting or when the substrate is washed with a water-insoluble agent such as trichloroethane without any further treatment after cutting. If a deposited film such as an amorphous silicon film containing silicon atoms, hydrogen atoms and/or fluorine atoms is formed on the substrate in such a state by plasma CVD, the reaction of the surface is particularly greatly influenced by the quantity of water molecules remaining on the substrate surface. This results in a change in composition and structure of the deposited film at the interface at which the amount of water absorption differs at that position of the substrate, so that the mode of charge injection from the substrate at that part changes during the process of electrophotography to cause a difference in surface potential which is large enough to cause a change in image density.

In order to solve the above problem involved in the formation of deposited films, the present inventors also made extensive studies from the viewpoint of productivity and decrease in cost and also from the standpoint of environmental conservation, and as a result have succeeded in achieving the objects also from the viewpoint of the environmental problem.

More specifically, the present invention has succeeded in eliminating the aforesaid problems of image density unevenness and so forth by a method in which the substrate surface is first brought into contact with water after the substrate surface has been cut and before the deposited film is formed by plasma CVD under specific conditions, to remove the positional difference in content of the water adsorbed on the substrate surface.

The present invention is a surface treatment method suitable for plasma CVD, in which the adsorption of water on the substrate surface is made uniform in order to better prevent the image unevenness, and has attained an effect quite different from the mere cleaning of surface contaminants with water.

The present invention will be described below in detail with reference to the accompanying drawings.

An example of the procedure of actually forming an electrophotographic photosensitive member by the method of manufacturing an electrophotographic photosensitive member according to the present invention, using as the substrate a cylinder made of an aluminum alloy, will be described below with reference to FIG. 2, which illustrates a substrate pretreatment apparatus, and FIGS. 3 and 4, which illustrate a deposited film forming apparatus.

To a precision cutting lathe (manufactured by Pneumo Precision Inc.; not shown in the drawing) provided with an air damper, a diamond cutting tool (trade name: MIRACLE BITE; manufactured by Tokyo Diamond K.K.) is so set as to be at a rake angle of 5° with respect to the center line of the cylinder.

Next, the substrate is vacuum-chucked to the rotating flange of the lathe, and mirror cutting is carried out so as to give an outer diameter of 108 mm under conditions of a peripheral speed of 1,000 m/min and a feed rate of 0.01 mm/R, in combination of the spraying of white kerosene from attached nozzles with the vacuuming of cuttings through similarly attached nozzles.

The substrate thus having been cut is subjected to a substrate surface treatment using a substrate pretreatment apparatus.

Figure 2:
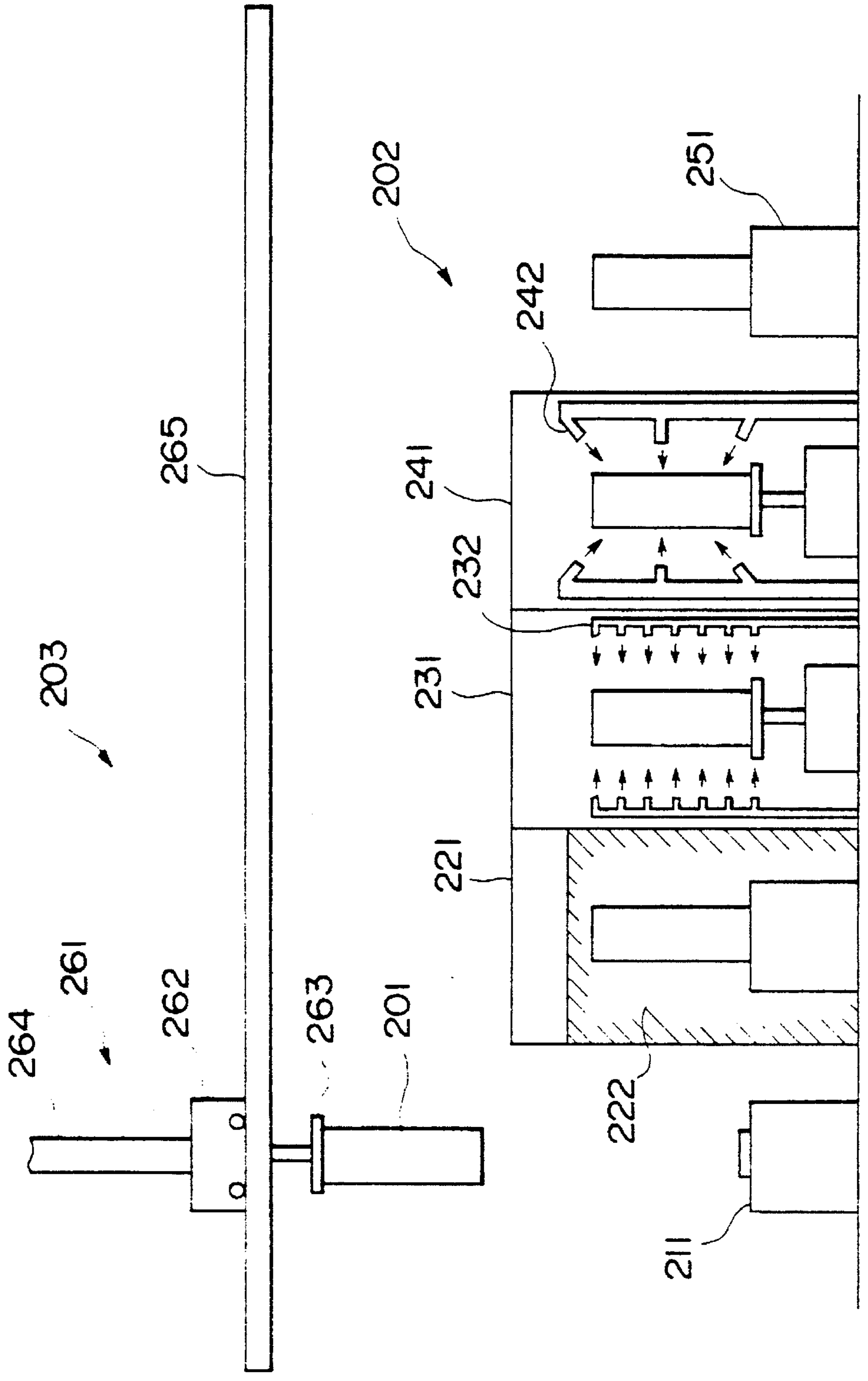
FIG. 2 is a schematic longitudinal cross-section to illustrate a pretreatment apparatus used for carrying out the substrate surface treatment method of the present invention.

The substrate pretreatment apparatus shown in FIG. 2 has a treatment zone 202 and a substrate transport mechanism 203. The treatment zone 202 has a substrate feed stand 211, a substrate precleaning bath 221, a water treatment bath 231, a drying bath 241, a substrate carry-out stand 251. The precleaning bath 221 and the water treatment bath 231 are each provided with a thermostat (not shown) for maintaining liquid temperature at a constant level. The transport mechanism 203 is comprised of a transport rail 265 and a transport arm 261. The transport arm 261 is comprised of a moving mechanism 262 that moves on the rail 265, a chucking mechanism 263 that holds a substrate 201 and an air cylinder 264 that upward-downward moves the chucking mechanism 263.

After the cutting, the substrate 201 placed on the feed stand 211 is carried into the precleaning bath 221 by means of the transport mechanism 203. Trichloroethane (trade name: ETHANA VG; available from Asahi Chemical Industry Co., Ltd.) contained in the precleaning bath 221 cleans the substrate to remove cutting oil and cuttings adhered to its surface. As previously stated, the trichloroethane is harmful and hence should be used in a closed system.

Next, the substrate 201 is carried into the water treatment bath 231 by means of the transport mechanism 203, where pure water kept at a temperature of 40° C. and having a resistivity of 17.5 Ω·cm is sprayed from nozzles 232 at a pressure of 50 kg·f/cm$^2$. The substrate 201 having been treated with the water is carried into the drying bath 241 by means of the transport mechanism 203, blown with hot air under pressure from nozzles 242 and thus dried. Of course, this treatment apparatus is by no means limited to this structure so long as a similar treatment can be carried out. The same applies also to what is shown in the subsequent drawings.

The substrate 201 having been dried is carried onto the carry-out stand 251 by means of the transport mechanism 203.

Figure 3:
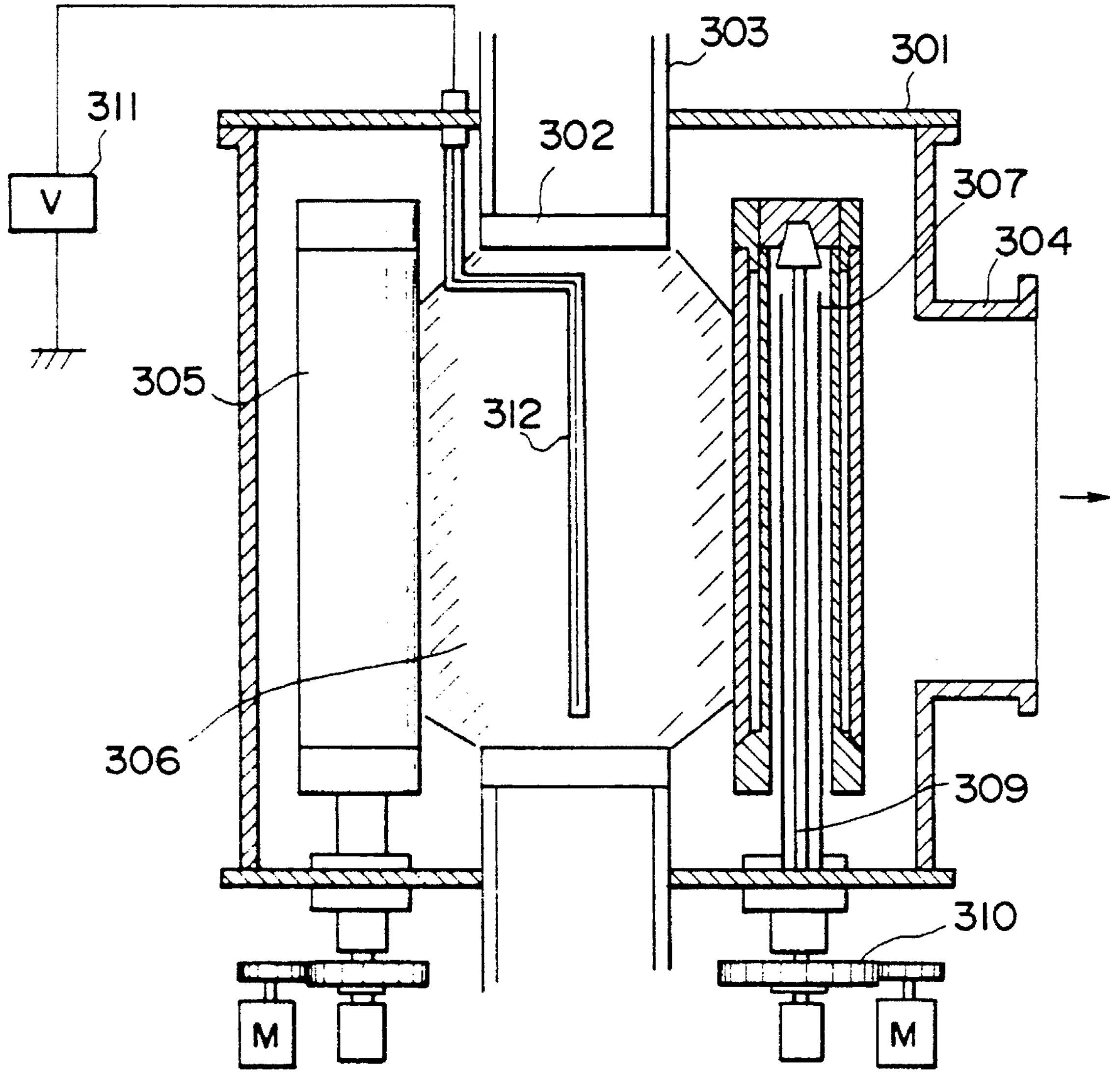
FIG. 3 is a schematic longitudinal cross-section of a deposited film forming apparatus used to form a deposited film on a cylindrical substrate by microwave plasma CVD.
Figure 4:
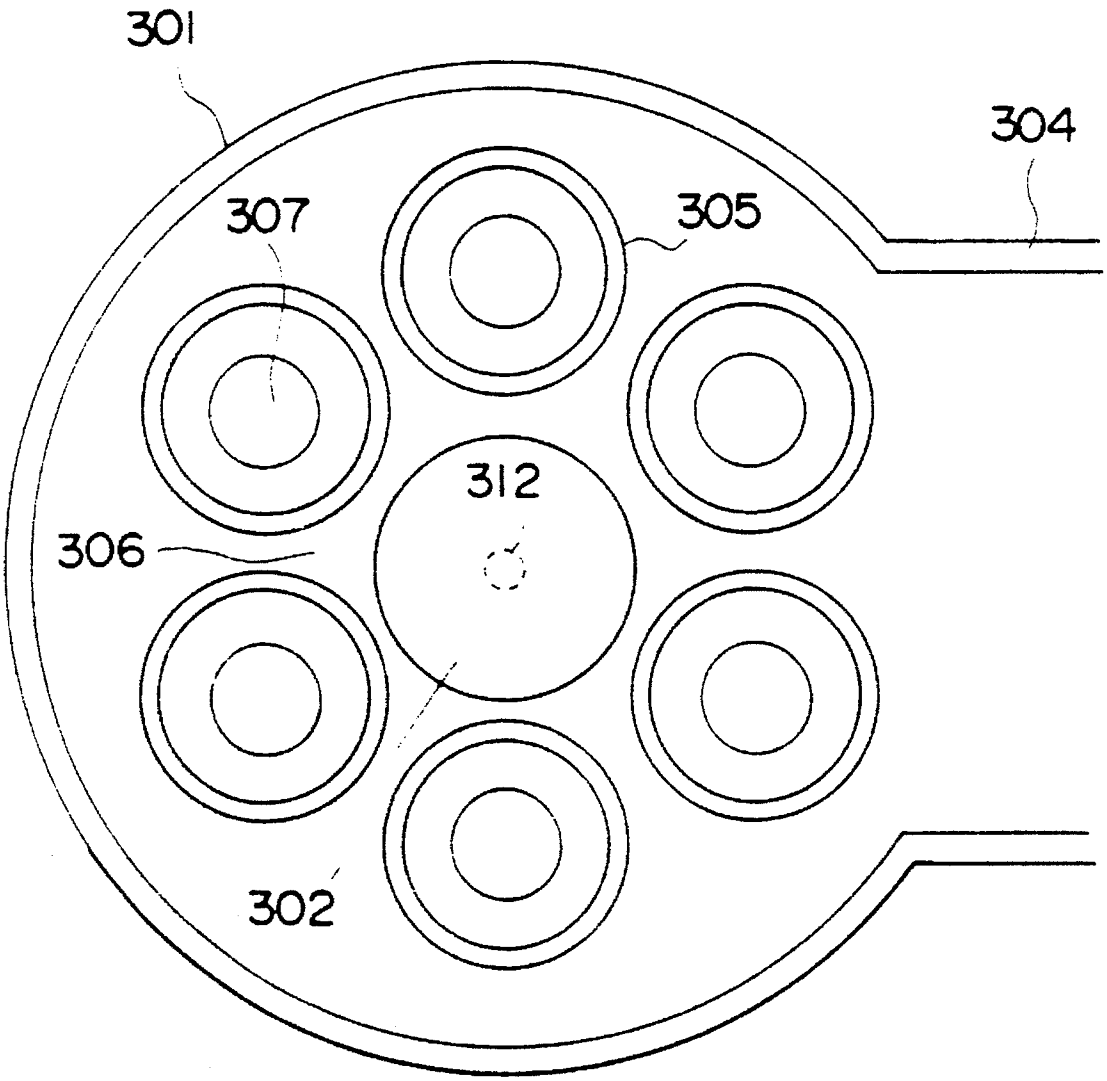
FIG. 4 is a schematic transverse cross-section of the deposited film forming apparatus shown in FIG. 3.

Next, on the substrate having been subjected to these cutting and pretreatment, a deposited film mainly composed of amorphous silicon is formed using the film forming apparatus as shown in FIGS. 3 and 4, for forming a photoconductive member deposited film by plasma CVD.

In FIGS. 3 and 4, reference numeral 301 denotes a reaction vessel, which sets up what is called a vacuum-sealed system. Reference numeral 302 denotes a microwave-introducing dielectric window formed of a material capable of maintaining the vacuum airtightness, as exemplified by quartz glass or alumina ceramics. Reference numeral 303 denotes a waveguide through which a microwave power is transmitted, having a rectangular portion extending from a microwave power source to the vicinity of the reaction vessel and a cylindrical portion inserted into the reaction vessel. The waveguide 303 is connected to a microwave power source (not shown) together with a stub tuner (not shown) and an isolator (not shown). The dielectric window 302 is hermetically sealed to the inner wall of the cylindrical portion of the waveguide 303 so that the atmosphere in the reaction vessel can be retained. Reference numeral 304 denotes an exhaust pipe one end of which opens to the inside of the reaction vessel 301 and the other end of which communicates with an exhaust device (not shown). Reference numeral 306 denotes a discharge space surrounded by substrates 305. A power source 311 is a DC power source (a bias power source) from which a DC voltage is applied to a bias electrode 312, and is electrically connected with the electrode 312.

Using such a deposited film forming apparatus, electrophotographic photosensitive members are manufactured in the following way. First, the reaction vessel 301 is evacuated through the exhaust pipe 304 by means of a vacuum pump (not shown), and the inside of the reaction vessel is adjusted to have a pressure of $1\times10^{-7}$ torr or less. Next, each substrate 305 is heated to and maintained at a given temperature by means of a heater 307. Then, starting material gases such as silane gas serving as a starting material gas of amorphous silicon, diborane gas serving as a doping gas and helium gas serving as diluent gas are fed into the reaction vessel 301 through a gas feed means (not shown). At the same time, concurrently with the gas feeding, a microwave with a frequency of 2.45 GHz is generated by means of a microwave power source (not shown), passed through the waveguide 303 and is led into the reaction vessel 301 via the dielectric window 302. From the DC power source 311 electrically connected with the bias electrode 312 set in the discharge space 306, a DC voltage is applied to the bias electrode 312 against the substrates 305. Thus, in the discharge space 306 surrounded by the substrates 305, the starting material gases are excited by the energy of the microwave to undergo dissociation and also the electric field formed between the bias electrode 312 and the substrate 305 causes on the substrate 305 constant bombardment with ionized gas molecules, in the course of which the deposited film is formed on the surface of substrate 305. At this time, a rotating shaft 309 around which each substrate 305 is disposed is rotated by the driving of a motor 310 to rotate the substrate 305 around the center shaft in the substrate circular direction, so that the deposited film is uniformly formed over the whole periphery of each substrate 305.

As another method, the substrate having been cut may be subjected to substrate surface treatment by means of the substrate pretreatment apparatus described above, not using the organic solvent but using water and a surfactant.

After the substrate has been cut in the same manner as described above, a conductive substrate 201 placed on the substrate feed stand 211 is transported into a cleaning bath 221 by means of the substrate transport mechanism 203. In an aqueous surfactant solution 222 contained in the substrate cleaning bath 221, an ultrasonic wave with a frequency of 60 kHz and an output of 400 W, outputted from an ultrasonic generator consisting of a ferrite oscillator cleans the substrate to remove cutting oil and cuttings adhered to its surface.

Next, the substrate 201 is carried into the pure-water contact bath 231 by means of the substrate transport mechanism 203, where pure water kept at a temperature of 25° C. and having a resistivity of 15 Ω·cm is sprayed from nozzles 232 at a pressure of 50 kg·f/cm$^2$. The substrate 201 having been treated by its contact with the pure water is carried into the drying bath 241 by means of the transport mechanism 203, blown with hot air under pressure from nozzles 242 and thus dried.

The substrate 201 having been dried is carried onto the substrate carry-out stand 251 by means of the substrate transport mechanism 203.

Next, on the substrate having been subjected to these cutting and pretreatment, a deposited film mainly composed of amorphous silicon is formed in the same way, using the film forming apparatus as shown in FIGS. 3 and 4, for forming a photoconductive member deposited film by plasma CVD.

As still another method, the substrate having been cut may be subjected to substrate surface treatment by means of the substrate pretreatment apparatus shown in FIG. 2, also without use of the organic solvent. That is, after the substrate has been cut in the same manner as described above, a conductive substrate 201 placed on the substrate feed stand 211 is transported into the cleaning bath 221 by means of the transport mechanism 203. In a cleaning fluid 222 mainly composed of an aqueous surfactant solution contained in the substrate cleaning bath 221, an ultrasonic wave treatment removes cutting oil and cuttings adhered to the substrate surface. Next, the substrate 201 is carried into the pure-water contact bath 231 by means of the transport mechanism 203, where pure water kept at a temperature of 25° C. and having a resistivity of 17.5 Ω·cm is sprayed from nozzles 232 at a pressure of 50 kg·f/cm$^2$. The substrate 201 having been treated by its contact with the pure water is carried into the drying bath 241 by means of the transport mechanism 203, blown with hot air under pressure from nozzles 242 and thus dried. The substrate 201 having been dried is carried onto the substrate carry-out stand 251 by means of the transport mechanism 203.

Next, on the substrate having been subjected to these cutting and pretreatment, a deposited film mainly composed of amorphous silicon is formed in the same way as previously described, using the film forming apparatus as shown in FIGS. 3 and 4, for forming a photoconductive member deposited film by microwave plasma CVD.

Figure 5:
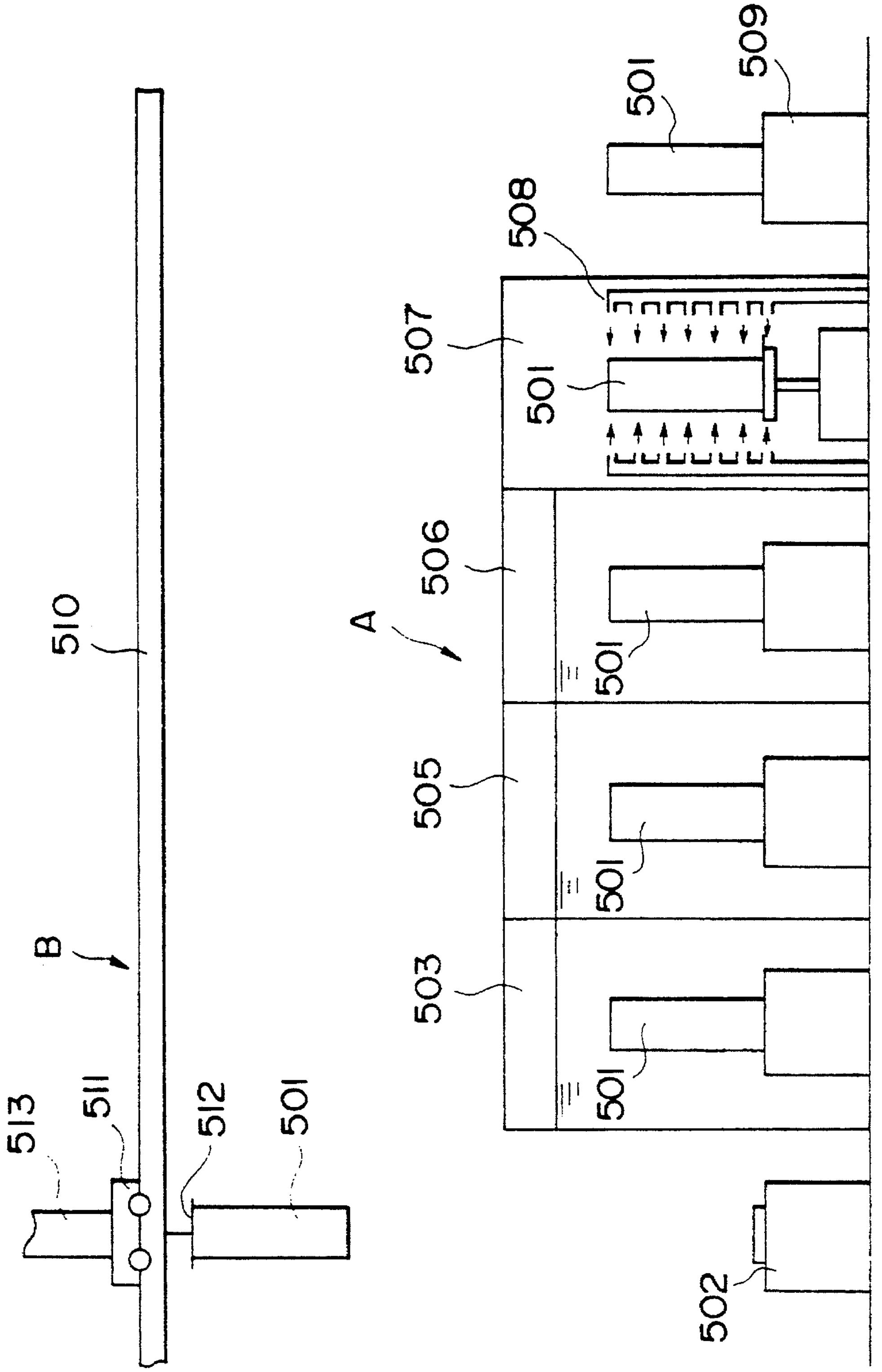
FIG. 5 is a schematic side elevation to show a cleaning apparatus for carrying out the substrate surface treatment method of the present invention.

A substrate cleaning apparatus shown in FIG. 5 is another example of the apparatus suited for carrying out the method of the present invention, and has a cleaning mechanism A and a transport mechanism B provided above the cleaning mechanism A. The cleaning mechanism A is equipped with a cleaning bath 503, a water rinse bath 505, an alcohol rinse bath 506 and a drying bath 507. The baths except the drying bath 507 are provided with thermostats (not shown) for maintaining the liquid temperatures of the respective baths and also provided with circulators (not shown) for removing contaminants in the liquid. Reference numeral 502 denotes a substrate feed stand; and 509, a substrate carry-out stand.

The transport mechanism B has a moving mechanism 511 that moves on a transport rail 510, a chucking mechanism 512 that holds a substrate 501 and an air cylinder 513 that moves the chucking mechanism 512 up and down.

After cutting, the substrate 502 placed on the substrate feed stand 502 is transported into the cleaning bath 503 by means of the transport mechanism. Pure water is held in the cleaning bath 503, in which usually a surfactant is also mixed in order to improve cleaning power. After oily matters on the surface are removed in the cleaning bath 503, the substrate 501 is carried into the water rinse bath 505. Pure water is held in the water rinse bath 505. The substrate 501 is immersed therein and thereafter carried into the alcohol rinse bath 506. An alcohol type liquid is held in the alcohol rinse bath. The substrate 501 is immersed therein and thereafter carried into the drying bath 507. Thus the substrate 501 is rinsed with alcohol and dried. Reference numeral 508 denotes dying nozzles used to efficiently dry the substrate 501. The substrate 501 is dried while hot air, nitrogen gas, argon gas or the like is blown off from the nozzles. Thereafter the substrate is carried onto the substrate carry-out stand 509 by means of the transport mechanism B.

Next, on the substrate having been subjected to such cutting and cleaning, a deposited film mainly composed of amorphous silicon, serving as a photoconductive member, is formed in the same way as previously described, using the apparatus as shown in FIGS. 3 and 4, for forming a deposited film by microwave plasma CVD.

In the present invention, the cleaning fluid used in the cleaning step should preferably be, as previously mentioned, a water-based cleaning fluid as exemplified by a fluid comprised of water and a surfactant added thereto.

In the present invention, the water quality of the water to which the surfactant used for the cleaning has not been added is not questioned so long as it is not particularly contaminated, and city water (water for domestic use or industrial use) may be used. In particular, pure water of semiconductor grade should preferably be used. Specifically stated on the basis of resistivity, the water preferably used in the present invention may have a resistivity, at a water temperature of 25° C., of 1 MΩ·cm as a lower limit, preferably not lower than 5 MΩ·cm, and most preferably not lower than 11 MΩ·cm, as being suitable for the present invention. An upper limit can be of any value up to the theoretical value (18.25 MΩ·cm). In view of cost and productivity, the upper limit may be 18.2 MΩ·cm, preferably 18.0 MΩ·cm, and most preferably 17.8 MΩ·cm, as being suitable for the present invention.

The water should contain fine particles with a particle diameter of not smaller than 0.2 μm in a quantity of not more than 100,000 particles, preferably not more than 10,000 particles, more preferably not more than 1,000 particles, and most preferably not more than 100 particles, per milliliter. It also should contain microorganisms in a total viable cell count of not more than 1,000, preferably not more than 100, more preferably not more then 10, and most preferably not more than 1, per milliliter. It still also should contain an organic matter in a quantity (TOC) of not more than 100 mg, preferably not more than 10 mg, more preferably not more than 1 mg, and most preferably not more than 0.2 mg, per liter.

Of course, in the present invention, it is more preferable to use as the water used in the cleaning bath, the pure water of semiconductor grade, in particular, ultrapure water of VLSI grade, if permissible from the viewpoint of cost. In this instance, the water should have a resistivity of not lower than 16 MΩ·cm, preferably not lower than 17 MΩ·cm, and most preferably not lower than 17.5 MΩ·cm, at a water temperature of 25° C. As for the tolerable quantity of fine particles, the water should contain fine particles with a particle diameter of not smaller than 0.2 μm in a quantity of not more than 500 particles, preferably not more than 100 particles, and most preferably not more than 50 particles, per milliliter. The quantity of microorganisms should be in a total viable cell count of not more than 10, preferably not more than 1, and most preferably not more than 0.1, per milliliter. The organic matter quantity (TOC) should be not more than 1 mg, preferably not more than 0.2 mg, and most preferably not more than 0.1 mg, per liter.

In the present invention, use of ultrasonic wave in the cleaning step is particularly preferable for making the present invention effective. An ultrasonic generator used therefor may be a magnetostriction oscillator comprising ferrite or the like. Methods for inputting ultrasonic waves to the cleaning bath are exemplified by a method in which such an oscillator is disposed in the cleaning bath, a method in which it is bonded to the bottom or side wall of the cleaning bath, and a method in which ultrasonic waves are transmitted to the cleaning bath through a horn, from an oscillator provided in the vicinity of the bath. Simultaneous use of a plurality of oscillators in one cleaning bath can also be effective for controlling outputs or achieving a uniform cleaning effect. The frequency of ultrasonic wave may preferably be in the range of from 100 Hz to 10 MHz. In a relatively low frequency region, however, the ultrasonic wave may cause so strong cavitation that it can bring about a great effect of cleaning, but is not preferable because it may physically damage the substrate surface to make small the effect of decreasing unevenness or spots. In a relatively high frequency region, the ultrasonic wave can not be of no practical use because of a lower cleaning effect than the required cleaning effect. Specifically stated, particularly in the case of the substrate made of aluminum or aluminum alloy, the frequency of ultrasonic wave may preferably be in the range of from 20 kHz to 10 MHz, more preferably from 35 kHz to 5 MHz, and most preferably from 50 kHz to 1 MHz, in order to be effective for the present invention. For all that, in the case of a substrate with a surface highly hard enough not to be physically damaged, the frequency of ultrasonic wave may preferably be in the range of from 1 kHz to 5 MHz, and most preferably from 10 kHz to 100 kHz. The output of ultrasonic wave may preferably be in the range of from 0.1 W/liter to 500 W/liter, and more preferably from 1 W/liter to 100 W/liter, or, as a total output, in the range of from 10 W/liter to 100 KW/liter, and preferably from 100 W/liter to 10 KW/liter, in order to be effective for the present invention.

Methods for obtaining the water having the above water quality are exemplified by activated-carbon purification, distillation, ion exchange, filter filtration, reverse osmosis, and ultraviolet sterilization. A plurality of these methods may preferably be used in combination so that the water quality can be raised to the required level.

With regard to the temperature of water during the cleaning, an excessively high temperature may result in the formation of an unwanted oxide film on the substrate to cause separation of the deposited film. On the other hand, an excessively low temperature may bring about only a low cleaning effect and also can not be well effective for the present invention. Hence, the water temperature should be in the range of from 10° C. to 90° C., preferably from 20° C. to 75° C., and most preferably from 30° C. to 55° C.

The surfactant used in the cleaning step in the present invention may be any of those including anionic surfactants, cationic surfactants, nonionic surfactants, amphoteric surfactants, and mixtures of any of these. The present invention can also be effective when an additive such as sodium tripolyphosphate is used.

The surfactant is a compound comprising a hydrophobic group and a hydrophilic group, which tends to gather at the interface between two substances (substrate/oil) and is effective for the separation of the two substances. The surfactant is roughly grouped into two types, the ionic type and the nonionic type, according to the type of the hydrophilic group.

The ionic surfactant may include sodium salts of aliphatic higher alcohol sulfuric acid esters, alkyltrimethylammonium chlorides, and alkyldimethyl pentachloroethanes. The nonionic surfactant may include aliphatic higher alcohol ethylene oxide adducts such as polyethylene glycol and alkyl ethers. All of these are effective for the present invention.

In the present invention, the water quality of the water used in the step of contacting pure-water is very important, and pure water of semiconductor grade, in particular, ultrapure water of VLSI grade should preferably be used. Stated specifically, the water should have a resistivity, at a water temperature of 25° C., of 11 MΩ·cm as a lower limit, preferably not lower than 13 MΩ·cm, more preferably not lower than 15 MΩ·cm and most preferably not lower than 16 MΩ·cm. In particular, water with a resistivity of 10 MΩ·cm or less can be little effective for the present invention. An upper limit of the resistivity can be of any value up to the theoretical value (18.25 MΩ·cm). In view of cost and productivity, the upper limit may be 18.2 MΩ·cm, preferably 18.0 MΩ·cm, and most preferably 17.8 MΩ·cm, as being suitable for the present invention. As for the quantity of fine particles, the water should contain fine particles with a particle diameter of not smaller than 0.2 μm in a quantity of not more than 10,000 particles, preferably not more than 1,000 particles, more preferably not more than 500 particles, and most preferably not more than 100 particles, per milliliter. The quantity of microorganisms should be in a total viable cell count of not more than 100, preferably not more than 10, and most preferably not more than 1, per milliliter. The organic matter quantity (TOC) should be not more than 10 mg, preferably not more than 1 mg, more preferably not more than 0.2 mg, and most preferably not more than 0.1 mg, per liter, as being suitable for the present invention.

Methods for obtaining the water having the above water quality are exemplified by activated-carbon purification, distillation, ion exchange, filter filtration, reverse osmosis, and ultraviolet sterilization. A plurality of these methods may preferably be used in combination so that the water quality can be raised to the required level.

When the substrate surface is brought into contact with the pure water, the substrate may only be immersed in the liquid. Preferably the pure water should be sprayed under application of a water pressure. When the pure water is sprayed, an excessively low pressure can bring about only a small effect of the present invention, and an excessively high pressure may result in occurrence of a pear-skin appearance on the image, in particular, halftone image formed on an electrophotographic photosensitive member obtained. Hence, the pressure in the spraying of the pure water should be in the range of from 1 kg·f/cm$^2$ to 300 kg·f/cm$^2$, preferably from 5 kg·f/cm$^2$ to 200 kg·f/cm$^2$, and most preferably from 10 kg·f/cm$^2$ to 150 kg·f/cm$^2$. Here, the pressure unit kg·f/cm$^2$ used in the present invention refers to a square centimeter per gravitational kilogram, and 1 kg·f/cm$^2$ is equal to 98,066.5 Pa.

The pure water may be sprayed by a method in which pure water highly compressed using a pump is sprayed from nozzles, or a method in which pure water pumped up is mixed with a highly compressed air before they reach nozzles and sprayed therefrom by the action of air pressure.

The flow rate of the pure water may be in the range of from 1 liter/minute to 200 liters/minute, preferably from 2 liters/minute to 100 liter/minute, and most preferably from 5 liters/minute to 50 liter/minute, as being suitable for the present invention.

Pure water with an excessively high temperature makes an oxide film to occur on the substrate to cause separation of the deposited film to make it impossible to obtain a satisfactory effect of the present invention. On the other hand, pure water with an excessively low temperature also makes it impossible to obtain a satisfactory effect of the present invention. Hence, the temperature of the pure water should be in the range of from 5° C. to 90° C., preferably from 10° C. to 50° C., and most preferably from 15° C. to 40° C., as being suitable for the present invention.

Pure-water contact treatment carried out for an excessively long time makes an oxide film to occur on the substrate, and that carried out for an excessively short time can bring about only a small effect of the present invention. Hence, the time therefor should be in the range of from 10 seconds to 30 minutes, preferably from 20 seconds to 20 minutes, and most preferably from 30 seconds to 10 minutes, as being suitable for the present invention.

In the present invention, for elimination of influence of the oxide film that may be formed on the substrate surface during the formation of the deposited film, it is important to cut the substrate surface immediately before the deposited film is formed.

With regard to the time from completion of the cutting to start of the pure-water contact treatment, an excessively long pause may result in re-occurrence of the oxide film on the substrate and an excessively short pause can not make the process steady. Hence, the time should be in the range of from 1 minute to 16 hours, preferably from 2 minutes to 8 hours, and most preferably from 3 minutes to 4 hours, as being suitable for the present invention.

With regard to the time from completion of the pure-water contact treatment to start of the feeding in the the deposited film forming apparatus, an excessively long pause may make small the effect of the present invention and an excessively short pause can not make the process steady. Hence, the time should be in the range of from 1 minute to 8 hours, preferably from 2 minutes to 4 hours, and most preferably from 3 minutes to 2 hours as being suitable for the present invention.

In the present invention, alcohol-rinse is preferable as a treatment after water cleaning. There are no particular limitations on the alcohol used as the treating medium after cleaning with water. Examples thereof are methyl alcohol, ethyl alcohol, propyl alcohol and isopropyl alcohol.

The alcohol used may be of second grade or higher, and preferably be of first grade or higher.

Its temperature may be in the range of from 10° C. to 50° C. as being suitable for the present invention. The time for which the substrate is immersed therein may be in the range of from 10 seconds to 10 minutes, and preferably from 30 seconds to 5 minutes, as being suitable for the present invention.

The time from completion of the rinsing with water to start of the rinsing with alcohol should be not longer than 30 minutes, and preferably not longer than 15 minutes.

As materials for the substrate on which the deposited film is formed, the present invention can be carried out so long as the substrate surface is formed of a metal. Effective materials are exemplified by stainless steel, Al, Cr, Mo, Au, In, Nb, Te, V, Ti, Pt, Pd and Fe. In particular, use of aluminum can bring about a remarkable effect. In the case when aluminum is used as a material of the substrate, the material may preferably also contain magnesium (Mg) in an amount of from 0.5% by weight to 10% by weight, more preferably from 1% by weight to 10% by weight, and most preferably from 1% by weight to 5% by weight. Before inclusion of the magnesium, the aluminum may preferably be in a purity of from not less than 95% by weight, more preferably from 99% to 99.99% by weight, as being effective for the present invention.

An excessively large content of Mg is not preferable since it tends to cause grain boundary corrosion that selectively occurs at grain boundaries of crystals.

Use of an aluminum alloy as a material for the substrate requires the step of mirror-finishing its surface, in the course of which various problems may arise because of the presence of rigid places called hard spots. The hard spots cause, for example, cracks, scrapes or the like of 1 to 10 μm in size to occur on the surface of the aluminum substrate. The hard spots are due to inclusion of various elements such as Fe, Ti and Si as impurities in aluminum. Of these impurities, particularly Fe is hardly solid-soluble in aluminum and forms a metal compound such as Fe—Al or Fe—Al—Si, resulting in its diffusion in the aluminum matrix in the form of the hard spots. For this reason, the Fe content in the aluminum alloy should preferably be not more than 2,000 ppm.

The substrate may be of any shape. In particular, a cylindrical substrate is most suitable for the present invention. There are no particular limitations on the size of the substrate. From practical viewpoint, the substrate may preferably has a diameter of from 20 mm to 500 mm and a length of 10 mm to 1,000 mm.

In the present invention, after the conductive substrate has been cut in a given precision, it is also effective to treat the form of its surface. For example, in instances in which images are recorded using coherent beams of light such as laser light, the conductive substrate may have a surface unevenness to eliminate any possible faulty image caused by an interference fringe pattern that may appear on a visible image. The unevenness may be provided on the surface of the conductive substrate by known methods as disclosed in Japanese Patent Applications Laid-open No. 60-168156, No. 60-178457, No. 60-225854, etc. As another method for eliminating the possible faulty image caused by an interference fringe pattern when the coherent beams of light such as laser light are used, the unevenness may be formed by providing plural sphere-traced concavities on the surface of the conductive substrate. More specifically, the surface of the conductive substrate has fine unevenness, which is finer than the resolution required for an electrophotographic photosensitive member, and also such uneveness is formed by plural sphere-traced concavities. The unevenness formed by plural sphere-traced concavities provided on the surface of the conductive substrate may be formed by the known method as disclosed in Japanese Patent Application Laid-open No. 61-231561.

Materials that can serve as Si-feeding gas used in the present invention for the formation of a photoconductive layer that that constitutes the deposited film in the present invention may include gaseous or gasifiable silicon hydrides (silanes) such as $SiH_4$, $Si_2H_6$, $Si_3H_8$ and $Si_4H_{10}$, and silicon halides such as $SiF_4$, $Si_2F_6$ and $SiCl_4$. In view of easiness to handle when the layer is formed and superiority in Si-feeding efficiency, preferred materials are $SiH_4$, $Si_2H_6$, $SiF_4$ and $Si_2F_6$. These Si-feeding starting material gases may be optionally mixed with gas such as $H_2$, He, Ar or Ne when used. These Si-feeding starting material gases may also be optionally mixed one another when used.

In the present invention, as a material that can serve as a starting material for introducing carbon atoms, it is preferable to employ a material which stands gaseous at room temperature or at least can be readily gasified under conditions for the layer formation.

As a property-modifying gas used for changing band gap width of the deposited film, it may include elements containing a nitrogen atom as exemplified by nitrogen ($N_2$) and ammonia ($NH_3$), elements containing an oxygen atom as exemplified by oxygen ($O_2$), nitrogen monoxide (NO), nitrogen dioxide ($NO_2$), dinitrogen oxide ($N_2O$), carbon monoxide (CO) and carbon dioxide ($CO_2$), hydrocarbons such as methane ($CH_4$), ethane ($C_2H_6$), ethylene ($C_2H_4$), acetylene ($C_2H_2$) and propane ($C_3H_8$), and fluorine-containing compounds such as germanium tetrafluoride ($GeF_4$) and nitrogen fluoride ($NF_3$), or mixed gases of any of these.

The photoconductive layer in the present invention may be comprised of photoconductive layers comprising non-crystalline silicon carbide [nc-SiC(H)] containing as constituents a silicon atom and a carbon atom, a hydrogen atom and a fluorine atom in the order from the conductive substrate side. In this instance, the photoconductive layer also has the desired photoconductive performances, in particular, charge-retaining performance, charge-generating performance and charge-transporting performance. Carbon atoms contained in this photoconductive layer should preferably be distributed in such a way that they are distributed substantially uniformly in the planes parallel to the surface of the conductive substrate and non-uniformly in the layer thickness direction, and, at every point of the layer thickness, distributed in a higher content on the side of the conductive substrate and in a lower content on the side of its surface layer. With regard to the content of carbon atoms, if it is not more than 0.5% at the surface on the side on which the conductive substrate is provided, there will be no effect of improving adhesion to the conductive substrate and also no effect of improving charge performance because of a poor performance in the blocking of charge injection and a decrease in electrostatic capacity. On the other hand, if it is more than 50%, a residual potential may be produced. Hence, from practical viewpoint, the carbon atom content should be in the range of from 0.5 to 50 atomic %, preferably from 1 to 40 atomic %, and most preferably from 1 to 30 atomic %. Here, the atomic % indicates the percentage on the basis of the number of atoms. In the present invention, hydrogen atoms must be also contained in the photoconductive layer, because they are indispensable for compensating the unbonded arms of silicon atoms, and for improving layer quality, in particular, for improving photoconductivity and charge retention performance. Since particularly when carbon atoms are contained a large number of hydrogen atoms become necessary for maintaining the layer quality, the quantity of hydrogen contained should be adjusted according to the quantity of carbon contained. Accordingly, the hydrogen atoms in the surface on the side on which the conductive substrate is provided may preferably be in a content of from 1 to 40 atomic %, more preferably from 5 to 35 atomic %, and most preferably from 10 to 30 atomic %.

The starting material gases for introducing silicon atoms are as described above. Starting materials that can be effectively used as starting material gases for introducing carbon atoms (C) may include those having C and H as constituent atoms, as exemplified by a saturated hydrocarbon having 2 to 5 carbon atoms, an ethylene type hydrocarbon having 1 to 4 carbon atoms and an acetylene type hydrocarbon having 2 or 3 carbon atoms. Specifically stated, the saturated hydrocarbon can be exemplified by methane ($CH_4$), ethane ($C_2H_6$), propane ($C_3H_8$), n-butane (n-$C_4H_{10}$) and pentane ($C_5H_{12}$); the ethylene type hydrocarbon, ethylene ($C_2H_4$), propylene ($C_3H_6$), butene-1 ($C_4H_8$), butene-2 ($C_4H_8$), isobutylene ($C_4H_8$) and pentene ($C_5H_{10}$); and the acetylene type hydrocarbon, acetylene ($C_2H_2$), methyl acetylene ($C_3H_4$) and butyne ($C_4H_6$).

Starting material gases having Si and C as constituent atoms may include alkyl silicides such as $Si(CH_3)_4$ and $Si(C_2H_5)$.

In order to structurally introduce hydrogen atoms into the photoconductive layer, besides the foregoing, $H_2$ or a silicon hydride such as $SiH_4$, $Si_2H_6$, $Si_3H_8$ or $Si_4H_{10}$ may be made present in a reaction vessel together with silicon or silicon compound used for the supply of Si, in the state of which discharge may be caused.

The quantity of hydrogen atoms contained in the photoconductive layer may be controlled by controlling the temperature of the conductive substrate, the quantity in which the starting material used for incorporating hydrogen atoms is fed into the reaction vessel, and the discharge electric power.

In the present invention, the photoconductive layer may preferably contain atoms (M) capable of controlling its conductivity as occasion calls. The atoms capable of controlling the conductivity may be contained in the photoconductive layer in an evenly uniformly distributed state, or may be contained partly in such a state that they are distributed non-uniformly in the layer thickness direction.

The above atoms capable of controlling the conductivity may include what is called impurities, used in the field of semiconductors, and it is possible to use atoms belonging to Group III in the periodic table (hereinafter "Group III atoms") capable of imparting p-type conductivity or atoms belonging to Group V in the periodic table (hereinafter "Group V atoms") capable of imparting n-type conductivity.

The Group III atoms may specifically include boron (B), aluminum (Al), gallium (Ga), indium (In) and thallium (T1). In particular, B, Al and Ga are preferable. The Group V atoms may specifically include phosphorus (P), arsenic (As), antimony (Sb) and bismuth (Bi). In particular, P and As are preferable.

The atoms (M) capable of controlling the conductivity, contained in the photoconductive layer, may be contained preferably in an amount of from $1\times10^{-3}$ to $5\times10^4$ atomic ppm, more preferably from $1\times10^{-2}$ to $1\times10^4$ atomic ppm, and most preferably from $1\times10^{-1}$ to $5\times10^3$ atomic ppm. In particular, in the case when carbon atoms (C) are contained in the photoconductive layer in an amount not more than $1\times10^3$ atomic ppm, the atoms (M) contained in the photoconductive layer should preferably be in an amount of from $1\times10^{-3}$ to $1\times10^3$ atomic ppm. In the case when carbon atoms (C) are contained in an amount more than $1\times10^3$ atomic ppm, the atoms (M) should preferably in an amount of from $1\times10^{-1}$ to $5\times10^4$ atomic ppm. Here, the atomic ppm indicates the percentage on the basis of the number of atoms.

In order to structurally introduce into the photoconductive layer the atoms capable of controlling the conductivity, e.g., Group III atoms or Group V atoms, a starting material for introducing Group III atoms or a starting material for introducing Group V atoms may be fed, when the layer is formed, into the reaction vessel in a gaseous state together with other gases used to form the photoconductive layer. Those which can be used as the starting material for introducing Group III atoms or starting material for introducing Group V atoms should be selected from those which are gaseous at normal temperature and normal pressure or at least those which can be readily gasified under conditions of the layer formation. Such a starting material for introducing Group III atoms may specifically include, as a material for introducing boron atoms, boron hydrides such as $B_2H_6$, $B_4H_{10}$, $B_5H_9$, $B_5H_{11}$, $B_6H_{10}$, $B_6H_{12}$ and $B_6H_{14}$, boron halides such as $BF_3$, $BCl_3$ and $BBr_3$. Besides, the material may also include $AlCl_3$, $GaCl_3$, $Ga(CH_3)_3$, $InCl_3$ and $TlCl_3$.

The material that can be effectively used in the present invention as the starting material for introducing Group V atoms may include, as a material for introducing phosphorus atoms, phosphorus hydrides such as $PH_3$ and $P_2H_4$ and phosphorus halides such as $PH_4I$, $PF_3$, $PF_5$, $PCl_3$, $PCl_5$, $PBr_3$, $PBr_5$ and $PI_3$. Besides, the material may also include $AsH_3$, $AsF_3$, $AsCl_3$, $AsBr_3$, $AsF_5$, $SbH_3$, $SbF_3$, $SbF_5$, $SbCl_3$, $SbCl_5$, $BiH_3$, $BiCl_3$ and $BiBr_3$.

These materials for introducing the atoms capable of controlling the conductivity may be optionally diluted with a gas such as $H_2$, He, Ar or Ne when used.

The photoconductive layer of the light receiving member according to the present invention may also contain at least one element selected from Group Ia, Group IIa, Group VIb and Group VIII atoms of the periodic table. Any of these elements may be evenly uniformly distributed in the photoconductive layer, or contained partly in such a way that they are evenly contained in the photoconductive layer but are distributed non-uniformly in the layer thickness direction. In either cases, however, it is necessary for them to be evenly contained in a uniform distribution in the in-plane direction parallel to the surface of the conductive substrate, which is necessary also in view of achieving uniform performance in the in-plane direction. The Group Ia atoms may specifically include lithium (Li), sodium (Na) and potassium (K); and the Group IIa atoms, beryllium (Be), magnesium (MG), calcium (Ca), strontium (Sr) and barium (Ba).

The Group VIb atoms may specifically include chromium (Cr), molybdenum (Mo) and tungsten (W); and the Group VIII atoms, iron (Fe), cobalt (Co) and nickel (Ni).

The temperature (Ts) of the conductive substrate may be appropriately selected from an optimum temperature range in accordance with the layer configuration. In usual instances, the temperature should preferably be in the range of from 20° to 500° C., more preferably from 50° to 480° C., and most preferably from 100° to 450° C.

The light receiving member of the present invention may be provided therein with a layer region in which its composition is continuously changed between the photoconductive layer and the surface layer. Providing such a layer region can bring about an improvement in adhesion between the layers.

The light receiving member of the present invention should preferably be provided, in the photoconductive layer on its side of the conductive substrate, with a layer region in which at least aluminum atoms, silicon atoms, carbon atoms and hydrogen atoms are non-uniformly contained in the layer thickness direction.

In the present invention, the deposited film including the photoconductive layer(s) is formed by vacuum deposition, appropriately selecting conditions for numerical values of film formation parameters so that the desired performances can be achieved. Specifically stated, the photoconductive layer can be formed by the glow discharge process including AC discharge CVD such as low-frequency CVD, high-frequency CVD or microwave CVD, or DC discharge CVD or AC discharge CVD. In order to form, for example, an nc(noncrystalline)-SiC:H photoconductive layer by the glow discharge process, basically an Si-feeding starting material gas, capable of feeding silicon atoms (Si), a C-feeding starting material gas, capable of feeding carbon atoms (C), and an H-feeding starting material gas, capable of feeding hydrogen atoms (H), may be fed into a reaction vessel the inside of which can be evacuated, in the state of a mixed gas with the desired proportion, and then glow discharge may be caused in the reaction vessel so that the layer comprising nc-SiC:H can be formed on the surface of a conductive substrate previously placed at a given position.

In the electrophotographic photosensitive member of the present invention, the deposited film formed on the substrate may be of any total thickness. The total thickness may preferably be in the range of from 5 μm to 100 μm, more preferably from 10 μm to 70 μm, and most preferably from 15 μm to 50 μm, within the range of which particularly good images can be obtained as an electrophotographic photosensitive member.

In the present invention, the discharge space may be under any pressure in the course of the formation of the deposited film. Particularly good results in view of charge stability and uniformity of the deposited film can be obtained particularly when the pressure is in the range of from 0.5 mtorr to 100 mtorr, and preferably from 1 mtorr to 50 mtorr.

In the present invention, at the time of the formation of the deposited film, the substrate may have a temperature of from 100° C. to 500° C., within the range of which the present invention can be effective. It has been confirmed to be very effective particularly when the temperature is in the range of from 150° C. to 450° C., preferably from 200° C. to 400° C., and most preferably from 250° C. to 350° C.

In the present invention, a means for heating the substrate may be comprised of any heating element so designed as to be used in vacuum, and may more specifically include electrical resistance heating elements such as a sheathed-heater wound heater, a plate heater and a ceramic heater, heat radiation lamp heating elements such as a halogen lamp and an infrared lamp, and heating elements comprising a heat-exchange means making use of liquid or gas as a heat transfer medium. As surface materials of the heating means, it is possible to use metals such as stainless steel, nickel, aluminum and copper, ceramics, and heat-resistant polymer resins. Besides these, a method can also be used in which-a container exclusively used for heating is installed separately from the reaction vessel and the substrate having been heated therein is carried into the reaction vessel in vacuum. In the present invention the means described above can be used alone or in combination.

In the present invention, energy for generating plasma may be any of DC, high-frequencies, microwaves, etc. Particularly when microwaves are used as the energy for generating plasma, the present invention can be more remarkably effective because the microwaves are absorbed on adsorbed water to make changes of interface more remarkable.

In the present invention, when microwaves are used for generating plasma, the microwaves may be at any power so long as discharge can be caused, and may be at a power of from 100 W to 10 kW, and preferably from 500 W to 4 kW, as being suitable for carrying out the present invention.

In the present invention, it is effective to apply a voltage (a bias voltage) to the discharge space in the course of the formation of deposited film and it is preferable for an electric field to extend in the direction in which positive ions collide against the substrate. The present invention may become seriously ineffective if no bias is applied at all. Hence, in order to make the present invention effective, a bias voltage with a DC component voltage of from 1 V to 500 V, and preferably from 5 V to 100 V, should be applied in the course of the formation of the deposited film.

In the present invention, when the microwaves are led into the reaction vessel through the dielectric window, materials usually used as materials for the dielectric window are alumina ($Al_2O_3$), aluminum nitride (AlN), boron nitride (BN), silicon nitride (SiN), silicon oxide ($SiO_2$), beryllium oxide (BeO), Teflon, and polystyrene, which are materials that may cause less loss of microwaves.

When deposited film is formed in the manner that the discharge space is surrounded with a plurality of substrates, the substrates may be arranged preferably at intervals of from 1 mm to 50 mm. The substrates may be in any number so long as the discharge space can be formed with them, and may suitably be three or more, and preferably four or more.

The present invention can be applied to any methods of manufacturing electrophotographic photosensitive members. In particular, the present invention can be greatly effective when the deposited film is formed in the manner that the substrates are so arranged as to surround the discharge space and the microwaves are led into it through the waveguide from the side of one ends of the substrate.

In the present invention, it is preferable to provide a surface layer on the photoconductive layer. The surface layer is greatly effective for improving durability, moisture resistance and charge performance.

The surface layer formed in the present invention may preferably be comprised of a non-monocrystalline material containing as constituent elements a silicon atom, a carbon atom, a hydrogen atom and optionally a halogen atom. The surface layer contains substantially no material that may control the conductivity like the material contained in the photoconductive layer.

Carbon atoms contained in the surface layer may be evenly uniformly distributed in that layer, or contained partly in such a way that they are evenly contained in that layer but are non-uniformly distributed in the layer thickness direction. In either cases, however, it is necessary for them to be evenly contained in a uniform distribution in the in-plane direction parallel to the surface of the conductive substrate, which is necessary also in view of achieving uniform performance in the in-plane direction.

The carbon atoms contained in the whole layer region of the surface layer formed in the present invention have an effect of making dark resistance higher and making hardness higher. The carbon atoms contained in the surface layer should be contained preferably in an amount of from 40 to 90 atomic %, more preferably from 45 to 85 atomic %, and most preferably from 50 to 80 atomic %.

Hydrogen atoms and halogen atoms contained in the surface layer formed in the present invention compensate unbonded arms present in the nc-SiC(H,X), have an effect of improving film quality, and decrease carriers trapped at the interface between the photoconductive layer and surface layer, so that smeared images can be better prevented. The halogen atoms also contribute an improvement in water repellency of the surface layer, and hence decrease even the high-humidity smear caused by adsorption of water vapor. The halogen atoms in the surface layer should be contained in an amount of not more than 20 atomic %. The hydrogen atoms and halogen atoms should be preferably in an amount of from 30 to 70 atomic %, more preferably from 35 to 65 atomic %, and most preferably from 40 to 60 atomic %, in total.

In the present invention, the surface layer may also contain at least one element selected from Group Ia, Group IIa, Group VIb and Group VIII atoms of the periodic table. Any of these elements may be evenly uniformly distributed in the photoconductive layer, or contained partly in such a way that they are evenly contained in the photoconductive layer but are distributed non-uniformly in the layer thickness direction. In either cases, however, it is necessary for them to be evenly contained in a uniform distribution in the in-plane direction parallel to the surface of the conductive substrate, which is necessary also in view of achieving uniform performance in the in-plane direction.

The Group Ia atoms may specifically include lithium (Li), sodium (Na) and potassium (K); and the Group IIa atoms, beryllium (Be), magnesium (Mg), calcium (Ca), strontium (Sr) and barium (Ba).

The Group VIb atoms may specifically include chromium (Cr), molybdenum (Mo) and tungsten (W); and the Group VIII atoms, iron (Fe), cobalt (Co) and nickel (Ni).

In the present invention, the surface layer should preferably have a layer thickness of from 0.01 to 30 μm, more preferably from 0.05 to 20 μm, and most preferably from 0.1 to 10 μm, in view of the advantages that the desired electrophotographic performance can be obtained and also an economical effect can be expected.

Gas pressure in the reaction vessel is also appropriately selected within an optimum range. It may preferably be in the range of from $1\times10^{-5}$ to 10 torr, more preferably from $5\times10^{-5}$ to 3 torr, and most preferably from $1\times10^{-4}$ to 1 torr.

In the present invention, the conductive-substrate temperature and gas pressure which are used in the formation of the surface layer may be in the above ranges as preferable ranges expressed in numerical values. In usual instances, these factors of layer formation are not independently or separately determinable, and optimum values of the respective factors of layer formation should be determined on the basis of mutual and systematic relativity so that a surface layer having the desired performance can be formed.

In the present invention, energy for generating plasma may be any of DC, high-frequencies, microwaves, etc. Particularly when microwaves are used as the energy for generating plasma, the present invention can be more remarkably effective because the microwaves are absorbed on adsorbed water to make changes of interface more remarkable.

In the present invention, when microwaves are used for generating plasma, the microwaves may be at any power so long as discharge can be caused, and may be at a power of from 100 W to 10 kW, and preferably from 500 W to 4 kW, as being suitable for carrying out the present invention.

The present invention can be applied to any methods of manufacturing electrophotographic photosensitive members. In particular, the present invention can be greatly effective when the deposited film is formed in the manner that the substrates are so arranged as to surround the discharge space and the microwaves are led into it through the waveguide from the side of one ends of the substrate.

Figure 6:
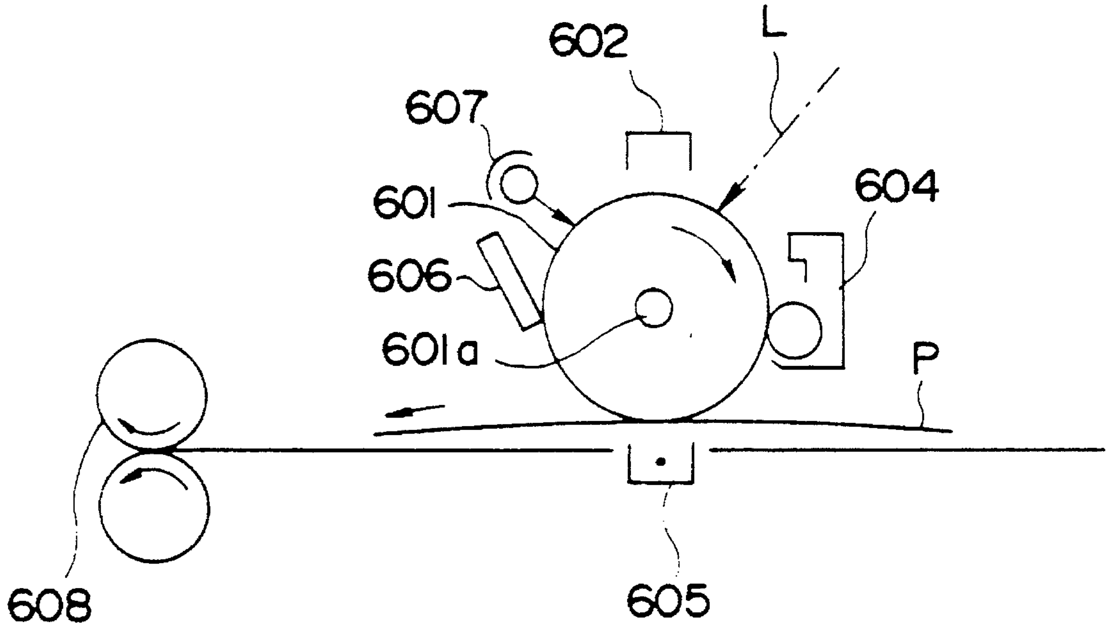
FIG. 6 is a schematic constitution to illustrate a commonly available transfer type electrophotographic apparatus.

FIG. 6 schematically illustrates an example of the constitution of a transfer electrophotographic apparatus in which the drum photosensitive member manufactured according to the method of the present invention is used.

In FIG. 6, an electrophotographic photosensitive member 601 serving as an image bearing member, which is rotated around a shaft 601*a* at a given peripheral speed in the direction shown by arrow. In the course of rotation, this electrophotographic photosensitive member 601 is uniformly charged on its periphery, with positive or negative given potential by the operation of a charging means 602, and then photoimagewise exposed to light L (slit exposure, laser beam scanning exposure, etc.) at an exposure zone by the operation of an imagewise exposure means (not shown). As a result, electrostatic latent images corresponding to the exposure images are successively formed on the periphery of the photosensitive member.

The electrostatic latent images thus formed are subsequently developed by toner by the operation of a developing means 604. The resulting toner-developed images are then successively transferred by the operation of a transfer means 605, to the surface of a transfer medium P fed from a paper feed section (not shown) to the part between the photosensitive member 601 and the transfer means 605 in the manner synchronized with the rotation of the photosensitive member 601.

The transfer medium P on which the images have been transferred is separated from the surface of the photosensitive member and led through an image-fixing means 608, where the images are fixed and then delivered to the outside as a transcript (a copy).

The surface of the photosensitive member 601 after the transfer of images is brought to removal of the toner remaining after the transfer, using a cleaning means 606, and further subjected to charge elimination by a pre-exposure means 607, and then repeatedly used for the formation of images.

The charging means 602 for giving charge on the photosensitive member 601 include corona chargers, which are commonly put into wide use. As the transfer means 605, corona transfer units are also commonly put into wide use.

The electrophotographic apparatus may be constituted of a combination of plural components joined as one device unit from among the constituents such as the above photosensitive member, developing means and cleaning means so that the unit can be freely mounted on or detached from the body of the apparatus. Here, the above device unit may be so constituted as to be joined together with the charging means and/or the developing means.

In the case when the electrophotographic apparatus is used as a copying machine or a printer, the photosensitive member is exposed to optical image exposing light L by irradiation with light reflected from, or transmitted through, an original, or by the scanning of a laser beam, the driving of an LED array or the driving of a liquid crystal shutter array according to signals obtained by reading an original with a sensor and converting the information into signals.

Figure 7:
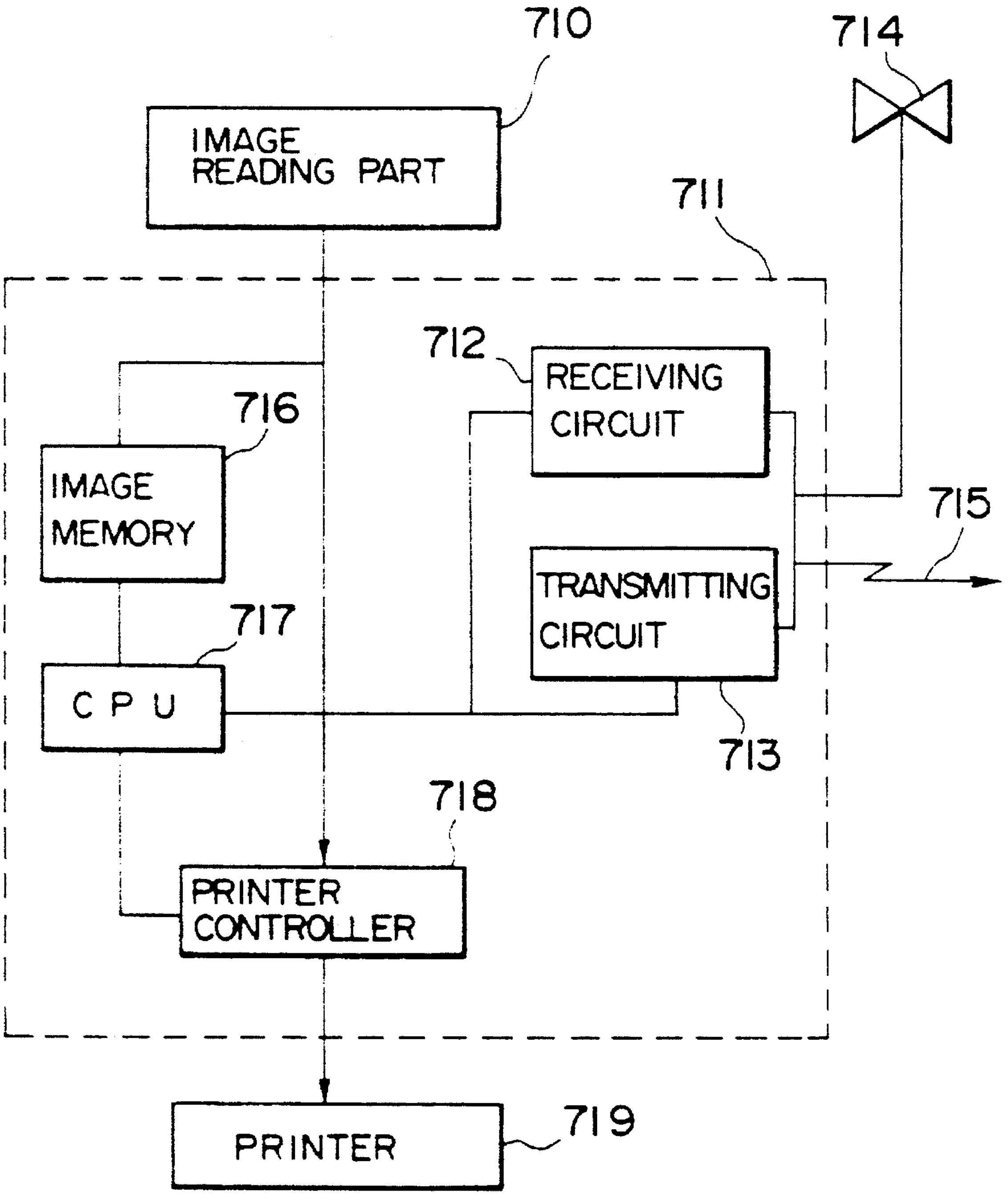
FIG. 7 is a block diagram to show an example of a facsimile system in which the electrophotographic apparatus shown in FIG. 6 is used as a printer of an image processing apparatus.

When used as a printer of a facsimile machine, the optical image exposing light L serves as exposing light used for the printing of received data. FIG. 7 illustrates an example thereof in the form of a block diagram.

As shown in FIG. 7, a controller 711 controls an image reading part 710 and a printer 719. The whole of the controller 711 is controlled by CPU 717. Image data outputted from the image reading part is sent to the other facsimile station through a transmitting circuit 713. Data received from the other station is sent to a printer 719 through a receiving circuit 712. Given image data are stored in an image memory 716. A printer controller 718 controls the printer 719. Reference numeral 714 denotes a telephone.

An image received from a circuit 715 (image information from a remote terminal connected through the circuit) is demodulated in the receiving circuit 712, and then successively stored in an image memory 716 after the image information is decoded by the CPU 717. Then, when images for at least one page have been stored in the memory 716, the image recording for that page is carried out. The CPU 717 reads out the image information for one page from the memory 716 and sends the coded image information for one page to the printer controller 718. The printer controller 718, having received the image information for one page from the CPU 717, controls the printer 719 so that the image information for one page is recorded.

The CPU 717 receives image information for next page in the course of the recording by the printer 719.

Images are received and recorded in this way.

The electrophotographic photosensitive member manufactured by the method of the present invention can be not only utilized in electrophotographic copying machines but also widely used in the field to which electrophotography is applied, as exemplified by laser beam printers, CRT printers, LED printers, liquid crystal printers and laser plate-making machines.

The present invention will be specifically described below by giving Experiments. The present invention is by no means limited by these.

Experiment 1

The surface of a cylindrical substrate of 108 mm in diameter, 358 mm in length and 5 mm in wall thickness, made of aluminum with a purity of 99.5%, was cut in the same manner as the example of the method of manufacturing an electrophotographic photosensitive member according to the present invention, previously described. Then, 15 minutes after the cutting was completed, the substrate surface was pretreated using the surface treatment apparatus as shown in FIG. 2, under conditions as shown in Table 1.

Figure 8:
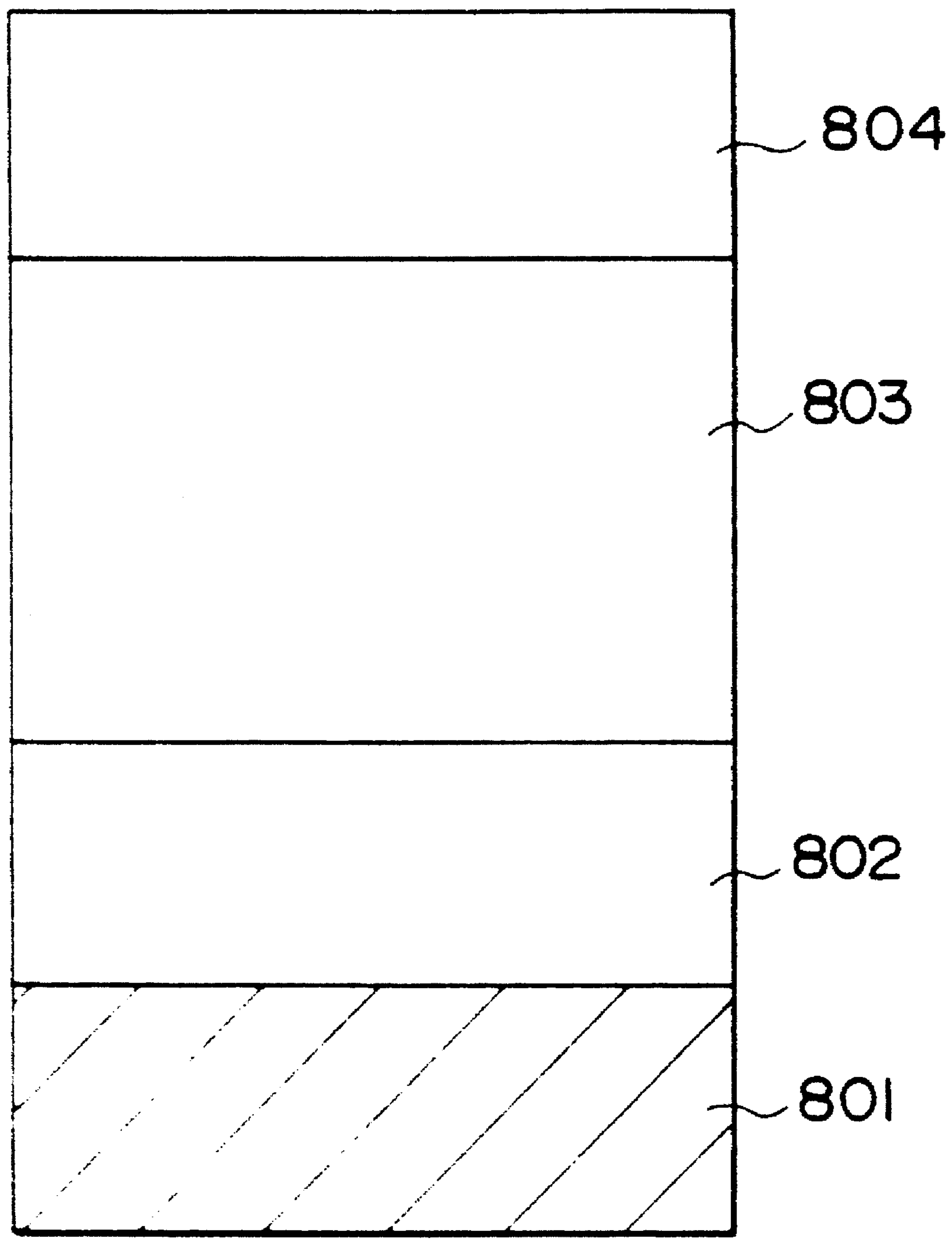
FIG. 8 is a schematic cross-section to illustrate a preferred example of the layer structure of an electrophotographic photosensitive member.

Thereafter, using the deposited film forming apparatus as shown in FIGS. 3 and 4, an amorphous silicon deposited film was formed on the substrate under conditions as shown in Table 2. Blocking type electrophotographic photosensitive members with the layer structure as shown in FIG. 8 were thus produced. In FIG. 8, reference numerals 801, 802, 803 and 804 denotes an aluminum substrate, a charge injection blocking layer (hereinafter simply "charge blocking layer"), a photoconductive layer and a surface layer, respectively.

In the present Experiment, the water-spray pressure in the step of pretreatment was varied to produce amorphous silicon electrophotographic photosensitive members. Electrophotographic performances of the electrophotographic photosensitive members thus produced were evaluated in the following way: The electrophotographic photosensitive members produced were each set in a copying machine modified for experimental purpose from a copier NP7550, manufactured by Canon Inc. A voltage of 6 kV was applied to its charge assembly to effect corona charging. Images were formed on transfer sheets by a conventional copying process, and their image quality was evaluated in the following manner. Evaluation was made for each 10 electrophotographic photosensitive members produced in this way under the same production conditions. Results of evaluation are shown in Table 3.

Evaluation on uneven image

An A3 sheet of graph paper (available from Kokuyo Co., Ltd.) is placed on the original glass plate of the copying machine. An iris diaphragm of the copying machine is changed to vary the amount of exposure on the original so as to obtain images with variation in the range of from an image on which graph lines are barely recognizable to an image the white background area of which begins to fog. Thus 10 sheets of copies with different densities are taken. These images are observed at a distance of 50 cm from eyes to examine whether or not any difference in density is recognizable. Evaluation is made according to the following criterions.

AA: No uneven images are seen on all copies.

A: Uneven images are seen on some copies, all of which, however, are so slight that there is no problem at all.

B: Uneven images are seen on all copies. On at least one copy, however, uneven images are so slight that there is no problem in practical use.

C: Serious uneven images are seen on all copies.

Evaluation on pear-skin appearance

An original with halftone on the whole surface is placed on the original glass plate of the copying machine, and images are reproduced in such a way that the images obtained by copying the original has a density of 0.3±0.1. These images are observed at a distance of 50 cm from eyes to examine whether or not any pear-skin appearance is recognizable. Evaluation is made according to the following criterions.

AA: No pear-skin appearance is seen on all copies.

A: Slight pear-skin appearances are partly seen, but so slightly that there is no problem at all.

B: Pear-skin appearances are seen on all copies, but so slightly in greater part that there is no problem in practical use.

C: Pear-skin appearances are greatly seen on all copies.

Comparative Experiment 1

Figure 9:
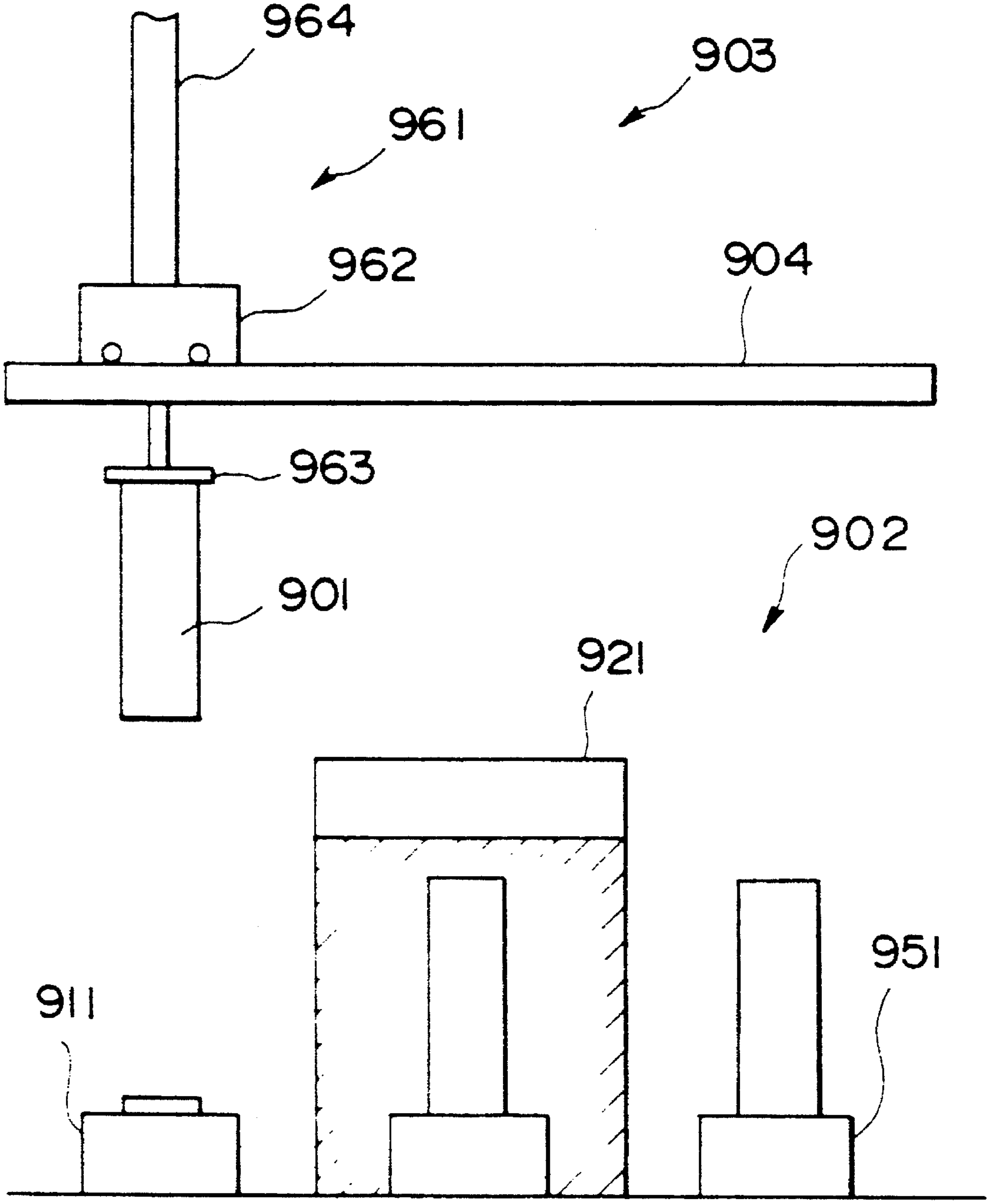
FIG. 9 is a schematic cross-section of a cleaning apparatus used to clean a substrate as a pretreatment for the formation of a deposited film.

The same substrate as used in Experiment 1 was cut in the same manner. After the cutting was completed, the substrate surface was treated using the substrate surface cleaning apparatus as shown in FIG. 9. The substrate cleaning apparatus shown in FIG. 9 has a treatment zone 902 and a substrate transport mechanism 903. The treatment zone 902 has a substrate feed stand 911, a substrate cleaning bath 921 and a substrate carry-out stand 951. The cleaning bath 921 is provided with a thermostat (not shown) for maintaining liquid temperature at a constant level. The transport mechanism 903 is comprised of a transport rail 965 and a transport arm 961. The transport arm 961 is comprised of a moving mechanism 962 that moves on the rail 965, a chucking mechanism 963 that holds a substrate 901 and an air cylinder 964 that upward-downward moves the chucking mechanism 963.

After the cutting, the substrate 901 placed on the feed stand 911 is transported into the cleaning bath 921 by means of the transport mechanism 903. Trichloroethane (trade name: ETHANA VG; available from Asahi Chemical Industry Co., Ltd.) contained in the cleaning bath 921 cleans the substrate to remove cutting oil and cuttings adhered to its surface.

After the cleaning, the substrate 901 is carried onto the carry-out stand 951 by means of the transport mechanism 903.

Thereafter, on the substrate, an amorphous silicon deposited film was formed using the deposited film forming apparatus as shown in FIGS. 3 and 4, under conditions previously shown in Table 2. Blocking type electrophotographic photosensitive members with the layer structure as shown in FIG. 8 were thus produced in the same manner as in Experiment 1.

Performances of the electrophotographic photosensitive members produced in this way were evaluated in the same manner as in Experiment 1 to obtain the results shown in Table 3 as a comparative test example. As is clear from Table 3, the electrophotographic photosensitive members produced by the electrophotographic photosensitive member manufacturing method according to the present invention brought about very good results in respect of the uneven image when the hydraulic pressure during the water treatment was in the range of from 2 kg·f/cm$^2$ to 300 kg·f/cm$^2$.

Experiment 2

The same substrate as used in Experiment 1 was cut in the same manner. Then, 15 minutes after the cutting was completed, the substrate surface was pretreated using the surface treatment apparatus as shown in FIG. 2, under conditions as shown in Table 5.

Thereafter, using the deposited film forming apparatus as shown in FIGS. 3 and 4, an amorphous silicon deposited film was formed on the substrate under conditions as shown in Table 2. Blocking type electrophotographic photosensitive members with the layer structure as shown in FIG. 8 were thus produced.

In the present Experiment, the water temperature in the water treatment was varied, and the appearances of the electrophotographic photosensitive members thus produced were visually examined to make evaluation on peel-off. Subsequently, the photosensitive members were each set in the modified machine of a copier NP7550, manufactured by Canon Inc., and copies were taken to make evaluation on uneven images in the same manner as in Experiment 1. Results thus obtained are shown in Table 6.

Performances of the electrophotographic photosensitive members produced in the comparative experiment were also evaluated in the same way to obtain the results shown together in Table 6 as a comparative test example.

Evaluation on peel-off

The whole surfaces of 10 electrophotographic photosensitive members produced under the same conditions are visually observed to make evaluation on peel-off of deposited films according to the following criterions.

AA: No peel-off of deposited films is seen at all on all photosensitive members.

A: Only slight peel-off is seen on edges.

B: Peel-off is seen in all photosensitive members, but only on non-image areas, and there is no problem in practical use.

C: Serious film peel-off is seen.

As is clear from Table 6, the electrophotographic photosensitive members produced by the electrophotographic photosensitive member manufacturing method according to the present invention brought about very good results in respect of image quality when the water temperature was in the range of from 10° C. to 90° C.

Experiment 3

The same substrate as used in Experiment 1 was cut in the same manner. Then, 15 minutes after the cutting was completed, the substrate surface was pretreated using the surface treatment apparatus as shown in FIG. 2, under conditions as shown in Table 7.

Thereafter, using the deposited film forming apparatus as shown in FIGS. 3 and 4, an amorphous silicon deposited film was formed on the substrate under conditions as shown in Table 2. Blocking type electrophotographic photosensitive members with the layer structure as shown in FIG. 8 were thus produced.

In the present Experiment, the water quality (resistivity) of the pure water used in the water treatment was varied. Electrophotographic photosensitive members obtained by varying the water resistivity were each set in the modified machine of a copier NP7550, manufactured by Canon Inc., and copies were taken to make evaluation on uneven images in the same manner as in Experiment 1, and on black spots in the following manner. Evaluation was made for each 10 electrophotographic photosensitive members produced in this way under the same production conditions. Results of evaluation are shown in Table 8.

Performances of the electrophotographic photosensitive members produced in the comparative experiment were also evaluated in the same way to obtain the results shown together in Table 8 as a comparative test example.

Evaluation on black spots

An original with halftone on the whole surface is placed on the original glass plate of the copying machine, and images are reproduced in such a way that the images obtained by copying the original has a density of 0.3±0.1.

These images are observed at a distance of 50 cm from eyes to examine whether or not any black spots are recognizable. Evaluation is made according to the following criterions.

AA: No black spots are seen at all on all copies.

A: Only slight black spots are seen on some copies, but are so slight that there is no problem at all.

B: Black spots are seen on all copies, but so slight that there is no problem in practical use.

C: Large black spots are seen on all copies.

As is clear from Table 8, the electrophotographic photosensitive members produced by the electrophotographic photosensitive member manufacturing method according to the present invention brought about very good results in respect of image quality when the water resistivity was 16 MΩ·cm or higher.

The present invention will be described below in greater detail by giving Examples and Comparative Examples.

EXAMPLE 1

The surface of a cylindrical substrate of 108 mm in diameter, 358 mm in length and 5 mm in wall thickness, made of aluminum with a purity of 99.5%, was cut in the same manner as the example of the method of manufacturing an electrophotographic photosensitive member according to the present invention, previously described. Then, 15 minutes after the cutting was completed, the substrate surface. was pretreated using the surface treatment apparatus as shown in FIG. 2, under conditions as shown in Table 9.

Thereafter, using the deposited film forming apparatus as shown in FIGS. 3 and 4, an amorphous silicon deposited film was formed on the substrate under conditions as shown in Table 2. Blocking type electrophotographic photosensitive members with the layer structure as shown in FIG. 8 were thus produced.

Electrophotographic performances of electrophotographic photosensitive members produced in this way were evaluated in the following way. Here, evaluation was made for each 10 photosensitive members produced under the same conditions for the film formation.

The appearances of the electrophotographic photosensitive members produced in this way were visually observed to examine whether or not any peel-off occurred. Thereafter, the photosensitive members were each set in a copying machine modified for experimental purpose from a copier NP7550, manufactured by Canon Inc. Images were formed on transfer sheets by a conventional copying process, and their image quality was evaluated in the following manner. Here, a voltage of 6 kV was applied to its charge assembly to effect corona charging. Results of evaluation are shown in Table 10 as "Present Invention".

Uneven image

Evaluated in the same manner as in Experiment 1 according to the same criterions.

Pear-skin appearance

Evaluated in the same manner as in Experiment 1 according to the same criterions.

Peel-off

Evaluated in the same manner as in Experiment 2 according to the same criterions.

Black spots

Evaluated in the same manner as in Experiment 3 according to the same criterions.

White dots

Evaluation is made on the basis of the number of white dots present in the same areas of image samples obtained when a black original is placed on the original glass plate and copied.

AA: Good.

A: Small white dots are present in part.

B: White dots are present on the whole area, but there is no difficulty in reading characters.

C: White dots are so many that characters are difficult to read.

Fine-line reproduction

A usual original with a white background having characters on its whole area is placed on the original glass plate and copies are taken to obtain image samples, which are observed to examine whether or not the fine lines on the image are continuous without break-off. When unevenness is seen on the image during this evaluation, the evaluation is made on the whole-area image region and the results are given in respect of the worst area.

AA: Good.

A: Lines are broken off in part.

B: Lines are broken off at many portions, but can be read as characters.

C: Some characters can not be read as characters.

White-background fogging

A usual original with a white background having characters on its whole area is placed on the original glass plate and copies are taken to obtain image samples, which are observed to examine whether or not fogging has occurred on the white background.

AA: Good.

A: Fogging is seen in part.

B: Fogging is seen over the whole area, but there is no difficulty in reading characters.

C: Fogging is so serious as to make characters difficult to read.

Comparative Example 1

The same substrate as used in Example 1 was cut in the same manner. Using the substrate surface cleaning apparatus as shown in FIG. 9, the substrate surface was cleaned by the conventional method under conditions as shown in Table 4.

Thereafter, using the deposited film forming apparatus as shown in FIG. 1, an amorphous silicon deposited film was formed on the substrate under conditions as shown in Table 11. Blocking type electrophotographic photosensitive members with the layer structure as shown in FIG. 8 were thus produced in the same manner as in Example 1.

Performances of the electrophotographic photosensitive members thus obtained were evaluated in the same manner as in Example 1 to obtain the results as shown in Table 10 as "Comparative Example 1". Compared with the electrophotographic photosensitive members of Comparative Example 1, the electrophotographic photosensitive members produced according to the electrophotographic photosensitive member manufacturing method of the present invention brought about very good results on all items shown in the table.

EXAMPLE 2

With layer structure different from that in Example 1, electrophotographic photosensitive members were produced by the electrophotographic photosensitive member manufacturing method of the present invention.

The same substrate as used in Example 1 was cut in the same manner. Then, 15 minutes after the cutting was completed, the substrate surface was pretreated using the surface treatment apparatus as shown in FIG. 2, under conditions as shown in Table 9.

Thereafter, using the deposited film forming apparatus as shown in FIGS. 3 and 4, an amorphous silicon deposited film was formed on the substrate under conditions as shown in Table 12. Blocking type electrophotographic photosensitive members with the layer structure as shown in FIG. 10 were thus produced.

Figure 10:
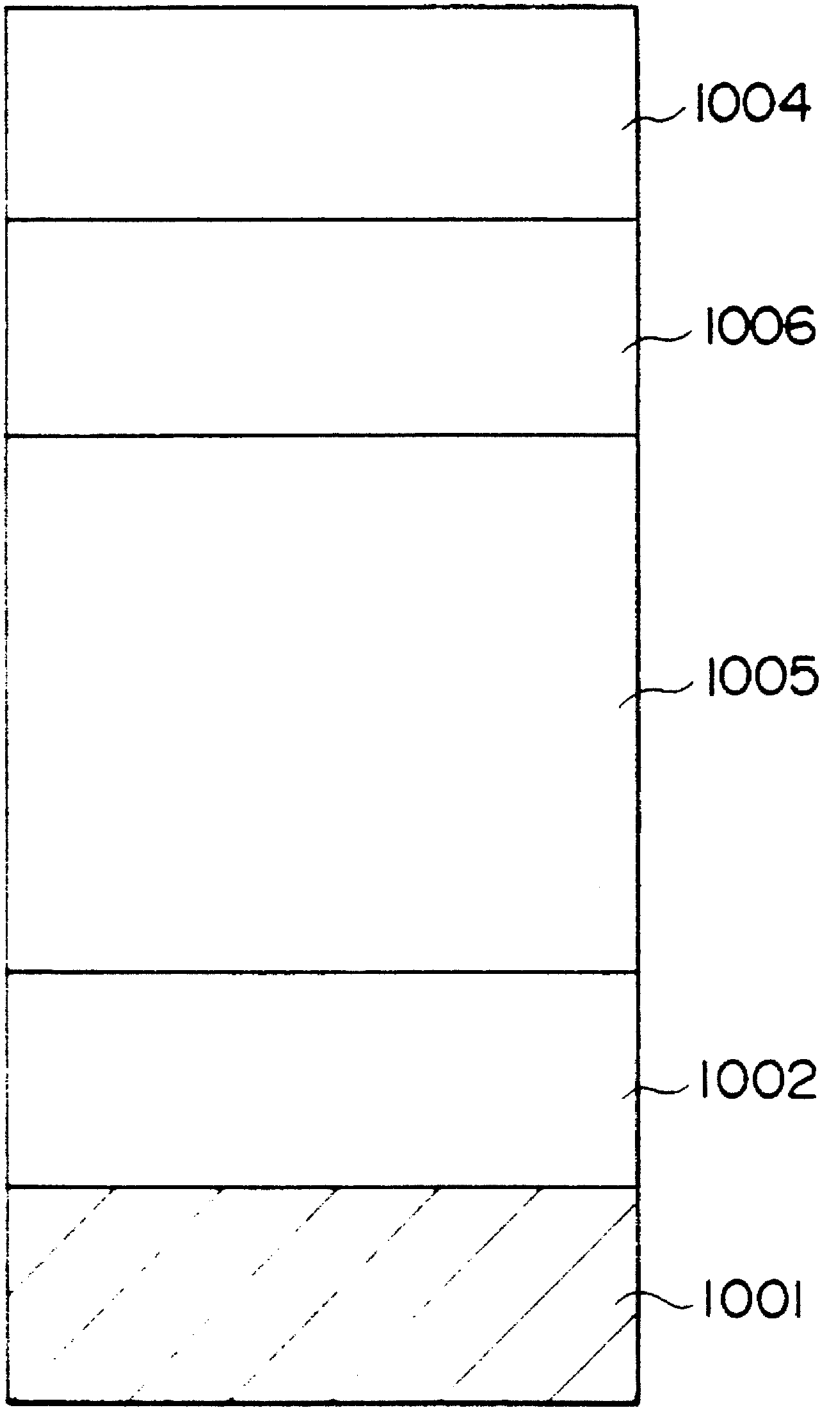
FIG. 10 is a schematic cross-section to illustrate an example of the layer structure of a preferred electrophotographic photosensitive member.

In FIG. 10, reference numeral 1001 denotes an aluminum substrate; 1002, a charge blocking layer; 1005, a charge transport layer; 1006, a charge generation layer; and 1004, a surface layer.

Performances of the electrophotographic photosensitive members thus obtained were evaluated in the same manner as in Example 1. As a result, in the present Example also, the electrophotographic photosensitive members produced according to the electrophotographic photosensitive member manufacturing method of the present invention brought about very good results on all items like Example 1.

EXAMPLE 3

The same substrate as used in Experiment 1 was cut in the same manner. Then, 15 minutes after the cutting was completed, the substrate surface was pretreated using the surface treatment apparatus as shown in FIG. 2, under conditions as shown in Table 9.

Thereafter, using the deposited film forming apparatus as shown in FIG. 1, an amorphous silicon deposited film was formed on the substrate in the following manner under conditions as shown in Table 11. Blocking type electrophotographic photosensitive members with the layer structure as shown in FIG. 8 were thus produced.

In FIG. 1, a reaction vessel 101 is comprised of a base plate 102, a wall 103 and a top plate 104. Inside this reaction vessel 101, an electrode 105 (cathode) is provided. A substrate 106 on which the amorphous silicon deposited film is formed is disposed at the center of the cathode 105 and serves also as anode.

To form the amorphous silicon deposited film on the substrate 106 using this deposited film forming apparatus, firstly a starting material gas inlet valve 107 and a leak valve 108 are closed and an exhaust valve 109 is opened to evacuate the reaction vessel 101. At the time when a vacuum indicator points to about $5\times10^{-6}$ torr, the starting material gas inlet valve 107 is opened to allow starting material gases as exemplified by $SiH_4$ gas and other gas adjusted to a given mixing ratio in a gas flow controller 111, to flow into the reaction vessel 301. Then, after the surface temperature of the substrate 106 has been confirmed to be set at a given temperature by means of a heater 112, a high-frequency power source 113 set to the desired power is switched on to generate glow discharge in the reaction vessel 301.

During the formation of the deposited film, the substrate 106 is rotated at a constant speed by means of a motor 114. In this way the amorphous silicon deposited film can be formed on the substrate 106.

Performances of the electrophotographic photosensitive members thus obtained were evaluated in the same manner as in Example 1. As a result, in the present Example also, the electrophotographic photosensitive members produced according to the electrophotographic photosensitive member manufacturing method of the present invention brought about very good results on all items like Example 1.

EXAMPLE 4

The surface of a cylindrical substrate of 108 mm in diameter, 358 mm in length and 5 mm in wall thickness, made of aluminum with a purity of 99.5%, was cut in the same manner as the example of the method of manufacturing an electrophotographic photosensitive member according to the present invention, previously described. Then, 15 minutes after the cutting was completed, the substrate surface was pretreated using the surface treatment apparatus as shown in FIG. 2, under conditions as shown in Table 13.

In the present Example, trichloroethane, used in the precleaning, was replaced with a neutral detergent (trade name: CONTAMINONN; available from Wako Pure Chemical Industries, Ltd.) to remove cutting oil and cuttings.

Thereafter, using the deposited film forming apparatus as shown in FIGS. 3 and 4, an amorphous silicon deposited film was formed on the substrate under conditions as shown in Table 2. Blocking type electrophotographic photosensitive members with the layer structure as shown in FIG. 8 were thus produced.

Performances of the electrophotographic photosensitive members thus obtained were evaluated in the same manner as in Example 1. As a result, in the present Example also, the electrophotographic photosensitive members produced according to the electrophotographic photosensitive member manufacturing method of the present invention brought about very good results on all items like Example 1.

Experiment 4

The surface of a cylindrical substrate of 108 mm in diameter, 358 mm in length and 5 mm in wall thickness, made of aluminum with a purity of 99.5%, was cut in the same manner as the example of the method of manufacturing an electrophotographic photosensitive member according to the present invention, previously described. Then, 15 minutes after the cutting was completed, the substrate surface. was pratrested using the surface treatment apparatus as shown in FIG. 2, under conditions as shown in Table 14. In the present Experiment, an aqueous solution of 1% by weight polyethylene glycol nonyl phenyl ether was used as the surfactant.

Thereafter, using the deposited film forming apparatus as shown in FIGS. 3 and 4, an amorphous silicon deposited film was formed on the substrate under conditions as shown in Table 15. Blocking type electrophotographic photosensitive members were thus produced, with the layer structure as shown in FIG. 8, made of an aluminum substrate 801, a charge blocking layer 802, a photoconductive layer 803 and a surface layer 804 successively laminated in this order.

In the present Experiment, the output of ultrasonic waves in the cleaning step was varied to produce electrophotographic photosensitive members. The cleaning bath used was made of a stainless steel container with which κ-type ferrite oscillators were brought into contact. When the experiment was carried out at a high output, the output of each respective oscillator was raised end at the same time the number of the oscillators thus provided was increased if necessary. In the present Experiment, the cleaning fluid was used in an amount of 100 liters.

Electrophotographic performances of the electrophotographic photosensitive members thus produced were evaluated in the following way. The electrophotographic photosensitive members produced were each set in a copying machine modified for experimental purpose from a copier NP7550, manufactured by Canon Inc. A voltage of 6 kV was applied to its charge assembly to effect corona charging.

Images were formed on copy sheets by a conventional copying process, and their image quality was evaluated in the following manner. Evaluation was made for each 10 electrophotographic photosensitive members produced in this way under the same production conditions. Results of evaluation are shown in Table 16.

Evaluation on uneven image

An A3 sheet of graph paper (available from Kokuyo Co., Ltd.) is placed on the original glass plate of the copying machine. An iris diaphragm of the copying machine is changed to vary the amount of exposure on the original so as to obtain images with variation in the range of from an image on which graph lines are barely recongnizable to an image the white background area of which begins to fog. Thus 10 sheets of copies with different densities are taken. These images are observed at a distance of 40 cm from eyes to examine whether or not any difference in density is recognizable. Evaluation is made according to the following criterions.

AA: No uneven images are seen on all copies.

A: Uneven images are seen on some copies, all of which, however, are so slight that there is no problem at all.

B: Uneven images are seen on all copies.

However, uneven images are so slight in greater part that there is no problem in practical use.

C: Serious uneven images are seen on all copies.

Evaluation on white spots

An original with halftone on the whole surface is placed on the original glass plate of the copying machine, and images are reproduced in such a way that the images obtained by copying the original has an average density of 0.4±0.1.

These images are observed at a distance of 40 cm from eyes to examine whether or not any white spots are recognizable. Evaluation is made according to the following criterions.

AA: No white spots are seen at all on all copies.

A: Only slight white spots are seen on some copies, but are so slight that there is no problem at all.

B: White spots are seen on all copies, but so slight in greater part that there is no problem in practical use.

C: Large white spots are seem on all copies.

Comparative Experiment 2

The same substrate as used in Experiment 4 was cut in the same manner. After the cutting was completed, the substrate surface was treated using the substrate surface cleaning apparatus as shown in FIG. 9, under conditions as shown in Table 17.

After the cutting, the substrate 901 placed on the feed stand 911 is transported into the cleaning bath 921 by means of the transport mechanism 903. The cleaning solution mainly consisting of trichloroethane (trade name: ETHANA VG; available from Asahi Chemical Industry Co., Ltd.) contained in the cleaning bath 921 cleans the substrate to remove cutting oil and cuttings adhered to its surface.

After the cleaning, the substrate 901 is carried onto the transport stand 951 by means of the transport mechanism 903.

Thereafter, on the substrate, an amorphous silicon deposited film was formed using the deposited film forming apparatus as shown in FIGS. 3 and 4, under conditions shown in Table 15. Blocking type electrophotographic photosensitive members with the layer structure as shown in FIG. 8 were thus produced in the same manner as in Experiment 4.

Performances of the electrophotographic photosensitive members produced in this way were evaluated in the same manner as in Experiment 4 to obtain the results shown in Table 16 as a comparative test example. As is clear from Table 16, the electrophotographic photosensitive members produced by the electrophotographic photosensitive member manufacturing method according to the present invention brought about very good results in respect of the uneven image and white dots when the output of ultrasonic waves in the cleaning step was in the range of from 0.1 W/liter to 500 W/liter.

Experiment 5

The same substrate as used in Experiment 4 was cut in the same manner. Then, 15 minutes after the cutting was completed, the substrate surface was pretreated using the surface treatment apparatus as shown in FIG. 2, under conditions as shown in Table 18.

Thereafter, using the deposited film forming apparatus as shown in FIGS. 3 and 4, an amorphous silicon deposited film was formed on the substrate under conditions as shown in Table 15. Blocking type electrophotographic photosensitive members with the layer structure as shown in FIG. 8 were thus produced in the same way as in Experiment 4.

In the present Experiment, the frequency of ultrasonic waves in the cleaning step was varied. Performances of the electrophotographic photosensitive members thus produced were evaluated in the same manner as in Experiment 4. Results thus obtained are shown in Table 19. As is clear from Table 19, the electrophotographic photosensitive members produced by the electrophotographic photosensitive member manufacturing method according to the present invention brought about very good results in respect of uneven image and white dots when the frequency of ultrasonic waves in the cleaning step was in the range of from 20 kHz to 10 MHz.

Experiment 6

The same substrate as used in Experiment 4 was cut in the same manner. Then, 15 minutes after the cutting was completed, the substrate surface was pretreated using the surface treatment'apparatus as shown in FIG. 2, under conditions as shown in Table 20.

Thereafter, using the deposited film forming apparatus as shown in FIGS. 3 and 4, an amorphous silicon deposited film was formed on the substrate under conditions as shown in Table 15. Blocking type electrophotographic photosensitive members with the layer structure as shown in FIG. 8 were thus produced.

In the present Experiment, the water temperature in the pure-water contact treatment was varied, and the appearances of the electrophotographic photosensitive members thus produced were visually examined to make evaluation on peel-off. Subsequently, the photosensitive members were each set in the modified machine of a copier NP7550, manufactured by Canon Inc, and copies were taken to make evaluation on uneven images in the same manner as in Experiment 4. Results thus obtained are shown in Table 21.

Performances of the electrophotographic photosensitive members produced in Comparative Experiment 2 were also evaluated in the same way to obtain the results shown together in Table 21 as a comparative test example.

Evaluation on peel-off

The whole surfaces of 10 electrophotographic photosensitive members preduced under the same conditions are visually observed to make evaluation on peel-off of deposited films according to the following criterions.

AA: No peel-off of deposited films is seen at all on all photosensitive members.

A: Only slight peel-off is seen on edges.

B: Peel-off is seen in all photosensitive members, but only on non-image areas, and there is no problem in practical use.

C: Serious film peel-off is seen.

As is clear from Table 21, the electrophotographic photosensitive members produced by the electrophotographic photosensitive member manufacturing method according to the present invention brought about very good results in respect of image quality when the temperature in the pure-water contact step was in the range of from 5° C. to 90° C.

Experiment 7

The same substrate as used in Experiment 4 was cut in the same manner. Then, 15 minutes after the cutting was completed, the substrate surface was pretreated using the surface treatment apparatus as shown in FIG. 2, under conditions as shown in Table 22.

Thereafter, using the deposited film forming apparatus as shown in FIGS. 3 and 4, an amorphous silicon deposited film was formed on the substrate under conditions as shown in Table 15. Blocking type electrophotographic photosensitive members with the layer structure as shown in FIG. 8 were thus produced.

In the present Experiment, the water quality (resistivity) of the pure water used in the water contact treatment was varied. Electrophotographic photosensitive members obtained by varying the water resistivity were each set in the modified machine of a copier NP7550, manufactured by Canon Inc, and copies were taken to make evaluation on uneven images in the same manner as in Experiment 4, and on white spots in the following manner. Evaluation was made for each 10 electrophotographic photosensitive members produced in this way under the same production conditions. Results of evaluation are shown in Table 23.

Performances of the electrophotographic photosensitive members produced in Comparative Experiment 2 were also evaluated in the same way to obtain the results shown together in Table 23 as a comparative test example.

As is clear from Table 23, the electrophotographic photosensitive members produced by the electrophotographic photosensitive member manufacturing method according to the present invention brought about very good results in respect of image quality when the pure water resistivity used in the pure water contact treatment step was 10 MΩ·cm or higher.

Experiment 8

The same substrate as used in Experiment 4 was cut in the same manner. Then, 15 minutes after the cutting was completed, the substrate surface was pretreated using the surface treatment apparatus as shown in FIG. 2, under conditions as shown in Table 24.

Thereafter, using the deposited film forming apparatus as shown in FIGS. 3 and 4, an amorphous silicon deposited film was formed on the substrate under conditions as shown in Table 15. Blocking type electrophotographic photosensitive members with the layer structure as shown in FIG. 8 were thus produced.

In the present Experiment, the water-spray pressure in the pure-water contact step was varied to produce amorphous silicon electrophotographic photosensitive members. The electrophotographic photosensitive members thus produced were each set in the modified machine of a copier NP7550, manufactured by Canon Inc., and copies were taken to make evaluation on uneven images in the same manner as in Experiment 4, and on pear-skin appearances in the following manner. Evaluation was made for each 10 electrophotographic photosensitive members produced in this way under the same production conditions. Results of evaluation are shown in Table 25.

Performances of the electrophotographic photosensitive members produced in Comparative Experiment 2 were also evaluated in the same way to obtain the results shown together in Table 25 as a comparative test example.

Evaluation on pear-skin appearance

An original with halftone on the whole surface is placed on the original glass plate of the copying machine, and images are reproduced in such a way that the images obtained by copying the original has an average density of 0.4±0.1. These images are observed at a distance of 40 cm from eyes to examine whether or not any pear-skin appearance is recognizable. Evaluation is made according to the following criterions.

AA: No pear-skin appearance is seen on all copies.

A: Slight pear-skin appearances are partly seen, but so slightly that there is no problem at all.

B: Pear-skin appearances are seen on all copies, but so slightly in greater part that there is no problem in practical use.

C: Pear-skin appearances are greatly seen on all copies.

As is clear from Table 25, the electrophotographic photosensitive members produced by the electrophotographic photosensitive member manufacturing method according to the present invention brought about very good results in respect of image quality when the water-spray pressure during the pure water contact treatment was in the range of from 1 kg·f/cm$^2$ to 300 kg·f/cm$^2$.

The present invention will be further described below in more detail by giving other Examples and Comparative Examples.

EXAMPLE 5

The surface of a cylindrical substrate of 108 mm in diameter, 358 mm in length and 5 mm in wall thickness, made of aluminum with a purity of 99.5%, was cut in the same manner as the example of the method of manufacturing an electrophotographic photosensitive member according to the present invention, previously described. Then, 15 minutes after the cutting was completed, the substrate surface was pretreated using the surface treatment apparatus as shown in FIG. 2, under conditions as shown in Table 26.

Thereafter, using the deposited film forming apparatus as shown in FIGS. 3 and 4, an amorphous silicon deposited film was formed on the substrate under conditions as shown in Table 15. Blocking type electrophotographic photosensitive members with the layer structure as shown in FIG. 8 were thus produced.

Electrophotographic performances of electrophotographic photosensitive members produced in this way were evaluated in the following way. Here, evaluation was made for each 10 photosensitive members produced under the same conditions for the film formation.

The appearances of the electrophotographic photosensitive members produced in this way were visually observed to examine whether or not any peel-off occurred. Thereafter, the photosensitive members were each set in a copying machine modified for experimental purpose from a copier NP7550, manufactured by Canon Inc. Images were formed on copy sheets by a conventional copying process, and their image quality was evaluated in the following manner. Here, a voltage of 6 kV was applied to its charge assembly to effect corona charging. Results of evaluation are shown in Table 27 as "Present Example".

Evaluation on uneven image

Evaluated in the same manner as in Experiment 4 according to the same criterions.

Evaluation on white spots

Evaluated in the same manner as in Experiment 4 according to the same criterions.

Evaluation on peel-off

Evaluated in the same manner as in Experiment 5 according to the same criterions.

Evaluation on pear-skin appearance

Evaluated in the same manner as in Experiment 7 according to the same criterions.

Evaluation on white dots

Evaluation is made on the basis of the number of white dots present in the same areas of image samples obtained when a black original is placed on the original glass plate and copied.

AA: Good.

A: Small white dots are present in part.

B: White dots are present on the whole area, but there is no difficulty in reading characters.

C: White dots are so many that characters are difficult to read.

Evaluation on white-background fogging

A usual original with a white background having characters on its whole area is placed on the original glass plate and copies are taken to obtain image samples, which are observed to examine whether or not fogging has occurred on the white background.

AA: Good.

A: Fogging is seen in part.

B: Fogging is seen over the whole area, but there is no difficulty in perceiving characters.

C: Fogging is so serious as to make characters difficult to read.

Comparative Example 2

The same substrate as used in Example 5 was cut in the same manner. Using the substrate surface cleaning apparatus as shown in FIG. 9, the substrate surface was cleaned under conditions as shown in Table 17.

Thereafter, using the deposited film forming apparatus as shown in FIG. 1, an amorphous silicon deposited film was formed on the substrate under conditions as shown in Table 28. Blocking type electrophotographic photosensitive members with the layer structure as shown in FIG. 8 were thus produced in the same manner as in Example 5.

Performances of the electrophotographic photosensitive members thus obtained were evaluated in the same manner as in Example 5 to obtain the results as shown in Table 27 as "Comparative Example 2".

Comparative Example 3

Figure 11:
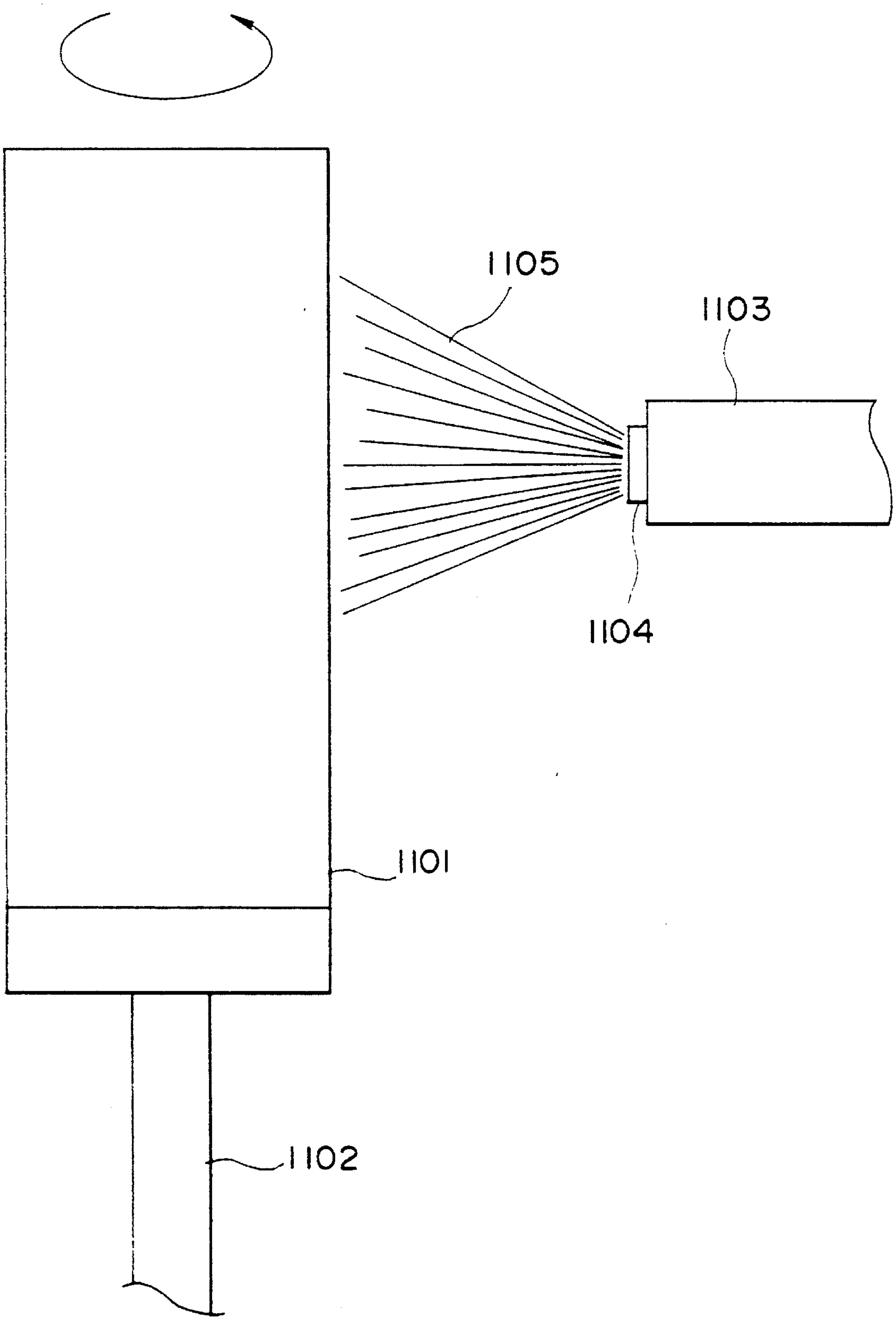
FIG. 11 is a schematic cross-section of another cleaning apparatus used to clean a substrate as a pretreatment for the formation of a deposited film.

The same substrate as used in Example 5 was cut in the same manner. Using the substrate surface cleaning apparatus as shown in FIG. 11, the substrate surface was cleaned. The substrate cleaning apparatus shown in FIG. 11 has a rotating shaft 1102 on which the substrate 1101 is fixed and around which it is rotated, and a spray device 1103 and a nozzle 1104 by and from which a cleaning fluid 1105 is jetted against the substrate 1101.

In the present Comparative Example, the substrate was cleaned using this cleaning apparatus under conditions as shown in Table 29.

Thereafter, using the deposited film forming apparatus as shown in FIG. 1, an amorphous silicon deposited film was formed on the substrate under conditions as shown in Table 28. Blocking type electrophotographic photosensitive members with the layer structure as shown in FIG. 8 were thus produced in the same manner as in Example 5.

Performances of the electrophotographic photosensitive members thus obtained were evaluated in the same manner as in Example 5 to obtain the results as shown in Table 27 as "Comparative Example 3".

Compared with the electrophotographic photosensitive members of Comparative Examples, the electrophotographic photosensitive members produced according to the electrophotographic photosensitive member manufacturing method of the present invention brought about very good results on all items shown in the table.

EXAMPLE 6

With layer structure different from that in Example 5, electrophotographic photosensitive members were produced by the electrophotographic photosensitive member manufacturing method of the present invention.

The same substrate as used in Example 5 was cut in the same manner. Then, 15 minutes after the cutting was completed, the substrate surface was pretreated using the surface treatment apparatus as shown in FIG. 2, under conditions as shown in Table 24.

Figure 12:
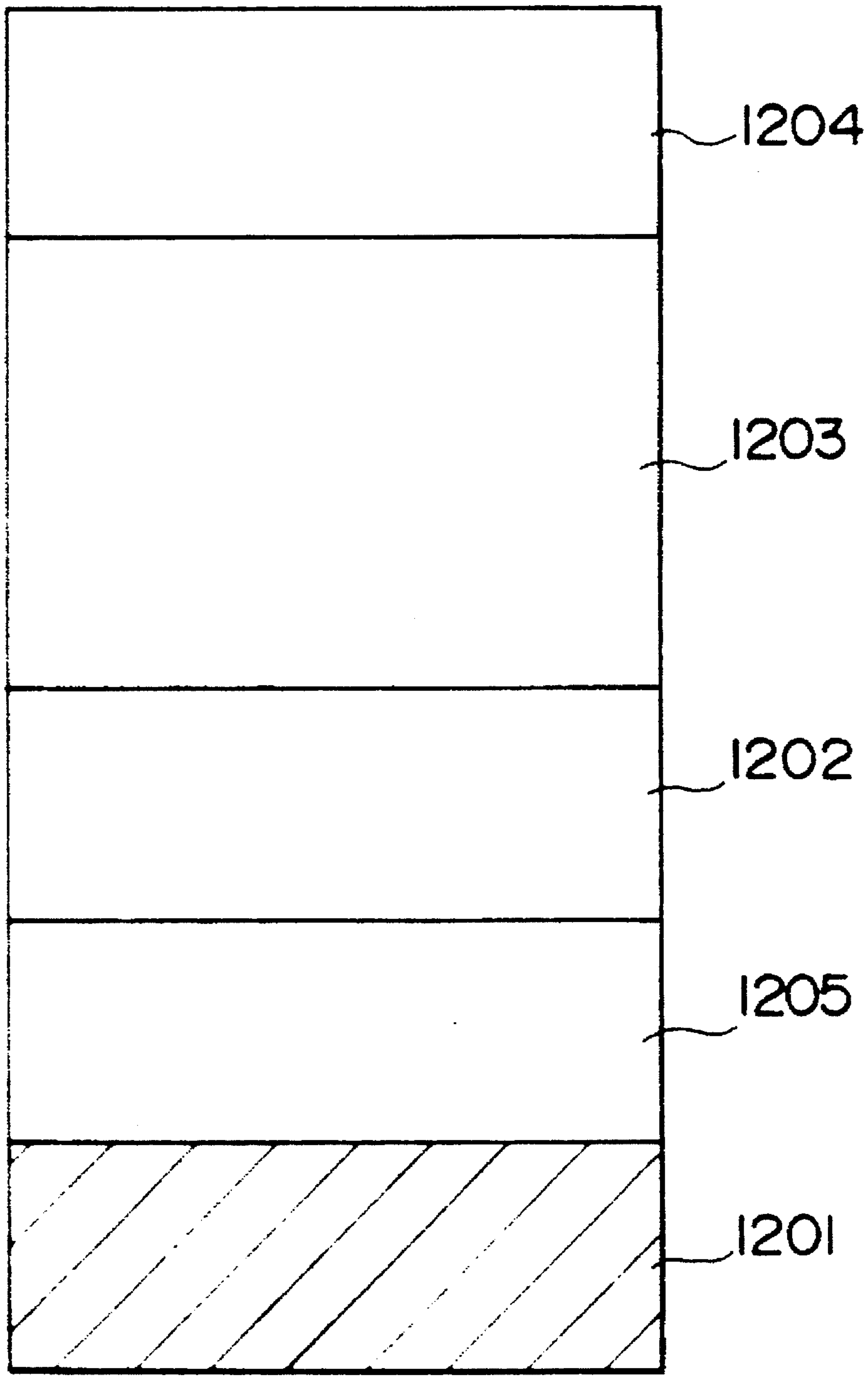
FIG. 12 is a schematic cross-section to illustrate an example of the layer structure of another preferred electrophotographic photosensitive member.

Thereafter, using the deposited film forming apparatus as shown in FIGS. 3 and 4, an amorphous silicon deposited film was formed on the substrate under conditions as shown in Table 12. Blocking type electrophotographic photosensitive members were thus produced, with the layer structure as shown in FIG. 12, consisting of an aluminum substrate 1201, an infrared absorbing layer 1205, a charge blocking layer 1202, a photoconductive layer 1203 and a surface layer 1204 successively laminated in this order.

Performances of the electrophotographic photosensitive members thus obtained were evaluated in the same manner as in Example 5. As a result, in the present Example also, the electrophotographic photosensitive members produced according to the electrophotographic photosensitive member manufacturing method of the present invention brought about very good results on all items like Example 5.

EXAMPLE 7

The same substrate as used in Example 5 was cut in the same manner. Then, 15 minutes after the cutting was completed, the substrate surface was pretreated using the surface treatment apparatus as shown in FIG. 2, under conditions as shown in Table 26.

Thereafter, using the apparatus as shown in FIG. 1 for forming a photoconductive member deposited film by glow-discharge decomposition, an amorphous silicon deposited film was formed on the substrate under conditions as shown in Table 28. Blocking type electrophotographic photosensitive members were thus produced, with the layer structure as shown in FIG. 8.

Performances of the electrophotographic photosensitive members thus obtained were evaluated in the same manner as in Example 5. As a result, in the present Example also, the electrophotographic photosensitive members produced according to the electrophotographic photosensitive member manufacturing method of the present invention brought about very good results on all items like Example 5.

EXAMPLE 8

The surface of a cylindrical substrate of 108 mm in diameter, 358 mm in length and 5 mm in wall thickness, made of aluminum with a purity of 99.5%, was cut in the same manner as the example of the method of manufacturing an electrophotographic photosensitive member according to the present invention, previously described. Then, 15 minutes after the cutting was completed, the substrate surface was pretreated using the surface treatment apparatus as shown in FIG. 2, under conditions as shown in Table 31. In the present Example, sodium salt of dodecanol sulfuric acid ester was used as the surfactant used in the cleaning step.

Thereafter, using the deposited film forming apparatus as shown in FIGS. 3 and 4, an amorphous silicon deposited film was formed on the substrate under conditions as shown in Table 15. Blocking type electrophotographic photosensitive members with the layer structure as shown in FIG. 8 were thus produced.

Performances of the electrophotographic photosensitive members thus obtained were evaluated in the same manner as in Example 5. As a result, in the present Example also, the electrophotographic photosensitive members produced according to the electrophotographic photosensitive member manufacturing method of the present invention brought about very good results on all items like Example 5.

EXAMPLE 9

The surface of a cylindrical substrate of 108 mm in diameter, 358 mm in length and 5 mm in wall thickness, made of aluminum with a purity of 99.5%, was cut in the same manner as the example of the method of manufacturing an electrophotographic photosensitive member according to the present invention, previously described. Then, 15 minutes after the cutting was completed, the substrate surface was cleaned using the substrate cleaning apparatus as shown in FIG. 2, under conditions as shown in Table 32.

After one week from the completion of cleaning, the substrate was placed (loaded) in the deposited film forming apparatus as shown in FIGS. 3 and 4, and an amorphous silicon deposited film was formed on the substrate under conditions as shown in Table 33. Blocking type electrophotographic photosensitive members with the layer structure as shown in FIG. 8 were thus produced.

In the present Example, the time from the completion of water rinse in the cleaning step to the start of alcohol rinse was varied to produce electrophotographic photosensitive members.

Electrophotographic performances of electrophotographic photosensitive members produced in this way were evaluated on their film adhesion in the following manner. Results obtained are shown in Table 34.

Evaluation on film adhesion

The surface of the amorphous silicon photosensitive member produced is scratched with a scriber in a grid pattern to a depth so that scratches reach the aluminum substrate, and then immersed in water for a week to test the film adhesion.

Evaluation criterions:

AA: No peel-off.

A: Peel-off is seen on less than 10% of the whole.

B: Peel-off is seen on 10% or more to less than 50% of the whole.

C: Peel-off is seen on 50% or more of the whole.

Comparative Example 4

Figure 13:
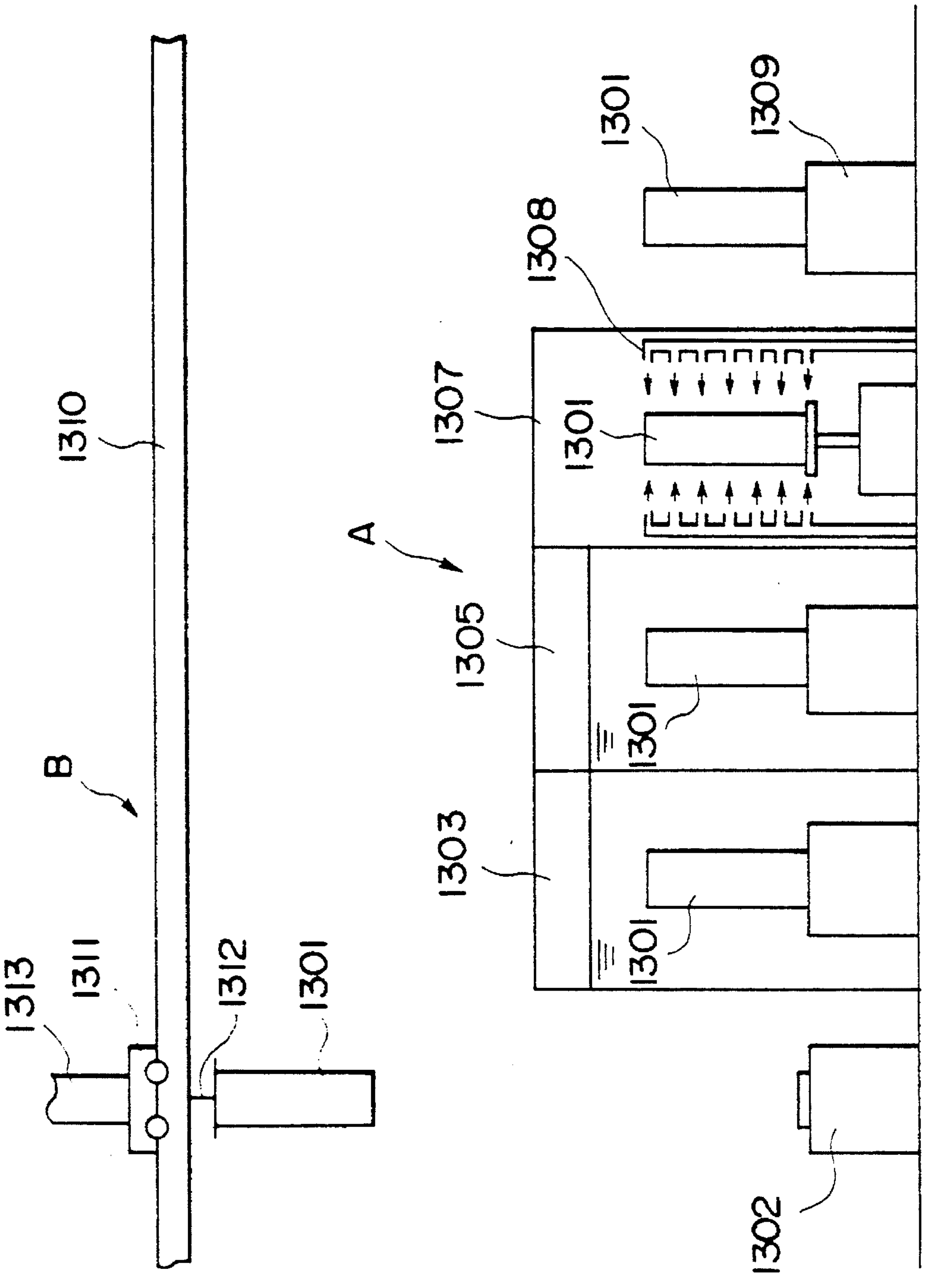
FIG. 13 is a schematic side elevation of a cleaning apparatus used to clean a substrate as a pretreatment for the formation of a deposited film after the substrate surface has been cut.

The same substrate as used in Example 9 was cut in the same manner. Thereafter, using the substrate cleaning apparatus as shown in FIG. 13, the substrate surface was cleaned under conditions as shown in Table 35. One week after the cleaning was completed, the substrate was placed (loaded) in the deposited film forming apparatus as shown in FIGS. 3 and 4, and an amorphous silicon deposited film was formed on the substrate under the same conditions as in Example 9. Blocking type electrophotographic photosensitive members were thus produced. Performances thereof were evaluated in the same manner as in Example 9. Results obtained are shown in Table 34 as Comparative Example 4.

As shown in Table 34, Example according to the present invention shows better film adhesion than that in the prior art Comparative Example even when the substrates are left for a long period time after the cleaning has been completed. Particularly, in the present invention, it is effective to carry out the alcohol rinse step within 15 minutes after the completion of water rinse step, thereby obtaining a good effect.

In FIG. 13, symbol A denotes a cleaning mechanism; and B, a transport mechanism. Reference numeral 1301 donates a substrate; 1302, a substrate feed stand; 1303, a cleaning bath; 105, a water rinsing bath; 1307, a drying bath; 1309, a substrate transport stand; 1310, a transport rail; 1311, a moving mechanism; 1312, a chucking mechanism; and 1313, an air cylinder.

EXAMPLE 10

The same substrate as used in Example 9 was cut in the same manner, and then the substrate was cleaned under conditions as shown in Table 32. Thereafter, an amorphous silicon deposited film was formed on the substrate in the same manner as in Example 9 except that the time before the substrate was placed (loaded) in the deposited film forming apparatus as shown in FIGS. 3 and 4 was varied. Blocking type electrophotographic photosensitive members were thus produced.

Electrophotographic performances of the electrophotographic photosensitive members thus produced were evaluated in the following way.

The electrophotographic photosensitive members produced were each set in a copying machine modified for experimental purpose from a copier NP7550, manufactured by Canon Inc. Sample images were formed on transfer sheets by conventional electrophotography, and overall evaluation was made on image quality. Percentages of acceptable images are shown in Table 36.

Comparative Example 5

The same substrate as used in Example 10 was cut in the same manner. Thereafter, using the substrate cleaning apparatus as shown in FIG. 13, the substrate surface was cleaned under the same conditions as in Comparative Example 4.

Thereafter, an amorphous silicon deposited film was formed on the substrate in the same manner as in Example 10, with variation of the time before the substrate was placed (loaded) in the deposited film forming apparatus as shown in FIGS. 3 and 4. Blocking type electrophotographic photosensitive members were thus produced. Performances thereof were evaluated in the same manner as in Example 10. Results obtained are shown in Table 36 as Comparative Example.

As shown in Table 36, in Examples of the present invention, a decrease in yield with lapse of the time before the substrate was placed (loaded) in the film forming apparatus was small particularly when left for a long time, bringing about better results than that in the prior art Comparative Examples.

EXAMPLE 11

Electrophotographic photosensitive members were produced in entirely the same manner as in Examples 9 and 10 except that as the surfactant used in the ultrasonic bath decyltrimethyl ammonium chloride [$CH_3(CH_2)_9N(CH_3)_3Cl$] was used. Performances thereof were evaluated also in the same manner as in Examples 9 and 10. As a result, in the present Example also, the same good results as those in Examples 9 and 10 were obtained.

EXAMPLE 12

Electrophotographic photosensitive members were produced in the same manner as in Examples 9 and 10 except that the layer structure of the electrophotographic photosensitive member was changed to give function-separated electrophotographic photosensitive members with the layer structure as shown in Table 10. Evaluation was made in the same way. As a result, in the present Example also, the same good results as those in Examples 9 and 10 were obtained.

EXAMPLE 13

The substrate was cut and cleaned in the same manner as in Examples 9 and 10. Thereafter, using the high frequency plasma CVD deposited film forming apparatus as shown in FIG. 1, an amorphous silicon deposited film was formed under conditions as shown in Table 38. Blocking type electrophotographic photosensitive members were thus produced. Performances thereof were evaluated in the same manner as in Examples 9 and 10. Results obtained are shown in Tables 39 and 40.

Comparative Example 6

The substrate was cut and cleaned in the same manner as in Comparative Examples 4 and 5. Thereafter, electrophotographic photosensitive members were produced using the same apparatus and under the same conditions as in Example 13. Performances thereof were evaluated in the same manner. Results obtained are shown in Table 39 and 40 as Comparative Example 6.

As shown in FIGS. 39 and 40, the present invention brought about good results also in Example 13, which made use of the high frequency plasma CVD.

EXAMPLE 14

Figure 14:
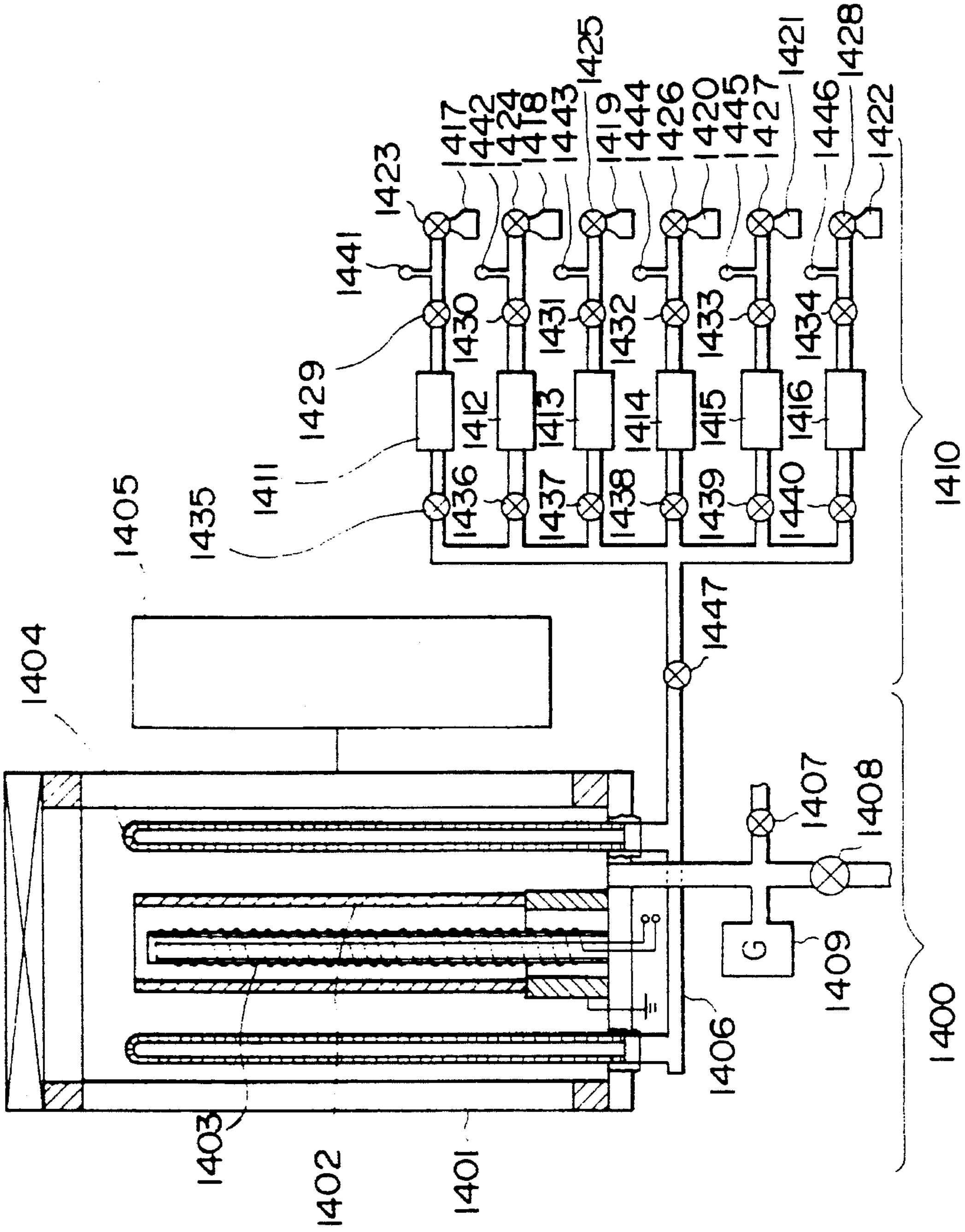
FIG. 14 is a schematic cross-section to illustrate another example of a deposited film forming apparatus used to form a deposited film on a cylindrical substrate by high-frequency plasma CVD.
Figure 15:
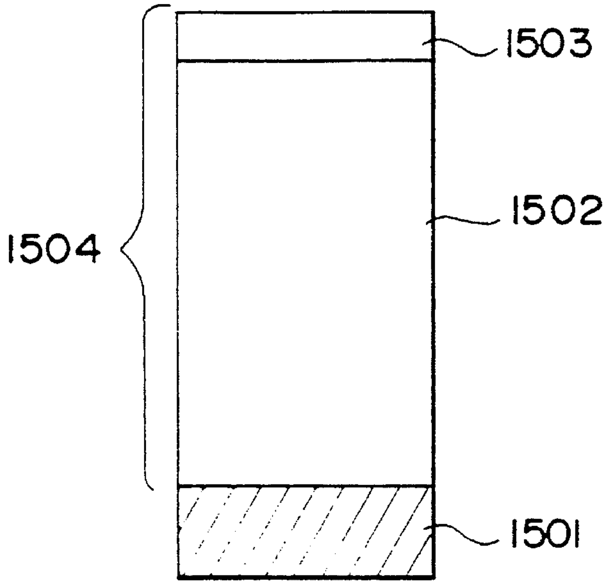
FIG. 15 is a schematic structural illustration of a layer structure formed in the method of manufacturing an electrophotographic photosensitive member according to the present invention.

The surface of a cylindrical substrate of 108 mm in diameter, 358 mm in length and 5 mm in wall thickness, made of aluminum with a purity of 99.5%, was cut in the same manner as the example of the method of manufacturing an electrophotographic photosensitive member according to the present invention, previously described. Then, 15 minutes after the cutting was completed, the substrate surface was pretreated using the surface treatment apparatus as shown in FIG. 2, under conditions as shown in Table 41. In the present Example, polyethylene glycol nonyl phenyl ether was used as the surfactant in the form of a 1% by weight solution. To the surface of the aluminum cylinder having been pretreated in this way, high-frequency glow discharging was applied according to the procedure as preciously described in detail, using an electrophotographic photosensitive member manufacturing apparatus as shown in FIG. 14, under conditions as shown in Table 42. Electrophotographic photosensitive members were thus produced, each consisted of a light receiving member 1504 having on a substrate 1501 a photoconductive layer 1502 and a surface layer 1503 as shown in FIG. 15.

In FIG. 14, a reaction vessel 1401 is provided therein with a starting material gas feed pipe 1404 and a heating element (heater) 1403 for heating the substrate. The substrate 1402 (a cylindrical substrate) on which the light receiving member is formed is placed in the reaction vessel 1401 in such a way that its cylindrical wall surrounds the heating element 1403. The starting material gas feed pipe 1404 is connected with a starting material gas feed apparatus 1410 through a starting material gas guide piping 1406 via an auxiliary valve 1447.

The reaction vessel 1401 is connected with a vacuum pump (not shown) via a main valve 1408. On the way of the piping that extends to the vacuum pump, a vacuum gauge for measuring pressure is connected. On the way of the piping, another piping is provided via a reaction vessel leak valve, through which the atmosphere and the desired gases such as inert gas can be leaked into the reaction vessel 1401.

An energy source that generates glow discharge is connected with the reaction vessel 1401 via a high-frequency matching box 1405. A deposited film forming apparatus is thus constructed.

The starting material gas feed system 1410 has starting material gas bombs 1417 to 1422. These starting material gas bombs 1417 to 1422 are connected with the piping via starting material gas valves 1423 to 1428, respectively. The pipes of this piping are respectively provided with pressure regulators 1441 to 1446, and also connected with mass flow controllers 1411 to 1416 via starting material gas flow-in valves 1429 to 1434, respectively.

The respective starting material gases having passed through the mass flow controllers 1411 to 1416 are put together via starting material gas flow-out valves 1435 to 1440, and fed to the deposited film forming apparatus.

Film formation for the light receiving member can be carried out by opening or closing the respective valves correspondingly connected with the starting material gas bombs, adjusting the gas flow rate, adjusting the pressure inside the reaction vessel and controlling the heating temperature and applied high-frequency power according to the desired conditions (Table 42 in the present Example).

Figure 17:
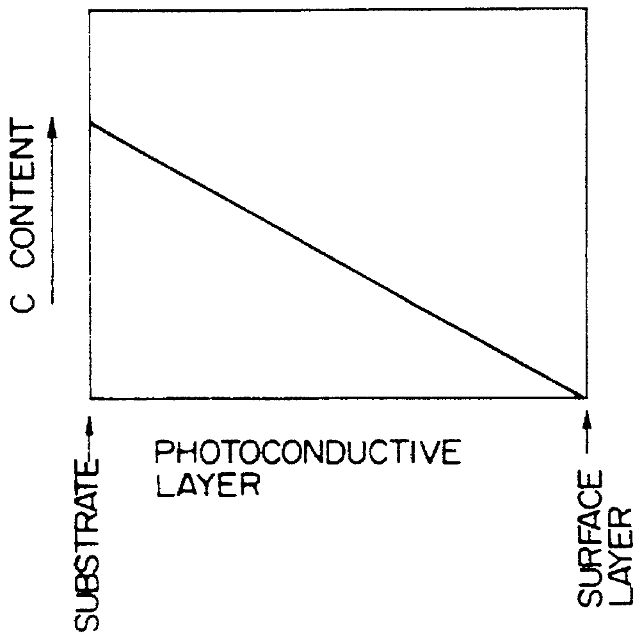
FIGS. 17 to 19 are each a graph to show a pattern of changes in carbon content in a photoconductive layer of an electrophotographic photosensitive member produced according to an example of the present invention.

In the present Example, the flow rate of $CH_4$ fed when the photoconductive layer was formed was linearly varied so that a pattern of changes in carbon content in the photoconductive layer was made to be as shown in FIG. 17. At this time the carbon content in the photoconductive layer at the interface between it and the substrate was so controlled as to be about 30 atomic %. The carbon content was determined as an absolute content by elementary analysis using the Rutherford backward scattering method to prepare a calibration curve of a standard sample, and comparing a sample prepared, with the standard sample on the basis of signal strength according to Auger spectroscopy.

The electrophotographic photosensitive members thus produced were visually observed to evaluate their surface properties. Thereafter the photosensitive members were each set in a modified electrophotographic apparatus of a copier NP7550, manufactured by Canon Inc., and electrophotographic performances such as charge performance, sensitivity and residual potential were evaluated in the following manner.

(1) Surface haze:

The degree of haze on the surface of the electrophotographic photosensitive member produced is visually examined.

AA: No haze is seen.

A: Haze is seen in part.

B: Several hazes are partly seen.

C: Hazes are seen on the whole surface.

(2) Charge performance, sensitivity, residual potential:

Charge performance

The electrophotographic photosensitive member is set in the test apparatus, and a high voltage of +6 kV is applied to effect corona charging. The dark portion surface potential of the electrophotographic photosensitive member is measured using a surface potentiometer.

Sensitivity

The electrophotographic photosensitive member is charged to have a given dark portion surface potential, and immediately thereafter irradiated with light to form a light image. The light image is formed using a xenon lamp light source, by irradiating the surface with light from which light with a wavelength in the region of 500 nm or less has been removed using a filter. At this time the light portion surface potential of the electrophotographic photosensitive member is measured using a surface potentiometer. The amount of exposure is adjusted so as for the light portion surface potential to be at a given potential, and the amount of exposure used at this time is regarded as the sensitivity.

Residual potential

The electrophotographic photosensitive member is charged to have a given dark portion surface potential, and immediately thereafter irradiated with light with a constant amount of light having a relatively high intensity. A light image is formed using a xenon lamp light source, by irradiating the surface with light from which light with a wavelength in the region of 500 nm or less has been removed using a filter. At this time the light portion surface potential of the electrophotographic photosensitive member is measured using a surface potentiometer.

(3) White dots, halftone unevenness:

The electrophotographic photosensitive member is set in an electrophotographic apparatus modified for experimental purpose from a copier NP7550, manufacture by Canon Inc., and images are transferred and formed on the surface of copy sheets by conventional electrophotography. Images formed are evaluated in the following manner.

White dots

A whole-area black chart prepared by Canon Inc. (parts number: FY9-9097) is placed on an original glass plate to take copies. White dots of 0.2 mm or less in diameter, present in the same areas of the copied images thus obtained, are counted.

Halftone unevenness

A halftone chart prepared by Canon Inc. (parts number: FY-9042) is placed on an original glass plate to take copies. On the copied images thus obtained, assuming a round region of 0.05 mm in diameter as one unit, image densities on 100 spots are measured to make evaluation on the scattering of the image densities.

In the above both items, evaluation was made as follows:

AA: Particularly good.

A: Good.

B: No problem in practical use.

C: Problematic in practical use.

Results obtained are shown in Table 43.

Comparative Example 7

The same conductive substrate as used in Example 14 was cut in the same manner. After the cutting was completed, the conductive substrate was treated using the substrate surface cleaning apparatus as shown in FIG. 9, under conditions as shown in Table 44.

After the cutting, the substrate 601 placed on the feed stand 611 is transported into the cleaning bath 621 by means of the transport mechanism 603. A cleaning solution mainly consisting of trichloroethane (trade name: ETHANA VG; available from Asahi Chemical Industry Co., Ltd.) contained in the cleaning bath 621 cleans the substrate to remove cutting oil and cuttings adhered to its surface.

After the cleaning, the substrate 601 is carried onto the transport stand 651 by means of the transport mechanism 603.

Figure 16:
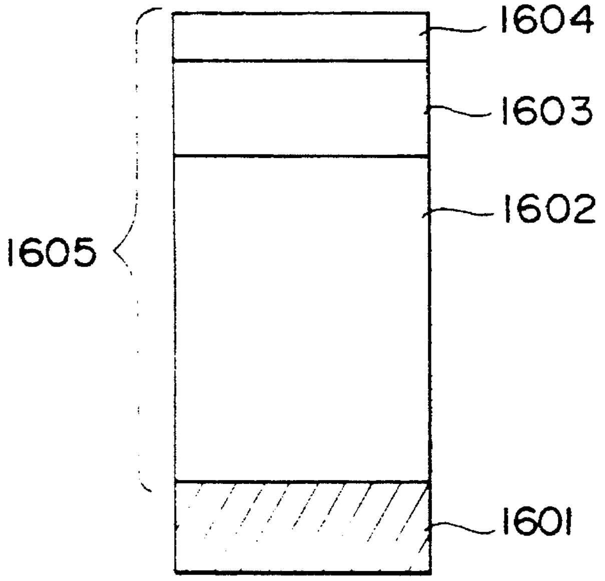
FIG. 16 is a schematic structural illustration of a layer structure formed in the method of manufacturing another electrophotographic photosensitive member.

On the substrate thus pretreated, films were formed in the same manner as in Example 14 under conditions as shown in Table 45, to give what is called a function-separated electrophotographic photosensitive member 605, as shown in FIG. 16, having on a substrate 1601 a charge transport layer 1602, a charge generation layer 1605 and a surface layer 1604 in the three-layer structure. Performances of the electrophotographic photosensitive members thus obtained were evaluated in the same manner as in Example 14. Results obtained are shown in Table 43 together with the results in Example 14.

As is clear from Table 43, the method of Example 14 has brought about an improvement in sensitivity, and has held the residual potential to a low level. In particular, superior performances are seen to have been achieved with regard to surface haze and halftone unevenness.

EXAMPLE 15

On the substrate pretreated in the same manner as in Example 14 using the substrate surface treatment apparatus as shown in FIG. 2, films were formed by microwave glow discharging making use of the electrophotographic photosensitive member manufacturing apparatus as shown in FIGS. 3 and 4, under conditions as shown in Table 46. Electrophotographic photosensitive members were thus produced. Performances of the electrophotographic photosensitive members thus obtained were evaluated in the same manner as in Example 14. As a result, entirely the same results as in Example 14 were obtained.

Comparative Example 8

On the conductive substrate pretreated in the same manner as in Comparative Example 7 using the substrate surface treatment apparatus as shown in FIG. 9, films were formed by microwave glow discharging making use of the electrophotographic photosensitive member manufacturing apparatus as shown in FIGS. 3 and 4, under conditions as shown in Table 47, to give what is called a function-separated electrophotographic photosensitive member 1605, as shown in FIG. 16, having on a substrate 1601 a charge transport layer 1602, a charge generation layer 1603 and a surface layer 1604 in the three-layer structure. Performances of the electrophotographic photosensitive members thus obtained were evaluated in the same manner as in Example 15. As a result, entirely the same results as in Comparative Example 7 were obtained.

EXAMPLE 16

Figure 18:
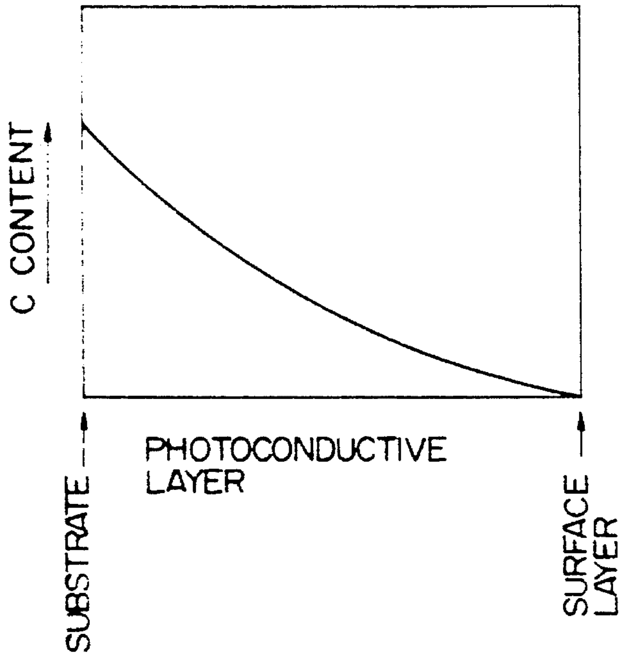
Figure 19:
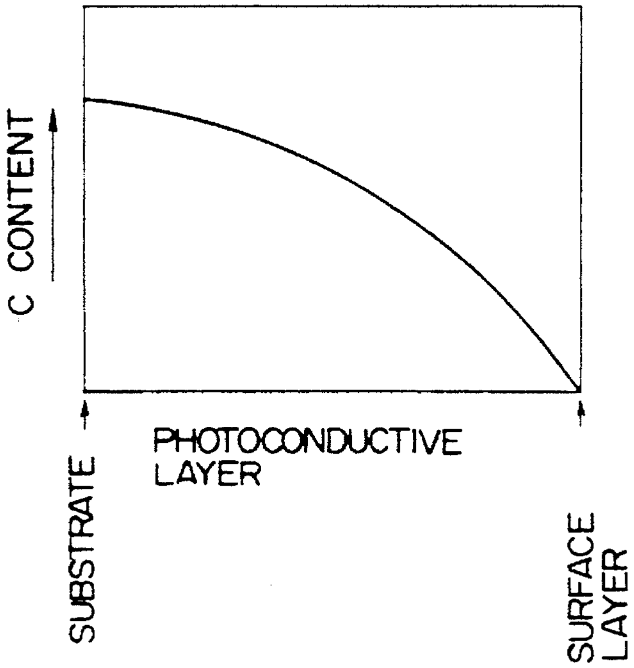

On the substrate pretreated in the same manner as in Example 14 using the substrate surface treatment apparatus as shown in FIG. 2, films were formed by high-frequency glow discharging according to the procedure as preciously described in detail, using the electrophotographic photosensitive member manufacturing apparatus as shown in FIG. 14, under conditions as shown in Table 48. An electrophotographic photosensitive member was thus produced. In the present Example, the flow rate of $CH_4$ fed when the photoconductive layer was formed was varied so that a pattern of changes in carbon content in the photoconductive layer was made to be as shown in FIG. 18 or 19. Thus, two kinds of photosensitive members were produced. In the both patterns, the carbon content in the substrate surface of the photoconductive layer on its substrate side was so controlled as to be about 30 atomic %. The carbon content was determined as an absolute content by elementary analysis using the Rutherford backward scattering method to prepare a calibration curve of a standard sample, and comparing samples prepared, with the standard sample on the basis of signal strength according to Auger spectroscopy.

The electrophotographic photosensitive members thus produced were visually observed to examine the surface haze. Thereafter they were each set in a modified electrophotographic apparatus of a copier NP7550, manufactured by Canon Inc., and charge performance, sensitivity and residual potential were evaluated in the same manner as in Example 14. Results obtained are shown in Table 49.

Comparative Example 9

Figure 20:
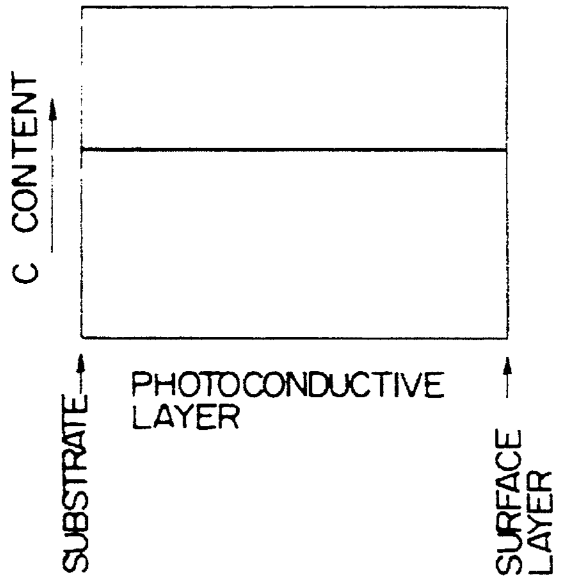
FIGS. 20 and 21 are each a graph to show a pattern of changes in carbon content in a photoconductive layer of an electrophotographic photosensitive member produced according to a comparative example.
Figure 21:
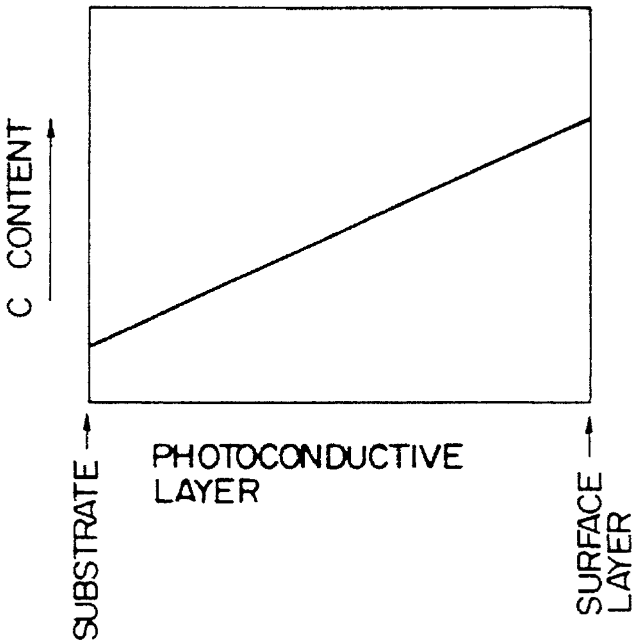

On the substrate pretreated in the same manner as in Comparative Example 7, films were formed according to a pattern in changes of carbon content as shown in FIG. 20 or 21. Electrophotographic photosensitive members were thus produced. Performances thereof were evaluated in the same manner as in Example 16. Results are shown in Table 49 together with the results of evaluation in Example 16.

With the pattern of changes in carbon content in the photoconductive layer in accordance with Example 16, better results than the results in Comparative Example 9 are seen to have been obtained particularly in respect of surface haze, sensitivity, residual potential and halftone unevenness.

EXAMPLE 17

On the substrate pretreated in the same manner as in Example 14 using the substrate surface treatment apparatus as shown in FIG. 2, films were formed in the same manner as in Example 16 except for using microwave glow discharging, using the electrophotographic photosensitive member manufacturing apparatus as shown in FIGS. 3 and 4, under conditions as shown in Table 20. Electrophotographic photosensitive members were thus produced. In the present Example, the flow rate of $CH_4$ fed when the photoconductive layer was formed was varied so that a pattern of changes in carbon content in the photoconductive layer was made to be as shown in FIG. 18 or 19. In the both patterns, the carbon content in the substrate surface of the photoconductive layer on its substrate side was so controlled as to be about 30 atomic %. The carbon content was determined in the same manner as previously described, according to Auger spectroscopy. The electrophotographic photosensitive members thus produced brought about entirely the same results as in Example 16.

Comparative Example 10

On the substrate pretreated in the same manner as in Comparative Example 7 using the substrate surface treatment apparatus as shown in FIG. 9, films were formed in the same manner as in Example 17 but with a pattern of carbon content as shown in FIG. 20 or 21, to produce electrophotographic photosensitive members. Performances of the electrophotographic photosensitive members thus obtained were evaluated in the same manner as in Example 17. As a result, entirely the same results as in Comparative Example 9 were obtained.

EXAMPLE 18

On the substrate pretreated in the same manner as in Example 14 using the substrate surface treatment apparatus as shown in FIG. 2, films were formed by high-frequency glow discharging according to the procedure as preciously described in detail, using the electrophotographic photosensitive member manufacturing apparatus as shown in FIG. 14, under conditions as shown in Table 2. Electrophotographic photosensitive members were thus produced. In the present Example, the carbon content in the surface of the photoconductive layer on its substrate side was varied by varying the flow rate of $CH_4$ fed when the photoconductive layer was formed, according to a pattern of changes in carbon content as shown in FIG. 17. The carbon content in the .surface of photoconductive layer on its substrate side was determined in the same manner as previously described, according to Auger spectroscopy.

The electrophotographic photosensitive members thus produced were observed to examine the surface haze and the number of spherical protuberances occurred. Thereafter the photosensitive members were each set in an electrophotographic apparatus modified for experimental purpose from a copier NP7550, manufacture by Canon Inc., and electrophotographic performances and image quality, such as charge performance, sensitivity, residual potential, white dots and halftone unevenness were evaluated. On each items; evaluation was made in the following way.

(1) Surface haze:

Evaluated in the same manner as in Example 14.

(2) Number of spherical protuberances:

The whole area of the surface of the electrophotographic photosensitive member produced was observed with an optical microscope to examine the number of spherical protuberances with diameters of 20 μm or larger in the area of 100 $cm^2$. Results were obtained in all the electrophotographic photosensitive members. A largest number of the spherical protuberances among them was assumed as 100% to make relative comparison. Results obtained are grouped into the following:

AA: Less than 60%.

A: Less than 80 to 60%.

B: 100 to 80%.

(3) Charge performance, sensitivity, residual potential:

Evaluation was made in the same manner as in Example 14.

(4) White dots, halftone unevenness:

Evaluation was made in the same manner as in Example 14.

Results thus obtained are shown together in Table 51. In the table, at. % indicates atomic %. As is clear from the results, improvements in performances are seen when the carbon content in the surface of photoconductive layer on its substrate side is in the range of from 0.5 to 50 atomic %. Very good results are obtained when it is in the range of from 1 to 30 atomic %.

EXAMPLE 19

On the substrate pretreated in the same manner as in Example 14 using the substrate surface treatment apparatus as shown in FIG. 2, films were formed by microwave glow discharging according to the procedure as preciously described in detail, using the electrophotographic photosensitive member manufacturing apparatus as shown in FIGS. 3 and 4, under conditions as shown in Table 46. Electrophotographic photosensitive members were thus produced. In the present Example, the carbon content in the surface of the photoconductive layer on its substrate side was varied by varying for each photosensitive member the flow rate of $CH_4$ fed when the photoconductive layer was formed, according to a pattern of changes in carbon content as shown in FIG. 17.

Evaluation was made in the same manner as in Example 18, to obtain entirely the same results as shown in Table 51 were obtained.

EXAMPLE 20

Figure 22:
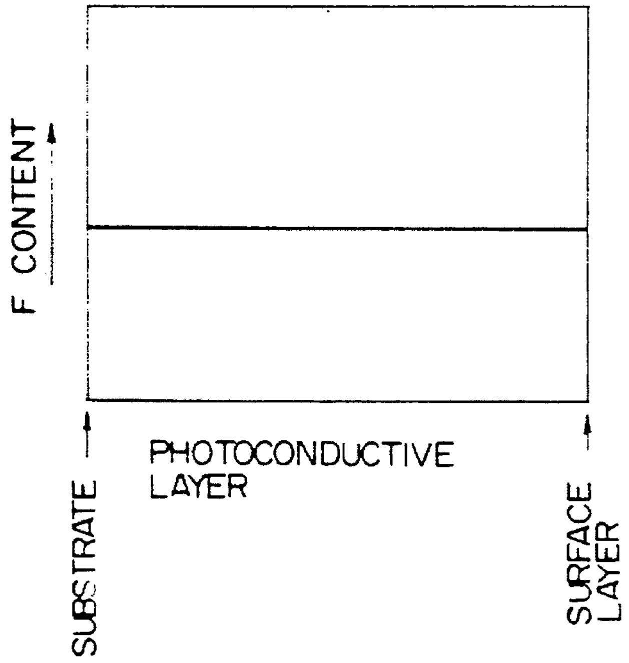
FIGS. 22 to 25 are each a graph to show a pattern of changes in fluorine content in a photoconductive layer of an electrophotographic photosensitive member produced according to an example of the present invention.

On the substrate pretreated in the same manner as in Example 14, films were formed by high-frequency glow discharging according to the procedure as preciously described in detail, using the electrophotographic photosensitive member manufacturing apparatus as shown in FIG. 14, under conditions as shown in Table 52. Electrophotographic photosensitive members were thus produced. In the present Example, the flow rate of $SiF_4$ fed when the photoconductive layer was formed was varied so that the fluorine content in the photoconductive layer was changed as shown in FIG. 22.

(I) The electrophotographic photosensitive members thus produced were each set in an electrophotographic apparatus modified for experimental purpose from a copier NP7550, manufacture by Canon Inc., and electrophotographic performances concerning white dots, halftone unevenness and ghost were evaluated before an accelerated running test was carried out. On each items, evaluation was made in the same manner as in Examples 14 and 18. Evaluation on ghost was made in the following way.

Ghost

A ghost chart prepared by Canon Inc. (parts number: FY9-9040) on which a solid black circle with a reflection density of 1.1 and a diameter of 5 mm has been stuck is placed on an original glass plate at an image leading area, and a halftone chart prepared by Canon Inc. is superposed thereon, in the state of which copies are taken. In the copied images thus obtained, the difference between the reflection density in the area with the diameter of 5 mm on the host chart and the reflection density of the halftone area is measured, which difference is seen on the halftone copy.

The following shows criterions of evaluation.

AA: Particularly good.

A: Good.

B: No problems in practical use.

C: Problematic in practical use.

Results thus obtained are shown together in Table 53. In the table, at.ppm indicates atomic ppm.

(II) Next, the electrophotographic photosensitive members produced were each set in an electrophotographic apparatus modified for experimental purpose from a copier NP7550, manufacture by Canon Inc., and an accelerated running test corresponding to 2,500,000 sheets was carried out. Then, electrophotographic performances concerning white dots, halftone unevenness and ghost were evaluated in the same way as in-the test (I). Results thus obtained are shown together in Table 54. In the table, at.ppm indicates atomic ppm.

The results shown in Tables 53 and 54 show that electrophotographic photosensitive members very superior also in regard to the image characteristics and also the durability can be produced when the fluorine content in the photoconductive layer is set within the range of 95 atomic ppm or less.

EXAMPLE 21

On the substrate pretreated in the same manner as in Example 14 using the substrate surface treatment apparatus as shown in FIG. 2, films were formed by microwave glow discharging in the same manner as in Example 20, using the electrophotographic photosensitive member manufacturing apparatus as shown in FIGS. 3 and 4, under conditions as shown in Table 55. Electrophotographic photosensitive members were thus produced. Electrophotographic performances of the electrophotographic photosensitive members thus produced were evaluated in the same manner as in Example 20. Results obtained were entirely the same as those shown in Tables 53 and 54.

EXAMPLE 22

On the substrate pretreated in the same manner as in Example 14 using the substrate surface treatment apparatus as shown in FIG. 2, films were formed by high-frequency glow discharging, using the electrophotographic photosensitive member manufacturing apparatus as shown in FIG. 14, under conditions as shown in Table 56. Electrophotographic photosensitive members were thus produced. In the present experiment, the flow rate of $CH_4$ fed when the surface layer was formed was varied so that the amount of carbon contained in the surface layer was changed.

The electrophotographic photosensitive members produced were each set in an electrophotographic apparatus modified for experimental purpose from a copier NP7550, manufacture by Canon Inc., and charge performance, residual potential, images obtained before a running test and images obtained after an accelerated running test corresponding to 3,000,000 sheets were evaluated in the following manner.

Charge performance

Evaluated in the same manner as in Example 14.

Residual potential

Evaluated in the same manner as in Example 14.

Evaluation of image after running

With regard to both white dots and scratches, criterion samples are prepared, and the total of evaluation was grouped into the following four grades.

AA: Particularly good.

A: Good.

B: No problems in practical use.

C: Problematic in practical use.

Results thus obtained are shown together in Table 57. In the table, at. % indicates atomic %. As is clear from the table, remarkable improvements are seen in charge performance and durability when the carbon content is in the range of from 40 to 90 atomic %.

EXAMPLE 23

On the substrate pretreated in the same manner as in Example 14 using the substrate surface treatment apparatus as shown in FIG. 2, films were formed by microwave glow discharging in the same manner as in Example 22, using the electrophotographic photosensitive member manufacturing apparatus as shown in FIGS. 3 and 4, under conditions as shown in Table 58. Electrophotographic photosensitive members were thus produced. In the present Example, the flow rate of $CH_4$ fed when the surface layer was formed was varied so that the amount of carbon contained in the surface layer was changed.

Performances of the electrophotographic photosensitive members produced were evaluated in the same manner as in Example 22. As a result, entirely the same results as those shown in Table 57 were obtained.

EXAMPLE 24

On the substrate pretreated in the same manner as in Example 14 using the substrate surface treatment apparatus as shown in FIG. 2, films were formed by high-frequency glow discharging, using the electrophotographic photosensitive member manufacturing apparatus as shown in FIG. 14, under conditions as shown in Table 59. Electrophotographic photosensitive members were thus produced. In the present experiment, the flow rate(s) of $H_2$ and/or $SiF_4$ fed when the surface layer was formed was varied so that the amounts of hydrogen atoms and fluorine atoms contained in the surface layer were changed.

The electrophotographic photosensitive members produced were each set in an electrophotographic apparatus modified for experimental purpose from a copier NP7550, manufacture by Canon Inc., and evaluation was made on three items, residual potential, sensitivity and smeared images.

Residual potential

Evaluated in the same manner as in Example 14.

Sensitivity

Evaluated in the same manner as in Example 14.

Smeared image

A test chart manufactured by Canon Inc. (parts number FY9-9058) with a white background having characters on its whole area was placed on an original glass plate, and copies are taken at an amount of exposure twice the amount of usual exposure. Copy images obtained are observed to examine whether or not the fine lines on the image are continuous without break-off. When unevenness was seen on the image during this evaluation, the evaluation was made on the whole-area image region and the results are given in respect of the worst area.

AA: Good.

A: Lines are broken off in part.

B: Lines are broken off at many portions, but can be read as characters without no problem in practical use.

Results obtained are shown in Table 60. As is clearly seen from Table 60, good results are obtained on both the residual potential and the sensitivity and also smeared images under strong exposure can be greatly decreased, when the total of the hydrogen content and fluorine content is in the range of from 30 to 70 atomic % and also the fluorine content is within the range of 20 atomic % or less.

EXAMPLE 25

On the substrate pretreated in the same manner as in Example 14 using the substrate surface treatment apparatus as shown in FIG. 2, films were formed by microwave glow discharging, using the electrophotographic photosensitive member manufacturing apparatus as shown in FIGS. 3 and 4 in the same manner as in Example 23, under conditions as shown in Table 61. Electrophotographic photosensitive members were thus produced. The flow rate of He was varied so as to be constant at 2,000 sccm in total with the flow rate of $H_2$, and the inner pressure was kept constant. Performances of the electrophotographic photosensitive members thus produced were evaluated in the same manner as in Example 22. As a result, entirely the same results as those shown in Table 60 were obtained.

EXAMPLE 26

On the substrate pretreated in the same manner as in Example 14 using the substrate surface treatment apparatus as shown in FIG. 2 under conditions as shown in Table 62, films were formed by microwave glow discharging, using the electrophotographic photosensitive member manufacturing apparatus as shown in FIG. 3 and 4, under conditions as shown in Table 63. Electrophotographic photosensitive members were thus produced. In the present Example, the flow rates of $SiF_4$ and $SiH_4$ were smoothly varied within the range of from 10 to 50 ppm as a value of $SiF_4/SiH_4$ so that the content of fluorine atoms in the photoconductive layer was in the form of distribution shown in FIGS. 52 to 55. Thus 4 kinds of electrophotographic photosensitive members were produced. Electrophotographic photosensitive members were also used under the same conditions except that no fluorine was contained. Performances of these 5 kinds of electrophotographic photosensitive members were evaluated.

Surface haze, charge performance, sensitivity, residual potential, white dots, halftone unevenness, ghost Evaluated in the same manner as in Example 14.

Temperature characteristics

The electrophotographic photosensitive members produced are each set in a copying machine modified for experimental purpose from a copier NP7550, manufacture by Canon Inc. The surface temperature of the electrophotographic photosensitive member was varied from 30° to 45° C., and a high voltage of +6 kV is applied to effect corona charging. The dark portion surface potential of the photosensitive member is measured using a surface potentiometer. The changes in surface temperature of the dark portion with respect to the surface temperature are approximated in a straight line. The slope thereof is regarded as "temperature characteristics", and shown in unit of [V/deg].

Evaluation criterions:

AA: Very good.

A: Good.

B: No problems in practical use.

C: Of no practical use.

Results thus obtained are shown in Table 64. As is seen from the table, all the electrophotographic performances even including ghost and temperature characteristics are improved when fluorine is contained in the photoconductive layer and also made to distribute in the layer thickness direction.

EXAMPLE 27

Figure 26:
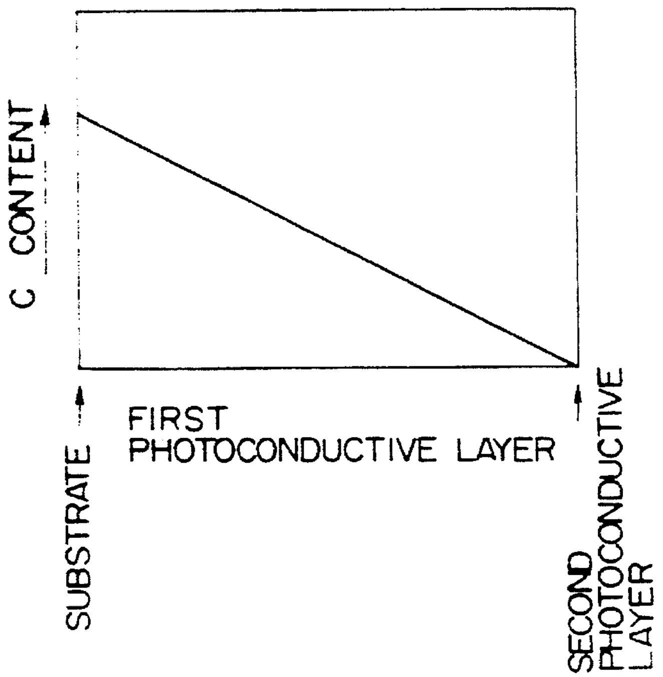
FIGS. 26 to 28 are each a graph to show a pattern of changes in carbon content in a photoconductive layer according to an example of the present invention.

The surface of a cylindrical substrate of 108 mm in diameter, 358 mm in length and 5 mm in wall thickness, made of aluminum with a purity of 99.5%, was cut in the same manner as the example of the method of manufacturing an electrophotographic photosensitive member according to the present invention, previously described. Then, 15 minutes after the cutting was completed, the substrate surface was pretreated using the surface treatment apparatus as shown in FIG. 2, under conditions as shown in Table 65. In the present Example, polyethylene glycol nonyl phenyl ether was used as the surfactant in the form of a 1% by weight solution. To the surface of the aluminum cylinder having been pretreated in this way, high-frequency glow discharging was applied according to the procedure as preciously described in detail, using an electrophotographic photosensitive member manufacturing apparatus as shown in FIG. 14, under conditions as shown in Table 66. Electrophotographic photosensitive members-were thus produced. In the present Example, the flow rate of $CH_4$ fed when the photoconductive layer was formed was linearly varied so that a pattern of changes in carbon content in the photoconductive layer was made to be as shown in FIG. 26. At this time the carbon content in the photoconductive layer at the interface between it and the substrate was so controlled as to be about 30 atomic %. The carbon content was determined as an absolute content by elementary analysis using the Rutherford backward scattering method to prepare a calibration curve of a standard sample, and comparing a sample prepared, with the standard sample on the basis of signal strength according to Auger spectroscopy.

The electrophotographic photosensitive members thus produced were visually observed to evaluate their surface properties. Thereafter the photosensitive members were each set in a modified electrophotographic apparatus of a copier NP7550, manufactured by Canon Inc., and electrophotographic performances such as charge performance, sensitivity and residual potential were evaluated in the following manner.

(1) Surface haze:

The degree of haze on the surface of the electrophotographic photosensitive member produced is visually examined.

AA: No haze is seen.

A: Haze is seen in part.

B: Several hazes are partly seen.

C: Hazes are seen on the whole surface.

(2) Charge performance, sensitivity, residual potential:

Charge performance

The electrophotographic photosensitive member is set in the test apparatus, and a high voltage of +6 kV is applied to effect corona charging. The dark portion surface potential of the electrophotographic photosensitive member is measured using a surface potentiometer.

Uneven charge performance

In the above measurement, the surface potentials on three portions at the upper, middle and lower zones, i.e., nine portions, of one electrophotographic photosensitive member are measured. Among the measured potentials, a value obtained by subtracting a smallest potential from a largest potential is indicated.

Sensitivity

The electrophotographic photosensitive member is charged to have a given dark portion surface potential, and immediately thereafter irradiated with light to form a light image. The light image is formed using a xenon lamp light source, by irradiating the surface with light from which light with a wavelength in the region of 500 nm or less has been removed using a filter. At this time the light portion surface potential of the electrophotographic photosensitive member is measured using a surface potentiometer. The amount of exposure is adjusted so as for the light portion surface potential to be at a given potential, and the amount of exposure used at this time is regarded as the sensitivity.

Uneven sensitivity

In the above measurement, the surface potentials on three portions at the upper, middle and lower zones, i.e., nine portions, of one electrophotographic photosensitive member are measured. Among the measured potentials, a value obtained by subtracting a smallest potential from a largest potential is indicated.

Residual potential The electrophotographic photosensitive member is charged to have a given dark portion surface potential, and immediately thereafter irradiated with light with a constant amount of light having a relatively high intensity. A light image is formed using a xenon lamp light source, by irradiating the surface with light from which light with a wavelength in the region of 500 nm or less has been removed using a filter. At this time the light portion surface potential of the electrophotographic photosensitive member is measured using a surface potentiometer.

(3) White dots, halftone unevenness:

The electrophotographic photosensitive member is set in an electrophotographic apparatus modified for experimental purpose from a copier NP7550, manufacture by Canon Inc., and images are transferred and formed on the surface of copy sheets by conventional electrophotography. Images formed are evaluated in the following manner.

White dots

A whole-area black chart prepared by Canon Inc. (parts number: FY9-9097) is placed on an original glass plate to take copies. White dots of 0.2 mm or less in diameter, present in the same are of the copied images thus obtained, are counted.

Halftone unevenness

A halftone chart prepared by Canon Inc (parts number: FY-9042) is placed on an original glass plate to take copies. On the copied images thus obtained, assuming a round region of 0.05 mm in diameter as one unit, image densities on 100 spots are measured to make evaluation on the scattering of the image densities.

In the above both items, evaluation was made as follows:

AA: Particularly good.

A: Good.

B: No problem in practical use.

C: Problematic in practical use.

Results obtained are shown in Table 67.

Comparative Example 11

The same conductive substrate as used in Example 27 was cut in the same manner. After the cutting was completed, the conductive substrate was treated using the substrate surface cleaning apparatus as shown in FIG. 9, under conditions as shown in Table 68.

After the cutting, the substrate 601 placed on the feed stand 911 is transported into the cleaning bath 621 by means of the transport mechanism 603. Trichloroethane (trade name: ETHANA VG; available from Asahi Chemical Industry Co., Ltd.) contained in the cleaning bath 621 cleans the substrate to remove cutting oil and cuttings adhered to its surface.

After the cleaning, the substrate 601 is carried onto the transport stand 651 by means of the transport mechanism 603.

On the substrate thus pretreated, films were formed in the same manner as in Example 27 under conditions as shown in Table 69, to give what is called a function-separated electrophotographic photosensitive member 605, as shown in FIG. 16, having on a substrate 1601 a charge transport layer 1602, a charge generation layer 1603 and a surface layer 1604 in the three-layer structure. Performances of the electrophotographic photosensitive members thus obtained were evaluated in the same manner as in Example 27. Results obtained are shown in Table 67 together with the results in Example 27.

As is clear from Table 67, the method of the present invention has brought about an improvement in sensitivity, and has held the residual potential to a low level. In particular, superior performances are seen to have been achieved with regard to surface haze and halftone unevenness.

EXAMPLE 28

On the substrate pretreated in the same manner as in Example 27 using the substrate surface treatment apparatus as shown in FIG. 2, films were formed by microwave glow discharging making use of the electrophotographic photosensitive member manufacturing apparatus as shown in FIGS. 3 and 4, under conditions as shown in Table 70. Electrophotographic photosensitive members were thus produced. Performances of the electrophotographic photosensitive members thus obtained were evaluated in the same manner as in Example 27. As a result, entirely the same results as in Example 27 were obtained.

Comparative Example 12

On the conductive substrate pretreated in the same manner as in Comparative Example 11 using the substrate surface treatment apparatus as shown in FIG. 9, films were formed by microwave glow discharging making use of the electrophotographic photosensitive member manufacturing apparatus as shown in FIGS. 3 and 4, under conditions as shown in Table 71, to give what is called a function-separated electrophotographic photosensitive member, having on a substrate a first photoconductive layer, a second photoconductive layer and a surface layer in the three-layer structure. Performances of the electrophotographic photosensitive members thus obtained were evaluated in the same manner as in Example 28. As a result, entirely the same results as in Comparative Example 11 were obtained.

EXAMPLE 29

Figure 27:
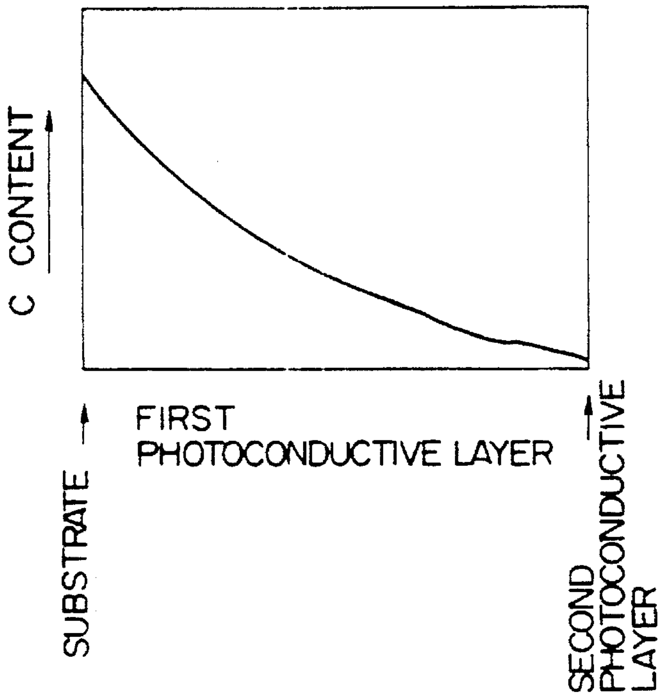
Figure 28:
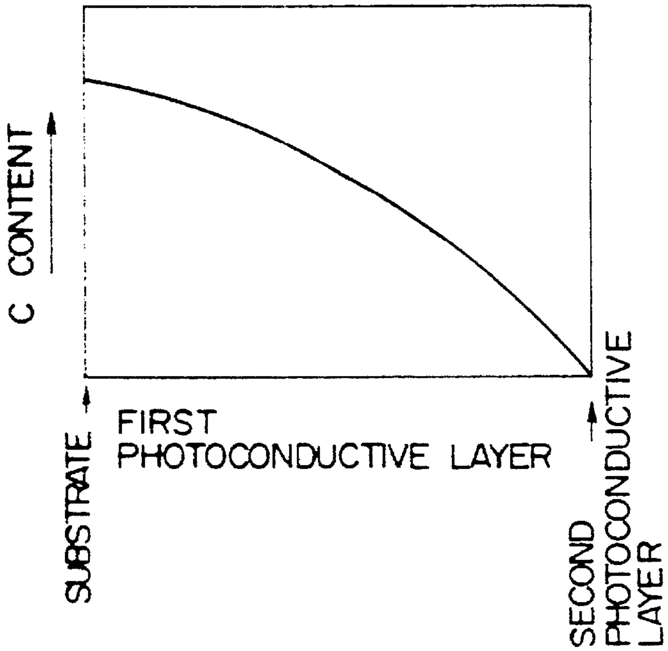

On the substrate pretreated in the same manner as in Example 27 using the substrate surface treatment apparatus as shown in FIG. 2, films were formed by high-frequency glow discharging according to the procedure as preciously described in detail, using the electrophotographic photosensitive member manufacturing apparatus as shown in FIG. 14, under conditions as shown in Table 72. An electrophotographic photosensitive member was thus produced. In the present Example, the flow rate of $CH_4$ fed when the photoconductive layer was formed was varied so that a pattern of changes in carbon content in the photoconductive layer was made to be as shown in FIG. 27 or 28. Thus, two kinds of photosensitive members were produced. In the both patterns, the carbon content in the substrate surface of the photoconductive layer on its substrate side was so controlled as to be about 30 atomic %. The carbon content was determined as an absolute content by elementary analysis using the Rutherford backward scattering method to prepare a calibration curve of a standard sample, and comparing samples prepared, with the standard sample on the basis of signal strength according to Auger spectroscopy.

The electrophotographic photosensitive members thus produced were visually observed to examine the surface haze. Thereafter they were each set in a modified electrophotographic apparatus of a copier NP7550, manufactured by Canon Inc., and charge performance, sensitivity and residual potential were evaluated in the same manner as in Example 27. Results obtained ere shown in Table 73.

Comparative Example 13

Figure 29:
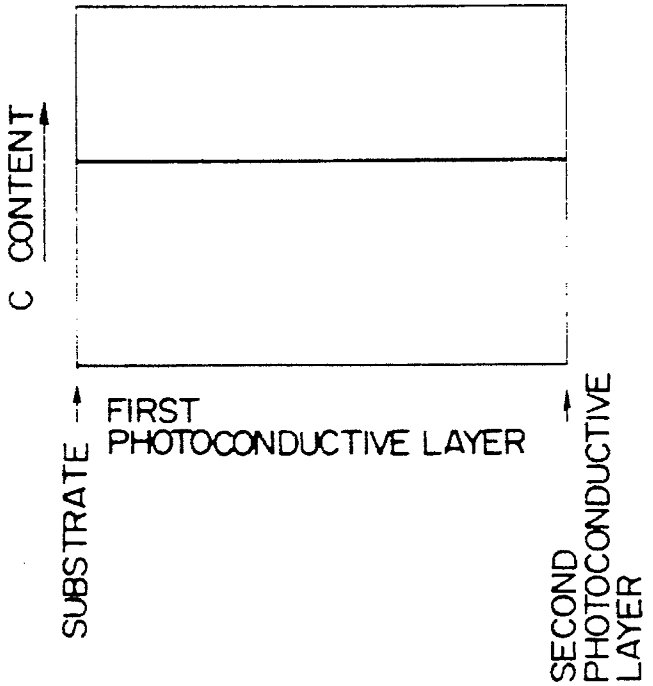
FIGS. 29 and 30 are each a graph to show a pattern of distribution of carbon content in a photoconductive layer according to a comparative example.
Figure 30:
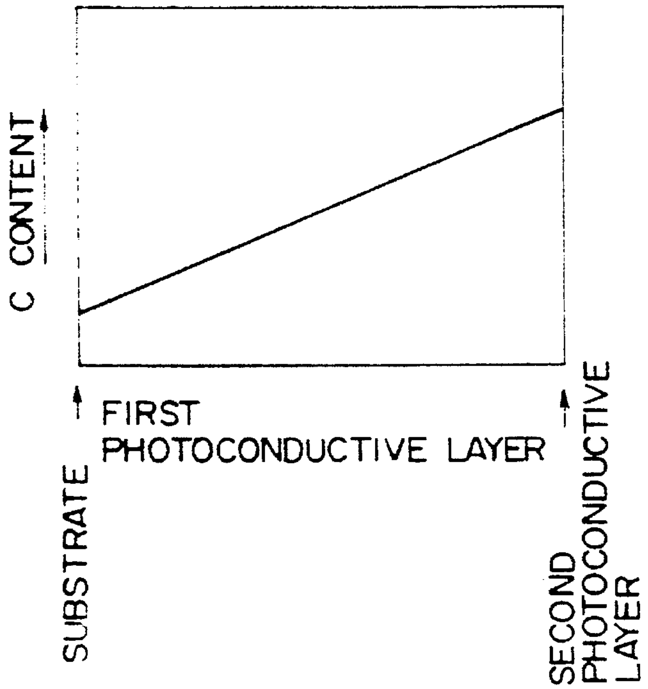

On the substrate pretreated in the same manner as in Comparative Example 29, films were formed according to a pattern of changes in carbon content as shown in FIG. 29 or 30. Electrophotographic photosensitive members were thus produced. Performances thereof were evaluated in the same manner as in Example 29. Results are shown in Table 73 together with the results of evaluation in Example 29.

With the pattern of changes in the carbon content in the photoconductive layer in accordance with the present invention, better results than the results in Comparative Example 13 are seen to have been obtained particularly in respect of surface haze, uneven sensitivity, uneven residual potential and halftone unevenness.

EXAMPLE 30

On the substrate pretreated in the same manner as in Example 27 using the substrate surface treatment apparatus as shown in FIG. 2, films were formed in the same manner as in Example 29 except for using microwave glow discharging, using the electrophotographic photosensitive member manufacturing apparatus as shown in FIGS. 3 and 4, under conditions as shown in Table 74. Electrophotographic photosensitive members were thus produced. In the present Example, the flow rate of $CH_4$ fed when the photoconductive layer was formed was varied so that a pattern of changes in carbon content in the photoconductive layer was made to be as shown in FIG. 27 or 28. In the both patterns, the carbon content in the substrate surface of the photoconductive layer on its substrate side was so controlled as to be about 30 atomic %. The carbon content was determined as an absolute content by elementary analysis using the Rutherford backward scattering method to prepare a calibration curve of a standard sample, and comparing samples prepared, with the standard sample on the basis of signal strength according to Auger spectroscopy. The electrophotographic photosensitive members thus produced brought about entirely the same results as in Example 28.

Comparative Example 14

On the substrate pretreated in the same manner as in Comparative Example 11 using the substrate surface treatment apparatus as shown in FIG. 9, films were formed in the same manner as in Example 30 but with a pattern of carbon content as shown in FIG. 29 or 30, to produce electrophotographic photosensitive members. Performances of the electrophotographic photosensitive members thus obtained were evaluated in the same manner as in Example 30. As a result, entirely the same results as in Comparative Example 13 were obtained.

EXAMPLE 31

On the substrate pretreated in the same manner as in Example 27 using the substrate surface treatment apparatus as shown in FIG. 2, films were formed by high-frequency glow discharging according to the procedure as preciously described in detail, using the electrophotographic photosensitive member manufacturing apparatus as shown in FIG.

14, under conditions as shown in Table 66. Electrophotographic photosensitive members were thus produced. In the present Example, the carbon content in the surface of the photoconductive layer on its substrate side was varied by varying the flow rate of $CH_4$ fed when the photoconductive layer was formed, according to a pattern of changes in carbon content as shown in FIG. 26. The carbon content in the surface of photoconductive layer on its substrate side was determined in the same manner as previously described, according to Auger spectroscopy.

The electrophotographic photosensitive members thus produced were observed to examine the surface haze and the number of spherical protuberances occurred. Thereafter the photosensitive members were each set in an electrophotographic apparatus modified for experimental purpose from a copier NP7550, manufactured by Canon Inc., and electrophotographic performances and image quality, such as charge performance, sensitivity, residual potential, white dots and halftone unevenness were evaluated. On each items, evaluation was made in the following way.

(1) Surface haze:

Evaluated in the same manner as in Example 27.

(2) Number of spherical protuberances:

The whole area of the surface of the electrophotographic photosensitive member produced was observed with an optical microscope to examine the number of spherical protuberances with diameters of 20 μm or larger in the area of 100 $cm^2$ Results were obtained in all the electrophotographic photosensitive members. A largest number of the spherical protuberances among them was assumed as 100% to make relative comparison. Results obtained are grouped into the following:

AA: Less than 60%.

A: Less than 80 to 60%.

B: 100 to 80%.

(3) Charge performance, sensitivity, sensitivity unevenness, residual potential:

Evaluated in the same manner as in Example 27.

(4) White dots, halftone unevenness:

Evaluated in the same manner as in Example 27.

Results thus obtained are shown together in Table 75. As is clear from the results, improvements in performances are seen when the carbon content in the surface of photoconductive layer on its substrate side is in the range of from 0.5 to 50 atomic %. Very good results are obtained when it is in the range of from 1 to 30 atomic %.

EXAMPLE 32

On the substrate pretreated in the same manner as in Example 27 using the substrate surface treatment apparatus as shown in FIG. 2, films were formed by microwave glow discharging according to the procedure as preciously described in detail, using the electrophotographic photosensitive member manufacturing apparatus as shown in FIGS. 3 and 4, under conditions as shown in Table 70. Electrophotographic photosensitive members were thus produced. In the present Example, the carbon content in the surface of the photoconductive layer on its substrate side was varied by varying for each photosensitive member the flow rate of $CH_4$ fed when the photoconductive layer was formed, according to a pattern of changes in carbon content as shown in FIG. 26.

Evaluation was made in the same manner as in Example 30, to obtain entirely the same results as shown in Table 75 were obtained.

EXAMPLE 33

On the substrate pretreated in the same manner as in Example 27, films were formed by high-frequency glow discharging according to the procedure as preciously described in detail, using the electrophotographic photosensitive member manufacturing apparatus as shown in FIG. 14, under conditions as shown in Table 76. Electrophotographic photosensitive members were thus produced. In the present Example, the flow rate of $SiF_4$ fed when the photoconductive layer was formed was varied so that the fluorine content in the photoconductive layer was changed as shown in FIG. 76.

(I) The electrophotographic photosensitive members thus produced were each set in an electrophotographic apparatus modified for experimental purpose from a copier NP7550, manufactured by Canon Inc., and electrophotographic performances concerning white dots, halftone unevenness and ghost were evaluated before an accelerated running tests was carried out. On each items, evaluation was made in the same manner as in Examples 27 and 31. Evaluation on ghost was made in the following way.

Ghost

A ghost chart prepared by Canon Inc. (parts number: FY9-9040) on which a solid black circle with a reflection density of 1.1 and a diameter of 5 mm has been stuck is placed on an original glass plate at an image leading area, and a halftone chart prepared by Canon Inc. is superposed thereon, in the state of which copies are taken. In the copied images thus obtained, the difference between the reflection density in the area with the diameter of 5 mm on the ghost chart and the reflection density of the halftone area is measured, which difference is seen on the halftone copy.

The following shows criterions evaluation.

AA: Particularly good.

A: Good.

B: No problems in practical use.

C: Problematic in practical use.

Results thus obtained are shown together in Table 77.

(II) Next, the electrophotographic photosensitive members produced were each set in an electrophotographic apparatus modified for experimental purpose from a copier NP7550, manufactured by Canon Inc., and an accelerated running test corresponding to 3,000,000 sheets was carried out. Then, electrophotographic performances concerning white dots, halftone unevenness and ghost were evaluated in the same way as in the test (I). Results thus obtained are shown together in Table 78.

The results shown in Tables 77 and 78 show that electrophotographic photosensitive members very superior also in regard to the image characteristics and also the durability can be produced when the fluorine content in the photoconductive layer is set within the range of 95 atomic ppm or less.

EXAMPLE 34

On the substrate pretreated in the same manner as in Example 27 using the substrate surface treatment apparatus as shown in FIG. 2, films were formed by microwave glow discharging in the same manner as in Example 33, using the electrophotographic photosensitive member manufacturing apparatus as shown in FIGS. 3 and 4, under conditions as shown in Table 79. Electrophotographic photosensitive members were thus produced. Electrophotographic performances of the electrophotographic photosensitive members Thus produced were evaluated in the same manner as in Example 33. Results obtained were entirely the same as those shown in Tables 77 and 78.

EXAMPLE 35

On the substrate pretreated in the same manner as in Example 27 using the substrate surface treatment apparatus as shown in FIG. 2, films were formed by high-frequency glow discharging, using the electrophotographic photosensitive member manufacturing apparatus as shown in FIG. 14, under conditions as shown in Table 80. Electrophotographic photosensitive members were thus produced. In the present experiment, the flow rate of $CH_4$ fed when the surface layer was formed was varied so that the amount of carbon contained in the surface layer was changed.

The electrophotographic photosensitive members produced were each set in an electrophotographic apparatus modified for experimental purpose from a copier NP8580, manufacture by Canon Inc., and charge performance, residual potential, images obtained before a running test and images obtained after an accelerated running test corresponding to 3,000,000 sheets were evaluated in the following manner.

Charge performance

Evaluated in the same manner as in Example 27.

Residual potential

Evaluated in the same manner as in Example 27.

Evaluation of image after running

With regard to both white dots and scratches, criterion samples are prepared, and the total of evaluation was grouped into the following four grades.

AA: Particularly Good.

A: Good.

B: No problems in practical use.

C: Problematic in practical use.

Results thus obtained are shown together in Table 81. As is clear from the table, remarkable improvements are seen in charge performance and durability when the carbon content is in the range of from 40 to 90 atomic %.

EXAMPLE 36

On the substrate pretreated in the same manner as in Example 27 using the substrate surface treatment apparatus as shown in FIG. 2, films were formed by microwave glow discharging in the same manner as in Example 35, using the electrophotographic photosensitive member manufacturing apparatus as shown in FIGS. 3 and 4, under conditions as shown in Table 82. Electrophotographic photosensitive members were thus produced. In the present experiment, the flow rate of $CH_4$ fed when the surface layer was formed was varied so that the amount of carbon contained in the surface layer was changed.

Performances of the electrophotographic photosensitive members produced were evaluated in the same manner as in Example 35. As a result, entirely the same results as those shown in Table 81 were obtained.

EXAMPLE 37

On the substrate pretreated in the same manner as in Example 27 using the substrate surface treatment apparatus as shown in FIG. 2, films were formed by high-frequency glow discharging, using the electrophotographic photosensitive member manufacturing apparatus as shown in FIG. 14, under conditions as shown in Table 83. Electrophotographic photosensitive members were thus produced. In the present experiment, the flow rate(s) of $H_2$ and/or $SiF_4$ fed when the surface layer was formed was varied so that the amounts of hydrogen atoms and fluorine atoms contained in the surface layer were changed.

The electrophotographic photosensitive members produced were each set in an electrophotographic apparatus modified for experimental purpose from a copier NP8580, manufactured by Canon Inc., and evaluation was made on three items, residual potential, sensitivity and smeared images.

Residual potential

Evaluated in the same manner as in Example 27.

Sensitivity

Evaluated in the same manner as in Example 27.

Sensitivity unevenness

Evaluated in the same manner as in Example 27.

Smeared image

A test chart manufactured by Canon Inc. (parts number FY9-9058) with a white background having characters on its whole area was placed on an original glass plate, and copies are taken at an amount of exposure twice the amount of usual exposure. Copy images obtained are observed to examine whether or not the fine lines on the image are continuous without break-off. When unevenness was seen on the image during this evaluation, the evaluation was made on the whole-area image region and the results are given in respect of the worst area.

AA: Good.

A: Lines are broken off in part.

B: Lines are broken off at many portions, but can be read as characters without no problem in practical use.

Results obtained are shown in Table 84. As is clearly seen from Table 84, good results are obtained on both the residual potential and the sensitivity and also smeared images under strong exposure can be greatly decreased, when the total of the hydrogen content and fluorine content is in the range of from 30 to 70 atomic % and also the fluorine content is within the range of 20 atomic % or less.

EXAMPLE 38

On the substrate pretreated in the same manner as in Example 27 using the substrate surface treatment apparatus as shown in FIG. 2, films were formed by microwave glow discharging, using the electrophotographic photosensitive member manufacturing apparatus as shown in FIGS. 3 and 4 in the same manner as in Example 36, under conditions as shown in Table 85. Electrophotographic photosensitive members were thus produced. The flow rate of He was varied so as to be constant at 2,000 sccm in total with the flow rate of $H_2$, and the inner pressure was kept constant. Performances of the electrophotographic photosensitive members thus produced were evaluated in the same manner as in Example 36. As a result, entirely the same results as those shown in Table 84 were obtained.

EXAMPLE 39

On the substrate pretreated in the same manner as in Example 27 using the substrate surface treatment apparatus as shown in FIG. 2 under conditions as shown in Table 86, films were formed by microwave glow discharging, using the electrophotographic photosensitive member manufacturing apparatus as shown in FIG. 3 and 4, under conditions as shown in Table 87. Electrophotographic photosensitive members were thus produced. In the present Example, the flow rates of $SiF_4$ and $SiH_4$ were smoothly varied within the range of from 10 to 50 ppm as a value of $SiF_4/SiH_4$ so that the content of fluorine atoms in the photoconductive layer was in the form of distribution shown in FIG. photosensitive members were produced. Electrophotographic photosensitive members were also used under the same conditions except that no fluorine was contained. Performances of these 5 kinds of electrophotographic photosensitive members were evaluated.

Surface haze, charge performance, sensitivity, residual potential, white dots, halftone unevenness, ghost Evaluated in the same manner as in Example 27.

Temperature characteristics

The electrophotographic photosensitive members produced are each set in a copying machine modified for experimental purpose from a copier NP7550, manufactured by Canon Inc. The surface temperature of the electrophotographic photosensitive member was varied from 30° to 45° C., and a high voltage of +6 kV is applied to effect corona charging. The dark portion surface potential of the photosensitive member is measured using a surface potentiometer. The changes in surface temperature of the dark portion with respect to the surface temperature are approximated in a straight line. The slope thereof is regarded as "temperature characteristics", and shown in unit of [V/deg].

Evaluation criterions:

AA: Very good.

A: Good.

B: No problems in practical use.

C: Of no practical use.

Results thus obtained are shown in Table 88. As is seen from the table, all the electrophotographic performances finally including ghost and temperature characteristics are improved when fluorine is contained in the photoconductive layer and also made to distribute in the layer thickness direction.

As having been described above, according to the present invention, the step of forming on the substrate the non-monocrystalline film containing at least a silicon atom and any one of a hydrogen atom and a fluorine atom or both is preceded with the step of cutting the surface layer of the substrate to remove it in a given thickness and the step of bringing the cut substrate surface into contact with water under the desired conditions after the cutting step. This makes it possible to more effectively treat the substrate surface and also to inexpensively and constantly manufacture electrophotographic photosensitive members capable of giving uniform and high-grade images.

In another embodiment, the cutting step is followed by the step of subjecting the cut substrate surface to ultrasonic cleaning using a water-based cleaning fluid and the step of bringing the cleaned substrate surface into contact with pure water. This also makes it possible to more effectively treat the substrate surface and also to inexpensively and constantly manufacture electrophotographic photosensitive members capable of giving uniform and high-grade images.

In still another embodiment, after the cutting of the substrate surface and before the formation of the deposited film by plasma CVD, the cut substrate surface is cleaned with water and further brought into contact with an alcohol type medium. This makes it possible to eliminate occurrence of particles of the deposited film and peel-off thereof, and manufacture electrophotographic photosensitive members with a good quality in a high yield.

In a further embodiment of the present invention, the carbon content in the photoconductive layer is made to continuously change from the side of the conductive substrate. This makes it possible to smoothly connect the functions of generating charges (or photocarries) and transporting the generated charges that are important to electrophotographic photosensitive members, so that any faulty travel or pass of charges that is ascribable to the difference in optical energy between the charge generation layer and charge transport layer, which is questioned in what is called the function-separated light receiving member separated into the charge generation layer and charge transport layer, can be prevented to contribute an improvement in photosensitivity and a decrease in residual potential.

Since the photoconductive layer contains carbon, the photoreceptive layer can be made to have a smaller dielectric constant, and hence the electrostatic capacity per layer thickness can be decreased. This brings about a high charge performance and a remarkable improvement in photosensitivity, and also brings about an improvement in breakdown voltage against a high voltage.

Since the layer containing carbon in a large quantity is disposed on the side of the conductive substrate, the charges from the conductive substrate can be prevented from being injected into the layer or layers formed thereon, and hence the charge performance can be improved, the adhesion between the conductive substrate and the photoconductive layer can be improved, and the film separation (peel-off) or other minute faults can be prevented from occurring.

In addition, use of the photoconductive layer of the present invention, constituted as described above, can bring about a dramatical improvement in durability while superior electrical characteristics are maintained, as a high charge performance, a high sensitivity and a low residual potential.

More specifically, because of an improvement in adhesion between films, a cleaning blade or separation claw can be less damaged even when images are continuously formed in a large quantity, and cleaning performance and transfer sheet separation performance can also be improved. Hence, the durability required for image forming apparatus can be dramatically improved. Moreover, since a decrease in dielectric constant also brings about an improvement in the durability against a high voltage, "leak dots" that may occur because of insulation failure of part of the light receiving member.

The present invention can also bring about a great improvement in the yield that may have been questioned because of a faulty appearance such as the photosensitive member surface haze after manufacture, and, in particular, can greatly decrease the unevenness pertaining to electrical characteristics as exemplified by uneven charge performance, uneven sensitivity and halftone unevenness.

The effects as stated above can be particularly remarkable when the layers are formed in a high deposition rate as in microwave plasma CVD.

Moreover, the photoconductive layer of the present invention, constituted as described above, can have a dense film quality. Hence, charges can be effectively blocked from being injected from the surface when subjected to charging, and the charge performance, service-environment compatibility, durability and electrical breakdown voltage can be improved. Furthermore, since the carrier accumulation at the interface between the photoconductive layer and surface layer can be decreased, smeared images can be prevented even when the charge performance is maintained in a high state.

The present invention also does not adversely affect the local environment since the substrate surface can be well treated even without use of halogenated hydrocarbon type organic solvents or other solutions such as specified chlorofluorohydrocarbons.

TABLE 1

| Treatment conditions | Precleaning | Water treatment | Drying |
|---|---|---|---|
| Treating agent: | Trichloroethane | Pure water (resistivity: 17.5 MΩ· cm) | Air |
| Temp.: | 50° C. | 40° C. | 80° C. |
| Pressure: | — | Varied | 5 kg · f/cm$^2$ |
| Treating time: | 3 min | 20 sec | 1 min |
| Others: | Ultrasonic treatment | | |

TABLE 2

| Film-forming conditions | Layer structure: Charge blocking layer | Photo-conductive layer | Surface Layer |
|---|---|---|---|
| Starting material gas flow rate: | | | |
| $SiH_4$ | 350 sccm | 350 sccm | 70 sccm |
| He | 100 sccm | 100 sccm | 100 sccm |
| $CH_4$ | 0 sccm | 0 sccm | 350 sccm |
| $B_2H_6$ | 1,000 ppm | 0 ppm | 0 ppm |
| Pressure: | 10 mtorr | 10 mtorr | 12 mtorr |
| Microwave power: | 1,000 W | 1,000 W | 1,000 W |
| Bias voltage: | 100 V | 100 V | 100 V |
| Layer thickness: | 3 μm | 25 μm | 0.5 μm |

TABLE 3

| Water pressure (kg · f/cm$^2$ | Uneven image | Pear-skin appearance |
|---|---|---|
| 0 | C | AA |
| 2 | B | AA |
| 7 | B | AA |
| 10 | A | AA |
| 17 | A | AA |
| 20 | AA | AA |
| 50 | AA | AA |
| 150 | AA | AA |
| 170 | AA | A |
| 200 | AA | A |
| 230 | A | B |
| 300 | A | B |
| 350 | A | C |
| Comparative test: | C | A |

TABLE 4

| Treatment conditions | Cleaning | Drying |
|---|---|---|
| Treating | Trichloroethane | Air |
| Temp.: | 50° C. | 80° C. |
| Pressure: | — | 5 kg · f/cm$^2$ |
| Treating time: | 3 min | 1 min |
| Others: | Ultrasonic treatment | |

TABLE 5

| Treatment conditions | Precleaning | Water treatment | Drying |
|---|---|---|---|
| Treating agent: | Trichloroethane | Pure water (resistivity: 17.5 MΩ · cm) | Air |
| Temp.: | 50° C. | Varied | 80° C. |
| Pressure: | — | 50 kg · f/cm$^2$ | 5 kg · f/cm$^2$ |
| Treating time: | 3 min | 20 sec | 1 min |
| Others: | Ultrasonic treatment | | |

TABLE 6

| Temperature (°C.) | Uneven image | Peel-off |
|---|---|---|
| 7 | C | AA |
| 10 | B | AA |
| 17 | B | AA |
| 20 | A | AA |
| 27 | A | AA |
| 30 | AA | AA |
| 45 | AA | AA |
| 60 | AA | AA |
| 65 | AA | A |
| 75 | AA | A |
| 85 | A | B |
| 90 | A | B |
| 95 | A | C |
| Comparative test: | C | A |

TABLE 7

| Treatment conditions | Precleaning | Water treatment | Drying |
|---|---|---|---|
| Treating agent: | Trichloroethane | Pure water (resistivity: Varied ) | Air |
| Temp.: | 50° C. | 40° C. | 80° C. |
| Pressure: | — | 50 kg · f/cm$^2$ | 5 kg · f/cm$^2$ |
| Treating time: | 3 min | 20 sec | 1 min |
| Others: | Ultrasonic treatment | | |

TABLE 8

| Resistivity (MΩ · cm) | Uneven image | Black spots |
|---|---|---|
| 18.0 | AA | AA |
| 17.5 | AA | AA |
| 17.3 | AA | A |
| 17.0 | AA | A |
| 16.7 | AA | B |
| 16.0 | AA | B |
| 15.7 | A | C |
| Comparative test: | C | A |

TABLE 9

| Treatment conditions | Precleaning | Water treatment | Drying |
|---|---|---|---|
| Treating agent: | Trichloroethane | Pure water (resistivity: 17.5 MΩ · cm) | Air |

TABLE 9-continued

| Treatment conditions | Precleaning | Water treatment | Drying |
|---|---|---|---|
| Temp.: | 50° C. | 40° C. | 80° C. |
| Pressure: | — | 50 kg · f/cm$^2$ | 5 kg · f/cm$^2$ |
| Treating time: | 3 min | 20 sec | 1 min |
| Others: | Ultrasonic treatment | | |

TABLE 10

| | Present Invention | Comparative Example 1 |
|---|---|---|
| Uneven image: | AA | C |
| Pear-skin appearance: | AA | A |
| Peel-off | AA | A |
| Black spots: | AA | A |
| White dots: | AA | A |
| Fine-line reproduction: | AA | A |
| Fogging: | AA | B |

TABLE 11

| | Layer structure | | |
|---|---|---|---|
| Film-forming conditions | Charge blocking layer | Photo-conductive layer | Surface layer |
| Starting material gas flow rate: | | | |
| $SiH_4$ | 250 sccm | 350 sccm | 20 sccm |
| He | 250 sccm | 350 sccm | 100 sccm |
| $CH_4$ | 0 sccm | 0 sccm | 500 sccm |
| $B_2H_6$ | 2,000 ppm | 0 ppm | 0 ppm |
| Pressure: | 0.3 torr | 0.5 torr | 0.4 torr |
| RF power: | 300 W | 400 W | 300 W |
| Layer thickness: | 3 μm | 25 μm | 0.5 μm |

TABLE 12

| | Layer structure | | | |
|---|---|---|---|---|
| Film-forming conditions | Charge blocking layer | Charge transport layer | Charge genera-tion layer | Surface layer |
| Starting material gas flow rate: | | | | |
| $SiH_4$ | 350 sccm | 350 sccm | 350 sccm | 70 sccm |
| He | 100 sccm | 100 sccm | 100 sccm | 100 sccm |
| $CH_4$ | 35 sccm | 35 sccm | 0 sccm | 350 sccm |
| $B_2H_6$ | 1,000 ppm | 0 ppm | 0 ppm | 0 ppm |
| Pressure: | 11 mtorr | 11 mtorr | 10 mtorr | 12 mtorr |
| Microwave power: | 1,000 W | 1,000 W | 1,000 W | 1,000 W |
| Bias voltage: | 100 V | 100 V | 100 V | 100 V |
| Layer thickness: | 3 μm | 20 μm | 5 μm | 0.5 μm |

TABLE 13

| Treatment conditions | Water Precleaning | treatment | Drying |
|---|---|---|---|
| Treating agent: | Aqueous neutral detergent solution | Pure water (resistivity: 17.5 MΩ · cm) | Air |
| Temp.: | 60° C. | 40° C. | 80° C. |
| Pressure: | — | 50 kg · f/cm$^2$ | 5 kg · f/cm$^2$ |
| Treating time: | 3 min | 20 sec | 1 min |
| Others: | Ultrasonic treatment | | |

TABLE 14

| Treatment conditions | Precleaning | Water treatment | Drying |
|---|---|---|---|
| Treating agent: | Pure water Surfactant(polyethylene glycol nonyl phenyl ether) | Pure water (resistivity: 15 MΩ · cm) | Air |
| Temp.: | 45° C. | 25° C. | 80° C. |
| Pressure: | — | 50 kg · f/cm$^2$ | 5 kg · f/cm$^2$ |
| Treating time: | 3 min | 20 sec | 1 min |
| Ultrasonic output: | Varied (frequency: 60 kHz) | — | — |

TABLE 15

| | Layer structure | | |
|---|---|---|---|
| Film-forming conditions | Charge blocking layer | Photo-conductive layer | Surface layer |
| Starting material gas flow rate: | | | |
| $SiH_4$ | 350 sccm | 350 sccm | 70 sccm |
| He | 100 sccm | 100 sccm | 100 sccm |
| $CH_4$ | 0 sccm | 0 sccm | 350 sccm |
| $B_2H_6$ | 1,000 sccm | 0 sccm | 0 sccm |
| Pressure: | 10 mtorr | 10 mtorr | 10 mtorr |
| Microwave power: | 1,000 W | 1,000 W | 1,000 W |
| Bias Voltage: | 100 V | 100 V | 100 V |
| Layer thickness: | 3 μm | 25 μm | 0.5 μm |

TABLE 16

| Ultrasonic output (W) | Uneven image | White spots |
|---|---|---|
| 0 | B | B |
| 70 | B | B |
| 100 | A | A |
| 700 | A | A |
| 1,000 | AA | AA |
| 3,000 | AA | AA |
| 10,000 | AA | AA |
| 20,000 | A | A |
| 50,000 | A | A |
| 60,000 | C | B |
| Comparative test: | C | B |

TABLE 17

| Treatment conditions | Cleaning | Drying |
|---|---|---|
| Treating agent: | Trichloroethane | Air |
| Temp.: | 50° C. | 80° C. |
| Pressure: | — | 5 kg · f/cm$^2$ |
| Treating time: | 3 min | 1 min |
| Ultrasonic output: | 400 W (frequency: 28 kHz) | — |

TABLE 18

| Treatment conditions | Precleaning | Water treatment | Drying |
|---|---|---|---|
| Treating agent: | Pure water Surfactant(polyethylene glycol nonyl phenyl ether) | Pure water (resistivity: 15 MΩ · cm) | Air |
| Temp.: | 45° C. | 25° C. | 80° C. |
| Pressure: | — | 50 kg · f/cm$^2$ | 5 kg · f/cm$^2$ |
| Treating time: | 3 min | 20 sec | 1 min |
| Ultrasonic output: | 400 W (frequency: Varied) | — | — |

TABLE 19

| Ultrasonic frequency (kHz) | Uneven image | White spots |
|---|---|---|
| 17 | C | C |
| 20 | B | B |
| 35 | A | A |
| 50 | AA | AA |
| 200 | AA | AA |
| 1,000 | AA | AA |
| 5,000 | A | A |
| 10,000 | B | B |
| 12,000 | C | C |

TABLE 20

| Treatment conditions | Precleaning | Water treatment | Drying |
|---|---|---|---|
| Treating agent: | Pure water Surfactant(polyethylene glycol nonyl phenyl ether) | Pure water (resistivity: 15 MΩ · cm) | Air |
| Temp.: | 45° C. | Varied | 80° C. |
| Pressure: | — | 50 kg · f/cm$^2$ | 5 kg · f/cm$^2$ |
| Treating time: | 3 min | 20 sec | 1 min |
| Ultrasonic output: | 400 W (frequency: 60 kHz) | — | — |

TABLE 21

| Temperature (°C.) | Uneven image | Peel-off |
|---|---|---|
| 0 | C | AA |

TABLE 21-continued

| Temperature (°C.) | Uneven image | Peel-off |
|---|---|---|
| 5 | B | AA |
| 7 | B | AA |
| 10 | A | AA |
| 12 | A | AA |
| 15 | AA | AA |
| 25 | AA | AA |
| 40 | AA | AA |
| 45 | A | AA |
| 55 | A | AA |
| 75 | B | A |
| 90 | B | B |
| 95 | C | C |
| Comparative test: | C | A |

TABLE 22

| Treatment conditions | Precleaning | Water treatment | Drying |
|---|---|---|---|
| Treating agent: | Pure water Surfactant(polyethylene glycol nonyl phenyl ether) | Pure water (resistivity: Varied) | Air |
| Temp.: | 45° C. | 25° C. | 80° C. |
| Pressure: | — | 50 kg · f/cm$^2$ | 5 kg · f/cm$^2$ |
| Treating time: | 3 min | 20 sec | 1 min |
| Ultrasonic output: | 400 W (frequency: 60 kHz) | — | — |

TABLE 23

| Resistivity (MΩ · cm) | Uneven image | White spots |
|---|---|---|
| 17.0 | AA | AA |
| 15.0 | AA | AA |
| 14.0 | AA | A |
| 13.0 | AA | A |
| 12.0 | A | B |
| 11.0 | A | B |
| 10.0 | B | C |
| Comparative test: | C | B |

TABLE 24

| Treatment conditions | Precleaning | Water treatment | Drying |
|---|---|---|---|
| Treating agent: | Pure water Surfactant(polyethylene glycol nonyl phenyl ether) | Pure water (resistivity: 15 MΩ · cm) | Air |
| Temp: | 45° C. | 25° C. | 80° C. |
| Pressure: | — | Varied | 5 kg · f/cm$^2$ |
| Treating time: | 3 min | 20 sec | 1 min |
| Ultrasonic output: | 400 W (frequency: 60 kHz) | — | — |

TABLE 25

| Water pressure (kg · f/cm$^{2)}$ | Uneven image | Pear-skin appearance |
|---|---|---|
| 0 | C | AA |
| 1 | B | AA |
| 4 | B | AA |
| 5 | A | AA |
| 8 | A | AA |
| 10 | AA | AA |
| 50 | AA | AA |
| 150 | AA | AA |
| 170 | AA | A |
| 200 | AA | A |
| 230 | A | B |
| 300 | A | B |
| 350 | A | C |
| Comparative test: | C | A |

TABLE 26

| Treatment conditions | Precleaning | Water treatment | Drying |
|---|---|---|---|
| Treating agent: | Pure water Surfactant(polyethylene glycol nonyl phenyl ether) | Pure water (resistivity: 15 MΩ · cm) | Air |
| Temp.: | 45° C. | 25° C. | 80° C. |
| Pressure: | — | 50 kg · f/cm$^2$ | 5 kg · f/cm$^2$ |
| Treating time: | 3 min | 20 sec | 1 min |
| Ultrasonic output: | 400 W (frequency: 60 kHz) | — | — |

TABLE 27

| | Present | Comparative Example | |
|---|---|---|---|
| | Invention | 2 | 3 |
| Uneven image: | AA | C | B |
| White spots: | AA | B | B |
| Peel-off | AA | A | C |
| Pear-skin appearance: | AA | A | B |
| White dots: | AA | A | C |
| Fogging: | AA | B | B |

TABLE 28

| | Layer structure | | |
|---|---|---|---|
| Film-forming conditions | Charge blocking layer | Photoconductive layer | Surface layer |
| Starting material gas flow rate: | | | |
| $SiH_4$ | 250 sccm | 350 sccm | 20 sccm |
| He | 250 sccm | 350 sccm | 100 sccm |
| $CH_4$ | 0 sccm | 0 sccm | 500 sccm |
| $B_2H_6$ | 1,000 ppm | 0 ppm | 0 ppm |
| Pressure: | 0.3 torr | 0.5 torr | 0.4 torr |
| RF power: | 300 W | 400 W | 300 W |
| Layer thickness: | 3 μm | 25 μm | 0.5 μm |

TABLE 29

| Treatment conditions | Cleaning | Drying |
|---|---|---|
| Treating agent: | Pure water (resistivity: 10 MΩ · cm) | Nitrogen gas |
| Temp.: | 50° C. | 25° C. |
| Pressure: | 100 kg · f/cm$^2$ | 5 kg · f/cm$^2$ |
| Treating time: | 3 min | 1 min |

TABLE 30

| Film-forming conditions | Layer structure: Infrared absorbing layer | Charge blocking layer | Photo-conductive layer | Surface layer |
|---|---|---|---|---|
| Starting material gas flow rate: | | | | |
| $SiH_4$ | 200 sccm | 350 sccm | 350 sccm | 70 sccm |
| He | 100 sccm | 100 sccm | 100 sccm | 100 sccm |
| $CH_4$ | 0 sccm | 0 sccm | 0 sccm | 350 sccm |
| $GeH_4$ | 200 sccm | 0 sccm | 0 sccm | 0 sccm |
| $B_2H_6$ | 9 ppm | 1,000 ppm | 0 ppm | 0 ppm |
| Pressure: | 12 mtorr | 10 mtorr | 10 mtorr | 12 mtorr |
| Microwave power: | 1,000 W | 1,000 W | 1,000 W | 1,000 W |
| Bias voltage | 100 V | 100 V | 100 V | 100 V |
| Layer thickness: | 1 μm | 3 μm | 25 μm | 0.5 μm |

TABLE 31

| Treatment conditions | Precleaning | Water treatment | Drying |
|---|---|---|---|
| Treating agent: | Pure water Surfactant (sodium dodecanol sulfate) | Pure water (resistivity: 15 MΩ · cm) | Air |
| Temp.: | 45° C. | 25° C. | 80° C. |
| Pressure: | — | 50 kg · f/cm$^2$ | 5 kg · f/cm$^2$ |
| Treating time: | 3 min | 20 sec | 1 min |
| Ultrasonic output: | 400 W (frequency: 200 kHz) | — | — |

TABLE 32

| Cleaning bath | Water rinse bath | Alcohol rinse bath | Drying bath |
|---|---|---|---|
| Surfactant: Polyethylene glycol nonyl phenyl ether (aqueous 1% solution) Temperature: 40° C. Time: 60 sec | Temp: 40° C. Time: 60 sec | Temp: 30° C. Time: 60 sec | $N_2$ blow (1.5 kg/cm$^3$) Time: 60 sec |

TABLE 33

| Film-forming conditions | Layer structure: Charge blocking layer | Photo-conductive layer | Surface layer |
|---|---|---|---|
| Starting material gas flow rate: | | | |
| $SiH_4$ | 350 sccm | 350 sccm | 70 sccm |

TABLE 33-continued

| Film-forming conditions | Layer structure: Charge blocking layer | Photo-conductive layer | Surface layer |
|---|---|---|---|
| He | 100 sccm | 100 sccm | 100 sccm |
| $CH_4$ | 0 sccm | 0sccm 350 | sccm |
| $B_2H_6$ | 1,000 sccm | 0 sccm | 0 sccm |
| Pressure: | 10 mtorr | 10 mtorr | 10 mtorr |
| Microwave power: | 1,000 W | 1,000 W | 1,000 W |
| Bias voltage | 100 V | 100 V | 100 V |
| Layer thickness: | 3 μm | 25 μm | 0.5 μm |

TABLE 34

| Time (min) | Example 1 |
|---|---|
| 5 | AA |
| 10 | AA |
| 15 | AA |
| 30 | A |
| 60 | B |
| 120 | B |
| 240 | B |
| Comparative Example 4: | C |

TABLE 35

| Cleaning bath | Water rinse bath | Drying bath |
|---|---|---|
| Surfactant: Polyethylene glycol nonyl phenyl ether (aqueous 1% solution) | Temp: 40° C. | $N_2$ blow: |
| | Time: 60 sec | (1.5 kg/cm$^3$) |
| | | Time: 30 sec |
| | | Time: 30 sec |
| Temperature: 40° C. | | |
| Time: 60 sec | | |

TABLE 36

| Time before loading | Present invention Example 10 | Comparative Example 5 |
|---|---|---|
| 30 minutes | 99% | 95% |
| 1 hour | 97% | 92% |
| 6 hours | 97% | 85% |
| 1 day | 96% | 80% |
| 1 week | 95% | 70% |
| 3 weeks | 95% | 50% |
| 6 weeks | 94% | 30% |
| 10 weeks | 93% | 10% |
| 20 weeks | 92% | 3% |

TABLE 37

| Film-forming conditions | Layer structure | | | |
|---|---|---|---|---|
| | Charge blocking layer | Charge transpor-layer | Charge genera-tion layer | Surface layer |
| Starting material gas flow rate: | | | | |
| $SiH_4$ | 350 sccm | 350 sccm | 350 sccm | 70 sccm |
| He | 100 sccm | 100 sccm | 100 sccm | 100 sccm |
| $CH_4$ | 35 sccm | 35 sccm | 0 sccm | 350 sccm |
| $B_2H_6$ | 1,000 ppm | 0 ppm | 0 ppm | 0 ppm |
| Pressure: | 11 mtorr | 11 mtorr | 10 mtorr | 12 mtorr |
| Microwave power: | 1,000 W | 1,000 W | 1,000 W | 1,000 W |
| Bias voltage: | 100 V | 100 V | 100 V | 100 V |
| Layer thickness: | 3 μm | 20 μm | 5 μm | 0.5 μm |

TABLE 38

| Film-forming conditions | Layer structure | | |
|---|---|---|---|
| | Charge blocking layer | Photo-conductive layer | layer Surface layer |
| Starting material gas flow rate: | | | |
| $SiH_4$ | 250 sccm | 350 sccm | 20 sccm |
| He | 250 sccm | 350 sccm | 100 sccm |
| $CH_4$ | 0 sccm | 0 sccm | 500 sccm |
| $B_2H_6$ | 1,000 ppm | 0 ppm | 0 ppm |
| Pressure: | 0.3 torr | 0.5 torr | 0.4 torr |
| RF power: | 300 W | 400 W | 300 W |
| Layer thickness: | 3 μm | 25 μm | 0.5 μm |

TABLE 39

| Time (min) | Example 13 |
|---|---|
| 5 | AA |
| 10 | AA |
| 15 | AA |
| 30 | A |
| 60 | B |
| 120 | B |
| 240 | B |
| Comparative Example 6: | C |

TABLE 40

| Time before loading | Present invenion Example 13 | Comparative Example 6 |
|---|---|---|
| 30 minutes | 99% | 96% |
| 1 hour | 98% | 93% |
| 6 hours | 97% | 88% |
| 1 day | 97% | 83% |
| 1 week | 97% | 75% |
| 3 weeks | 96% | 62% |
| 6 weeks | 95% | 44% |
| 10 weeks | 94% | 19% |
| 20 weeks | 93% | 10% |

TABLE 41

| Treatment conditions | Precleaning | Water treatment | Drying |
|---|---|---|---|
| Treating agent: | Pure water Surfactant(poly-ethylene glycol nonyl phenyl ether) | Pure water (resistivity: 17.5 MΩ · cm) | Air |
| Temp.: | 45° C. | 25° C. | 80° C. |
| Pressure: | — | 50 kg · f/cm$^2$ | 5 kg · f/cm$^2$ |
| Treating time: | 3 min | 20 sec | 1 min |
| Others: | Ultrasonic treatment (28 kHz, 400 W) | | |

TABLE 42

| Layer | Gas used, and flow rate (sccm) | | RF power (W) | Inner pressure, (torr) | Substrate temp. (°C.) | Layer thickness (μm) |
|---|---|---|---|---|---|---|
| Photoconductive layer | $SiH_4$ | 500 | 500 | 0.5 | 250 | 20 |
| | $CH_4$ | 30 → 0* | | | | |
| | $B_2H_6/SiH_4$ | 15 → 0.2 ppm | | | | |
| Surface layer | $SiH_4$ | 30 | 300 | 0.4 | 250 | 0.5 |
| | $CH_4$ | 500 | | | | |
| | $SiF_4$ | 10 | | | | |
| | $H_2$ | 100 | | | | |

*Varied so as for carbon content to be changed from 30 atomic % to 0 atomic %.

TABLE 43

| | Surface haze | Charge performance | Sensitivity | Residual potential | White dots | Halftone unevenness |
|---|---|---|---|---|---|---|
| Example 14 | AA | AA | A | AA | AA | AA |
| Comparative Example 7 | B | AA | B | A | A | B |

TABLE 44

| Treatment conditions | Cleaning | Drying |
|---|---|---|
| Treating agent: | Pure water | Air |
| Temp.: | 50° C. | 80° C. |
| Pressure: | — | 5 kg · f/cm² |
| Treating time: | 3 min | 1 min |
| Others: | Ultrasonic treatment (28 kHz, 400 W) | |

TABLE 45

| Layer | Gas used, and flow rate (sccm) | | RF power (W) | Inner pressure (torr) | Substrate temp. (°C.) | Layer thickness (μm) |
|---|---|---|---|---|---|---|
| First photoconductive layer | $SiH_4$ | 500 | 500 | 0.6 | 250 | 17 |
| | $CH_4$ | 100 | | | | |
| | $B_2H_6/SiH_4$ | 1 ppm | | | | |
| Second photoconductive layer | $SiH_4$ | 500 | 500 | 0.5 | 250 | 3 |
| | $B_2H_6/SiH_4$ | 0.3 ppm | | | | |
| Surface layer | $SiH_4$ | 30 | 300 | 0.6 | 250 | 0.5 |
| | $CH_4$ | 500 | | | | |
| | $SiF_4$ | 10 | | | | |
| | $H_2$ | 100 | | | | |

TABLE 46

| Layer | Gas used, and flow rate (sccm) | | μW power (W) | Inner pressure (mtorr) | Substrate temp. (°C.) | Layer thickness (μm) |
|---|---|---|---|---|---|---|
| Photoconductive layer | $SiH_4$ | 500 | 1,000 | 4 | 250 | 20 |
| | $CH_4$ | 30 → 0* | | | | |
| | $B_2H_6/SiH_4$ | 20 → 0.2 ppm | | | | |
| | He | 500 | | | | |
| Surface layer | $SiH_4$ | 30 | 1,000 | 10 | 250 | 0.5 |
| | $CH_4$ | 500 | | | | |
| | $SiF_4$ | 10 | | | | |

TABLE 46-continued

| Layer | Gas used, and flow rate (sccm) | | μW power (W) | Inner pressure (mtorr) | Substrate temp. (°C.) | Layer thickness (μm) |
|---|---|---|---|---|---|---|
| | $H_2$ | 500 | | | | |
| | He | 2,000 | | | | |

*Varied so as for carbon content to be changed from 30 atomic % to 0 atomic %.

TABLE 47

| Layer | Gas used, and flow rate (sccm) | | μW power (W) | Inner pressure (mtorr) | Substrate temp. (°C.) | Layer thickness (uM) |
|---|---|---|---|---|---|---|
| Charge transport layer | $SiH_4$ | 500 | 1,000 | 5 | 250 | 17 |
| | $CH_4$ | 100 | | | | |
| | $B_2H_6/SiH_4$ | 10 ppm | | | | |
| | He | 500 | | | | |
| Charge generation layer | $SiH_4$ | 500 | 1,000 | 4 | 250 | 3 |
| | $B_2H_6/SiH_4$ | 0.2 ppm | | | | |
| | He | 500 | | | | |
| Surface layer | $SiH_4$ | 30 | 1,000 | 10 | 250 | 0.5 |
| | $CH_4$ | 500 | | | | |
| | $SiF_4$ | 10 | | | | |
| | $H_2$ | 1,000 | | | | |
| | He | 1,000 | | | | |

TABLE 48

| Layer | Gas used, and flow rate (sccm) | | RF power (W) | Inner pressure (torr) | Substrate temp. (°C.) | Layer thickness (μm) |
|---|---|---|---|---|---|---|
| Photoconductive layer | $SiH_4$ | 500 | 500 | 0.5 | 250 | 20 |
| | $CH_4$ | 30 → 0* | | | | |
| | $B_2H_6/SiH_4$ | 10 → 0 ppm | | | | |
| Surface layer | $SiH_4$ | 30 | 300 | 0.6 | 250 | 0.5 |
| | $CH_4$ | 500 | | | | |
| | $SiF_4$ | 10 | | | | |
| | $H_2$ | 100 | | | | |

*Varied so as for carbon content to be changed from 30 atomic % to 0 atomic %.

TABLE 49

| | Carbon distribution | Surface haze | Charge performance | Sensitivity | Residual potential | White dots | Halftone unevenness |
|---|---|---|---|---|---|---|---|
| Example | FIG. 18 | AA | AA | A | AA | AA | AA |
| FIG. 19 | AA | AA | A | AA | AA | AA | |
| Comparative | FIG. 20 | B | AA | B | B | A | B |
| Example 9 | FIG. 21 | B | AA | B | B | A | B |

TABLE 50

| Layer | Gas used, and flow rate (sccm) | | μW power (W) | Inner pressure (mtorr) | Substrate temp. (°C.) | Layer thickness (μm) |
|---|---|---|---|---|---|---|
| Photoconductive | $SiH_4$ | 500 | 1,000 | 4 | 250 | 20 |

TABLE 50-continued

| Layer | Gas used, and flow rate (sccm) | | µW power (W) | Inner pressure (mtorr) | Substrate temp. (°C.) | Layer thickness (µm) |
|---|---|---|---|---|---|---|
| layer | $CH_4$ | 30 → 0* | | | | |
| | $B_2H_6/SiH_4$ | 20 → 0.2 ppm | | | | |
| | He | 500 | | | | |
| Surface layer | $SiH_4$ | 30 | 1,000 | 8 | 250 | 0.5 |
| | $CH_4$ | 500 | | | | |
| | $SiF_4$ | 10 | | | | |
| | He | 1,000 | | | | |

*Varied so as for carbon content to be changed from 30 atomic % to 0 atomic %.

TABLE 51

| Carbon content (at.%) | Surface haze | Spherical protuberance | Charge performance | Sensitivity | Residual potential | White dots | Halftone unevenness | (1) |
|---|---|---|---|---|---|---|---|---|
| 70 | AA | AA | AA | B | B | AA | A | B |
| 60 | AA | AA | AA | B | B | AA | A | B |
| 50 | AA | AA | AA | A | A | AA | AA | A |
| 40 | AA | AA | A | A | A | AA | AA | A |
| 30 | AA | AA | AA | A | AA | AA | AA | AA |
| 20 | AA | AA | AA | A | AA | AA | AA | AA |
| 10 | AA | AA | AA | A | AA | AA | AA | AA |
| 5 | AA | AA | AA | A | AA | AA | AA | AA |
| 1 | AA | AA | AA | A | AA | AA | AA | AA |
| 0.5 | A | A | AA | A | AA | A | A | A |
| 0.3 | B | B | AA | A | AA | B | B | B |

(1): Overall evaluation

TABLE 52

| Layer | Gas used, and flow rate (sccm) | | RF power (W) | Inner pressure (torr) | Substrate temp. (°C.) | Layer thickness (µm) |
|---|---|---|---|---|---|---|
| Photoconductive layer | $SiH_4$ | 500 | 500 | 0.6 | 250 | 20 |
| | $CH_4$ | 30 → 0* | | | | |
| | $SiF_4$ | Varied | | | | |
| | $B_2H_6/SiH_4$ | 15 → 0.3 ppm | | | | |
| Surface layer | $SiH_4$ | 30 | 300 | 0.6 | 250 | 0.5 |
| | $CH_4$ | 500 | | | | |
| | $SiF_4$ | 10 | | | | |
| | $H_2$ | 100 | | | | |

*Varied so as for carbon content to be changed from 30 atomic % to 0 atomic %.

TABLE 53

(Performance before running)

| Fluorine content (at.ppm) | White dots | Halftone uneveness | Ghost | Overall evaluation |
|---|---|---|---|---|
| 0.1 | AA | AA | A | A |
| 0.5 | AA | AA | A | A |
| 1 | AA | AA | AA | AA |
| 5 | AA | AA | AA | AA |
| 10 | AA | AA | AA | AA |
| 20 | AA | AA | AA | AA |
| 40 | AA | AA | AA | AA |
| 80 | AA | AA | AA | AA |
| 95 | AA | AA | AA | AA |

TABLE 53-continued (Performance before running)

| Fluorine content (at.ppm) | White dots | Halftone uneveness | Ghost | Overall evaluation |
|---|---|---|---|---|
| 100 | AA | A | A | A |
| 200 | AA | A | B | B |
| 500 | AA | B | B | B |

TABLE 54

| Fluorine content (at.ppm) | (Performance after running) White dots | Halftone uneveness | Ghost | Overall evaluation |
|---|---|---|---|---|
| 0.1 | AA | A | B | B |
| 0.5 | AA | A | B | B |
| 1 | AA | AA | A | A |
| 5 | AA | AA | AA | AA |
| 10 | AA | AA | AA | AA |
| 20 | AA | AA | AA | AA |
| 40 | AA | AA | AA | AA |
| 80 | AA | AA | A | A |
| 95 | AA | AA | A | A |
| 100 | AA | A | B | B |
| 200 | AA | B | B | B |
| 500 | AA | B | C | C |

TABLE 55

| Layer | Gas used, and flow rate (sccm) | | μW power (W) | Inner pressure (mtorr) | Substrate temp. (°C.) | Layer thickness (μm) |
|---|---|---|---|---|---|---|
| Photoconductive layer | $SiH_4$ | 500 | 1,000 | 4 | 250 | 20 |
| | $CH_4$ | 30 → 0* | | | | |
| | $SiF_4$ | Varied | | | | |
| | He | 500 | | | | |
| Surface layer | $SiH_4$ | 30 | 1,000 | 8 | 250 | 0.5 |
| | $CH_4$ | 500 | | | | |

TABLE 55-continued

| Layer | Gas used, and flow rate (sccm) | | μW power (W) | Inner pressure (mtorr) | Substrate temp. (°C.) | Layer thickness (μm) |
|---|---|---|---|---|---|---|
| | $SiF_4$ | 10 | | | | |
| | He | 1,000 | | | | |

*Varied so as for carbon content to be changed from 30 atomic % to 0 atomic %.

TABLE 56

| Layer | Gas used, and flow rate (sccm) | | RF power (W) | Inner pressure (torr) | Substrate temp. (°C.) | Layer thickness (μm) |
|---|---|---|---|---|---|---|
| Photoconductive layer | $SiH_4$ | 500 | 500 | 0.6 | 250 | 20 |
| | $CH_4$ | 30 → 0* | | | | |
| Surface layer | $SiH_4$ | 30 | 300 | 0.6 | 250 | 0.5 |
| | $CH_4$ | 100 → 500 | | | | |
| | $SiF_4$ | 10 | | | | |
| | $H_2$ | 100 | | | | |

*Varied so as for carbon content to be changed from 30 atomic % to 0 atomic %.

TABLE 57

| Carbon content (at.%) | Charge performance | Residual potential | Image before running | Image after running | Overall evaluation |
|---|---|---|---|---|---|
| 20 | B | A | B | C | C |
| 30 | B | A | A | B | B |
| 40 | A | AA | AA | A | A |
| 50 | AA | AA | AA | AA | AA |
| 60 | AA | AA | AA | AA | AA |
| 70 | AA | AA | AA | AA | AA |
| 80 | AA | A | AA | AA | A |
| 90 | A | A | AA | AA | A |
| 95 | A | B | AA | AA | B |

TABLE 58

| Layer | Gas used, and flow rate (sccm) | | μW power (W) | Inner pressure (mtorr) | Substrate temp. (°C.) | Layer thickness (μm) |
|---|---|---|---|---|---|---|
| Photoconductive layer | $SiH_4$ | 500 | 1,000 | 4 | 250 | 20 |
| | $CH_4$ | 50 → 0 | | | | |
| | $B_2H_6/SiH_4$ | 40 → 0 ppm | | | | |
| | He | 500 | | | | |
| Surface layer | $SiH_4$ | 30 | 1,000 | 8 | 250 | 0.5 |
| | $CH_4$ | 60 → 500 | | | | |
| | $SiF_4$ | 10 | | | | |
| | $H_2$ | 100 | | | | |
| | He | 1,000 | | | | |

TABLE 59

| Layer | Gas used, and flow rate (sccm) | | RF power (W) | Inner pressure (torr) | Substrate temp. (°C.) | Layer thickness (μm) |
|---|---|---|---|---|---|---|
| Photoconductive layer | $SiH_4$ | 500 | 500 | 0.6 | 250 | 20 |
| | $CH_4$ | 30 → 0 | | | | |
| Surface layer | $SiH_4$ | 30 | 300 | 0.6 | 250 | 0.5 |
| | $CH_4$ | 500 | | | | |
| | $SiF_4$ | Varied | | | | |
| | $H_2$ | Varied | | | | |

TABLE 60

| | | | | | | | | | | | | | | | | | | | | |
|---|---|---|---|---|---|---|---|---|---|---|---|---|---|---|---|---|---|---|---|---|
| a) Hydrogen content: (at.%) | 11 | | | 12 | | | 30 | | | | 48 | | | | 61 | | | 70 | | 76 |
| b) Fluorine content: (at.%) | 0 | 18 | 24 | 0 | 15 | 23 | 0 | 9 | 18 | 23 | 0 | 11 | 19 | 23 | 0 | 8 | 12 | 0 | 4 | 0 |
| Total of a) & b): (at.%) | 11 | 29 | 35 | 21 | 36 | 44 | 30 | 39 | 48 | 53 | 48 | 59 | 67 | 71 | 61 | 69 | 73 | 70 | 74 | 76 |
| Sensitivity: | B | B | A | B | AA | A | A | AA | AA | A | A | AA | AA | B | A | AA | B | A | B | B |
| Residual potential: | B | B | B | B | AA | B | A | AA | AA | B | A | AA | AA | B | A | AA | B | A | A | B |
| Smeared image: | A | AA | AA | A | AA | AA | A | AA | AA | AA | A | AA | AA | AA | A | AA | AA | A | AA | A |
| Overall evaluation: | B | B | B | B | AA | B | A | AA | AA | B | A | AA | AA | B | A | AA | B | A | B | B |

TABLE 61

| Layer | Gas used, and flow rate (sccm) | | μW power (W) | Inner pressure (mtorr) | Substrate temp. (°C.) | Layer thickness (μm) |
|---|---|---|---|---|---|---|
| Photoconductive layer | $SiH_4$ | 500 | 1,000 | 4 | 250 | 20 |
| | $CH_4$ | 30 → 0* | | | | |
| | He | 500 | | | | |
| Surface layer | $SiH_4$ | 30 | 1,000 | 11 | 250 | 0.5 |
| | $CH_4$ | 500 | | | | |
| | $SiF_4$ | Varied | | | | |
| | $H_2$ | Varied | | | | |
| | He | Varied | | | | |

*Varied so as for carbon content to be changed from 30 atomic % to 0 atomic %.

TABLE 62

| Treatment conditions | Precleaning | Water treatment | Drying |
|---|---|---|---|
| Treating agent: | Water Surfactant (Sodium dodecanol sulfate) | Pure water (resistivity: 12 MΩ · cm) | Air |
| Temp.: | 45° C. | 25° C. | 80° C. |
| Pressure: | — | 50 kg · f/$cm^2$ | 5 kg · f/$cm^2$ |
| Treating time: | 3 min | 20 sec | 1 min |
| Others: | Ultrasonic treatment | | |

TABLE 62-continued

| Treatment conditions | Precleaning | Water treatment | Drying |
|---|---|---|---|
| | (28 kHz, 400 W) | | |

TABLE 63

| Layer | Gas used, and flow rate (sccm) | | μW power (W) | Inner pressure (mtorr) | Substrate temp. (°C.) | Layer thickness (μm) |
|---|---|---|---|---|---|---|
| Photoconductive layer | $SiH_4$ | 500 | 1,000 | 4 | 250 | 20 |
| | $CH_4$ | 30 → 0 | | | | |
| | $SiF_4$/$SiH_4$ | Varied | | | | |
| | He | 500 | | | | |
| Surface layer | $SiH_4$ | 30 | 1,000 | 8 | 250 | 0.5 |
| | $CH_4$ | 500 | | | | |
| | $SiF_4$ | 10 | | | | |
| | He | 1,000 | | | | |

TABLE 64

Figure 23:
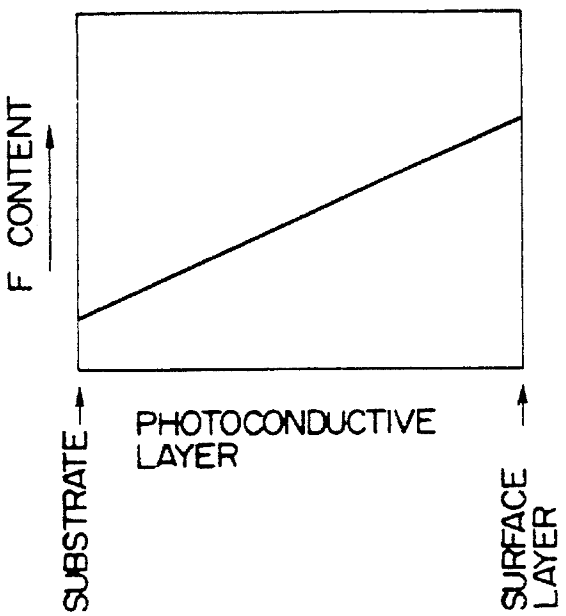
Figure 24:
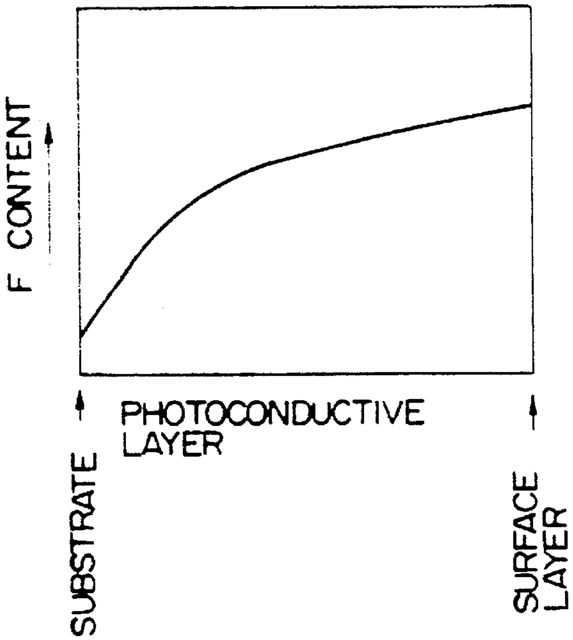
Figure 25:
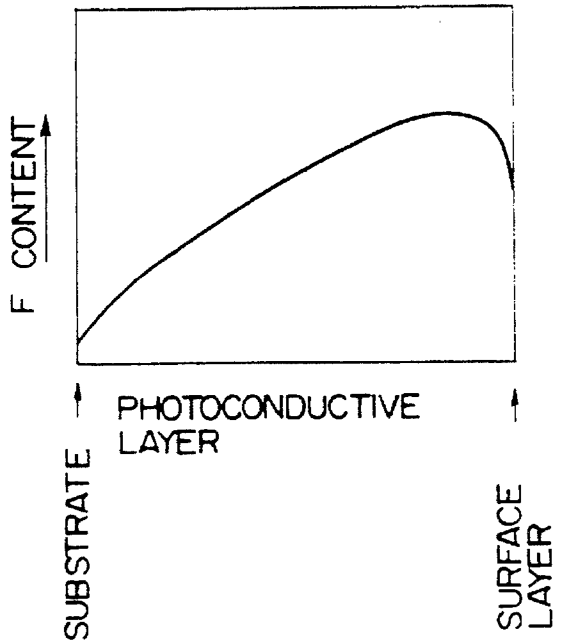

| Fluorine distribution | Surface haze | Charge performance | Sensitivity | Residual potential | White dots | Halftone unevenness | Ghost | (1) |
|---|---|---|---|---|---|---|---|---|
| FIG. 22 | AA | AA | A | AA | AA | AA | AA | A |
| FIG. 23 | AA | AA | A | AA | AA | AA | AA | AA |
| FIG. 24 | AA | AA | A | AA | AA | AA | AA | AA |
| FIG. 25 | AA | AA | A | AA | AA | AA | AA | AA |
| No fluorine: | AA | AA | A | AA | AA | AA | A | B |

(1): Temperature characteristics

TABLE 65

| Treatment conditions | Precleaning | Water treatment | Drying |
|---|---|---|---|
| Treating agent: | Water Surfactant (polyethylene glycol nonyl phenyl ether) | Pure water (resistivity: 17.5 MΩ · cm) | Air |
| Temp.: | 45° C. | 25° C. | 80° C. |
| Pressure: | — | 50 kg · f/$cm^2$ | 5 kg · f/$cm^2$ |
| Treating time: | 3 min | 20 sec | 1 min |
| Others: | Ultrasonic | | |

TABLE 65-continued

| Treatment conditions | Precleaning | Water treatment | Drying |
|---|---|---|---|
| | treatment (28 kHz, 400 W) | | |

TABLE 68-continued

| Treatment conditions | Cleaning | Drying |
|---|---|---|
| time: | | |
| Others: | Ultrasonic treatment | |

TABLE 66

| Layer | Gas used, and flow rate (sccm) | | RF power (W) | Inner pressure (torr) | Substrate temp. (°C.) | Layer thickness (μm) |
|---|---|---|---|---|---|---|
| First photoconductive | $SiH_4$ | 500 | 500 | 0.5 | 250 | 18 |
| | $CH_4$ | 30 → 0* | | | | |
| | $B_2H_6/SiH_4$ | 15 → 0.2 ppm | | | | |
| Second photoconductive layer | $SiH_4$ | 500 | 500 | 0.5 | 250 | 0.5 |
| | $B_2H_6/SiH_4$ | 0.2 ppm | | | | |
| Surface layer | $SiH_4$ | 30 | 300 | 0.4 | 250 | 0.5 |
| | $CH_4$ | 500 | | | | |
| | $SiF_4$ | 10 | | | | |
| | $H_2$ | 100 | | | | |

*Varied so as for carbon content to be changed from 30 atomic % to 0 atomic %.

TABLE 67

| | Surface haze | Charge performance | Uneven charge performance | Sensitivity | (1) | Residual potential | White dots | Halftone unevenness |
|---|---|---|---|---|---|---|---|---|
| Example 27 | AA | AA | AA | AA | AA | AA | AA | AA |
| Comparative Example 11 | B | AA | B | A | B | A | A | B |

(1) Uneven sensitivity

TABLE 68

| Treatment conditions | Cleaning | Drying |
|---|---|---|
| Treating agent: | Trichlroethane | Air |
| Temp.: | 50° C. | 80° C. |
| Pressure: | — | 5 kg · f/cm$^2$ |
| Treating | 3 min | 1 min |

TABLE 68-continued

| Treatment conditions | Cleaning | Drying |
|---|---|---|
| | (28 kHz, 400 W) | |

TABLE 69

| Layer | Gas used, and flow rate (sccm) | | RF power (W) | Inner pressure (torr) | Substrate temp. (°C.) | Layer thickness (μm) |
|---|---|---|---|---|---|---|
| Charge transport layer | $SiH_4$ | 500 | 500 | 0.6 | 250 | 17 |
| | $CH_4$ | 100 | | | | |
| | $B_2H_6/SiH_4$ | 10 ppm | | | | |
| Charge generation layer | $SiH_4$ | 500 | 500 | 0.5 | 250 | 3 |
| | $B_2H_6/SiH_4$ | 0.3 ppm | | | | |
| Surface layer | $SiH_4$ | 30 | 300 | 0.6 | 250 | 0.5 |
| | $CH_4$ | 500 | | | | |
| | $SiF_4$ | 10 | | | | |
| | $H_2$ | 100 | | | | |

TABLE 70

| Layer | Gas used, and flow rate (sccm) | | μF power (W) | Inner pressure (mtorr) | Substrate temp. (°C.) | Layer thickness (μm) |
|---|---|---|---|---|---|---|
| First photoconductive layer | $SiH_4$ | 500 | 1,000 | 4 | 250 | 18 |
| | $CH_4$ | 30 → 0* | | | | |
| | $B_2H_6/SiH_4$ | 20 → 1.2 ppm | | | | |
| | He | 500 | | | | |
| Second photoconductive layer | $SiH_4$ | 300 | 1,000 | 8 | 250 | 4 |
| | $B_2H_6/SiH_4$ | 1.2 ppm | | | | |
| | He | 2,000 | | | | |
| Surface layer | $SiH_4$ | 30 | 1,000 | 10 | 250 | 0.5 |
| | $CH_4$ | 500 | | | | |
| | $SiF_4$ | 10 | | | | |
| | $H_2$ | 500 | | | | |
| | He | 2,000 | | | | |

*Varied so as for carbon content to be changed from 30 atomic % to 0 atomic %.

TABLE 71

| Layer | Gas used, and flow rate (sccm) | | μF power (W) | Inner pressure (mtorr) | Substrate temp. (°C.) | Layer thickness (μm) |
|---|---|---|---|---|---|---|
| First transport layer | $SiH_4$ | 500 | 1,000 | 4 | 250 | 17 |
| | $CH_4$ | 100 | 1,000 | 5 | 250 | 17 |
| | $B_2H_6/SiH_4$ | 10 ppm | | | | |
| | He | 500 | | | | |
| Charge generation layer | $SiH_4$ | 500 | | | | |
| | $B_2H_6/SiH_4$ | 0.2 ppm | 1,000 | 4 | 250 | 3 |
| | He | 500 | | | | |
| Surface layer | $SiH_4$ | 30 | | | | |
| | $CH_4$ | 500 | 1,000 | 10 | 250 | 0.5 |
| | $SiF_4$ | 10 | | | | |
| | $H_2$ | 1,000 | | | | |
| | He | 1,000 | | | | |

TABLE 72

| Layer | Gas used, and flow rate (sccm) | | RF power (W) | Inner pressure (torr) | Substrate temp. (°C.) | Layer thickness (μm) |
|---|---|---|---|---|---|---|
| First photoconductive layer | $SiH_4$ | 500 | 500 | 0.6 | 250 | 18 |
| | $CH_4$ | 30 → 0* | | | | |
| | $B_2H_6/SiH_4$ | 10 → 0 ppm | | | | |
| Second photoconductive layer | $SiH_4$ | 500 | 500 | 0.5 | 250 | 5 |
| Surface layer | $SiH_4$ | 30 | | | | |
| | $CH_4$ | 500 | 300 | 0.6 | 250 | 0.5 |
| | $SiF_4$ | 10 | | | | |
| | $H_2$ | 100 | | | | |

*Varied so as for carbon content to be changed from 30 atomic % to 0 atomic %.

TABLE 73

| Carbon distribution | Surface haze | Charge performance | (1) | Sensitivity | (2) | Residual potential | White dots | Halftone unevenness |
|---|---|---|---|---|---|---|---|---|
| Example 29: | | | | | | | | |
| FIG. 27 | AA | AA | AA | AA | AA | AA | AA | AA |
| FIG. 28 | AA | AA | AA | AA | AA | AA | AA | AA |
| Comparative Example 13: | | | | | | | | |
| FIG. 29 | B | AA | B | B | B | B | A | B |
| FIG. 30 | B | AA | B | B | B | B | A | B |

(1) Uneven charge performance
(2) Uneven sensitivity

TABLE 74

| Layer | Gas used, and flow rate (sccm) | | µF power (W) | Inner pressure (mtorr) | Substrate temp. (°C.) | Layer thickness (µm) |
|---|---|---|---|---|---|---|
| First photoconductive layer | $SiH_4$ | 500 | 1,000 | 4 | 250 | 16 |
| | $CH_4$ | 30 → 0* | | | | |
| | $B_2H_6/SiH_4$ | 20 → 0.2 ppm | | | | |
| | 20→ 0.2 | ppm | | | | |
| | He | 500 | | | | |
| Second photoconductive layer | $SiH_4$ | 300 | 1,000 | 7 | 250 | 5 |
| | $B_2H_6/SiH_4$ | 0.15 ppm | | | | |
| | He | 1,500 | | | | |
| Surface layer | $SiH_4$ | 30 | | | | |
| | $CH_4$ | 500 | 1,000 | 8 | 250 | 0.5 |
| | $SiF_4$ | 10 | | | | |
| | He | 1,000 | | | | |

*Varied so as for carbon content to be changed from 30 atomic % to 0 atomic %.

TABLE 75

| Carbon content (at.%) | Surface haze | Spherical projection | Charge performance | Sensitivity | (1) | Residual potential | (2) | Halftone unevenness | (3) |
|---|---|---|---|---|---|---|---|---|---|
| 70 | AA | AA | AA | A | B | B | AA | A | B |
| 60 | AA | AA | AA | AA | A | B | AA | A | B |
| 50 | AA | AA | AA | AA | A | A | AA | AA | A |
| 40 | AA | AA | A | AA | A | A | AA | AA | A |
| 30 | AA | AA | AA | AA | AA | AA | AA | AA | AA |
| 20 | AA | AA | AA | AA | AA | AA | AA | AA | AA |
| 10 | AA | AA | AA | AA | AA | AA | AA | AA | AA |
| 5 | AA | AA | AA | AA | AA | AA | AA | AA | AA |
| 1 | AA | AA | AA | AA | AA | AA | AA | AA | AA |
| 0.5 | A | A | AA | AA | AA | AA | A | A | A |
| 0.3 | B | B | AA | AA | B | AA | B | B | B |

(1) Uneven sensitivity
(2) White dots
(3) Overall evaluation

TABLE 76

| Layer | Gas used, and flow rate (sccm) | | RF power (W) | Inner pressure (torr) | Substrate temp. (°C.) | Layer thickness (µm) |
|---|---|---|---|---|---|---|
| First photoconductive | $SiH_4$ | 500 | 500 | 0.6 | 250 | 20 |
| | $CH_4$ | 30 → 0* | | | | |

TABLE 76-continued

| Layer | Gas used, and flow rate (sccm) | | RF power (W) | Inner pressure (torr) | Substrate temp. (°C.) | Layer thickness (μm) |
|---|---|---|---|---|---|---|
| layer | $SiF_4$ | Varied | | | | |
| | $B_2H_6/SiH_4$ | 15 → 0.2 ppm | | | | |
| Second photoconductive layer | $SiH_4$ | 500 | 500 | 0.5 | 250 | 5 |
| | $B_2H_6/SiH_4$ | 0.2 ppm | | | | |
| Surface layer | $SiH_4$ | 30 300 | 0.6 | 250 | 0.5 | |
| | $CH_4$ | 500 | | | | |
| | $SiF_4$ | 10 | | | | |
| | $H_2$ | 100 | | | | |

*Varied so as for carbon content to be changed from 30 atomic % to 0 atomic %.

TABLE 77

| (Performance before running) | | | | |
|---|---|---|---|---|
| Fluorine content (at. ppm) | White dots | Halftone uneveness | Ghost | Overall evaluation |
| 0.1 | AA | AA | A | A |
| 0.5 | AA | AA | A | AA |
| 1 | AA | AA | AA | AA |
| 5 | AA | AA | AA | AA |
| 10 | AA | AA | AA | AA |
| 20 | AA | AA | AA | AA |
| 40 | AA | AA | AA | AA |
| 80 | AA | AA | AA | AA |
| 95 | AA | AA | AA | AA |
| 100 | AA | A | A | AA |
| 200 | AA | A | A | A |
| 500 | AA | B | B | A |

TABLE 78

| (Performance after running) | | | | |
|---|---|---|---|---|
| Fluorine content (at. ppm) | White dots | Halftone uneveness | Ghost | Overall evaluation |
| 0.1 | A | A | A | B |
| 0.5 | AA | A | A | A |
| 1 | AA | AA | AA | AA |
| 5 | AA | AA | AA | AA |
| 10 | AA | AA | AA | AA |
| 20 | AA | AA | AA | AA |
| 40 | AA | AA | AA | AA |
| 80 | AA | AA | AA | AA |
| 95 | AA | AA | AA | AA |
| 100 | AA | A | A | A |
| 200 | AA | B | B | B |
| 500 | AA | B | B | B |

TABLE 79

| Layer | Gas used, and flow rate (sccm) | | μW power (W) | Inner pressure (mtorr) | Substrate temp. (°C.) | Layer thickness (μm) |
|---|---|---|---|---|---|---|
| First photoconductive layer | $SiH_4$ | 500 | 1,000 | 4 | 250 | 20 |
| | $CH_4$ | 30 → 0* | | | | |
| | $SiF_4$ | Varied | | | | |
| | He | 500 | | | | |
| Second photoconduc- | $SiH_4$ | 300 | 1,000 | 7 | 250 | 3 |
| | He | 1,500 | | | | |

TABLE 79-continued

| Layer | Gas used, and flow rate (sccm) | | μW power (W) | Inner pressure (mtorr) | Substrate temp. (°C.) | Layer thickness (μm) |
|---|---|---|---|---|---|---|
| tive layer | | | | | | |
| Surface layer | $SiH_4$ | 30 | 1,000 | 8 | 250 | 0.5 |
| | $CH_4$ | 500 | | | | |
| | $SiF_4$ | 10 | | | | |
| | He | 1,000 | | | | |

*Varied so as for carbon content to be changed from 30 atomic % to 0 atomic %.

TABLE 80

| Layer | Gas used, and flow rate (sccm) | | μW power (W) | Inner pressure (torr) | Substrate temp. (°C.) | Layer thickness (μm) |
|---|---|---|---|---|---|---|
| First photoconductive layer | $SiH_4$ | 500 | 500 | 0.6 | 250 | 20 |
| | $CH_4$ | 30 → 0* | | | | |
| Second photoconductive layer | $SiH_4$ | 500 | 500 | 0.5 | 250 | 5 |
| Surface layer | $SiH_4$ | 30 | 300 | 0.6 | 250 | 0.5 |
| | $CH_4$ | 100 → 500 | | | | |
| | $SiF_4$ | 10 | | | | |
| | $H_2$ | 100 | | | | |

*Varied so as for carbon content to be changed from 30 atomic % to 0 atomic %.

TABLE 81

| Carbon content (at.%) | Charge performance | Uneven charge performance | Residual potential | Image before running | Image after running | Overall evaluation |
|---|---|---|---|---|---|---|
| 20 | B | AA | A | B | C | C |
| 30 | B | AA | A | A | B | B |
| 40 | A | A | AA | AA | A | A |
| 50 | AA | AA | AA | AA | AA | AA |
| 60 | AA | AA | AA | AA | AA | AA |
| 70 | AA | AA | AA | AA | AA | AA |
| 80 | AA | AA | A | AA | AA | A |
| 90 | A | A | A | AA | AA | A |
| 95 | A | A | B | AA | AA | B |

TABLE 82

| Layer | Gas used, and flow rate (sccm) | | μW power (W) | Inner pressure (mtorr) | Substrate temp. (°C.) | Layer thickness (μm) |
|---|---|---|---|---|---|---|
| First photoconductive layer | $SiH_4$ | 500 | 1,000 | 4 | 250 | 20 |
| | $CH_4$ | 30 → 0 | | | | |
| | He | 500 | | | | |
| Second photoconductive layer | $SiH_4$ | 300 | 1,000 | 7 | 250 | 3 |
| | He | 1,500 | | | | |
| Surface layer | $SiH_4$ | 30 | 1,000 | 8 | 250 | 0.5 |
| | $CH_4$ | 60 → 500 | | | | |
| | $SiF_4$ | 10 | | | | |
| | $H_2$ | 100 | | | | |
| | He | 1,000 | | | | |

TABLE 83

| Layer | Gas used, and flow rate (sccm) | | RF power (W) | Inner pressure (torr) | Substrate temp. (°C.) | Layer thickness, (μm) |
|---|---|---|---|---|---|---|
| First photoconductive layer | $SiH_4$ | 500 | 500 | 0.6 | 250 | 17 |
| | $CH_4$ | 50 → 0 | | | | |
| | $B_2H_6/SiH_4$ | 40 → 0.1 ppm | | | | |
| Second photoconductive layer | $SiH_4$ | 500 | 500 | 0.5 | 250 | 5 |
| | $B_2H_6/SiH_4$ | 0.1 ppm | | | | |
| Surface layer | $SiH_4$ | 30 300 | 0.6 | 250 | 0.5 | |
| | $CH_4$ | 500 | | | | |
| | $SiF_4$ | Varied | | | | |
| | $H_2$ | Varied | | | | |

TABLE 84

| | | | | | | | | | | | | | | | | | | | | |
|---|---|---|---|---|---|---|---|---|---|---|---|---|---|---|---|---|---|---|---|---|
| a) Hydrogen content: (at.%) | 11 | | | 21 | | | 30 | | | | 48 | | | | 61 | | | 70 | | 76 |
| b) Fluorine content: (at.%) | 0 | 18 | 24 | 0 | 15 | 23 | 0 | 9 | 18 | 23 | 0 | 11 | 19 | 23 | 0 | 8 | 12 | 0 | 4 | 0 |
| Total of a) & b): (at.%) | 11 | 29 | 35 | 21 | 36 | 44 | 30 | 39 | 48 | 53 | 48 | 59 | 67 | 71 | 61 | 69 | 73 | 70 | 74 | 76 |
| Sensitivity: | B | B | A | B | AA | A | A | AA | AA | A | A | AA | AA | B | A | AA | B | A | B | B |

TABLE 84-continued

| | | | | | | | | | | | | | | | | | | | | |
|---|---|---|---|---|---|---|---|---|---|---|---|---|---|---|---|---|---|---|---|---|
| Uneven sensitivity: | A | B | A | B | AA | B | AA | AA | AA | A | A | AA | AA | B | A | AA | B | AA | B | B |
| Residual potential: | B | B | B | B | AA | B | A | AA | AA | B | A | AA | AA | B | A | AA | B | A | A | A |
| Smeared image: | A | AA | AA | A | AA | AA | A | AA | AA | AA | A | AA | AA | AA | A | AA | AA | A | AA | A |
| Overall evaluation: | B | B | B | B | AA | B | A | AA | AA | B | A | AA | AA | B | A | AA | B | A | B | B |

TABLE 85

| Layer | Gas used, and flow rate (sccm) | | μW power (W) | Inner pressure (mtorr) | Substrate temp. (°C.) | Layer thickness, (μm) |
|---|---|---|---|---|---|---|
| First photoconductive layer | $SiH_4$ | 500 | 1,000 | 4 | 250 | 20 |
| | $CH_4$ | 30 → 0* | | | | |
| | He | 500 | | | | |
| Second photoconductive | $SiH_4$ | 300 | 1,000 | 7 | 250 | 3 |
| | He | 1,500 | | | | |
| Surface layer | $SiH_4$ | 30 | 1,000 | 11 | 250 | 0.5 |
| | $CH_4$ | 500 | | | | |
| | $SiF_4$ | Varied | | | | |
| | $H_2$ | Varied | | | | |
| | He | Varied | | | | |

*Varied so as for carbon content to be changed from 30 atomic % to 0 atomic %.

TABLE 87

| Layer | Gas used, and flow rate (sccm) | | μW power (W) | Inner pressure (mtorr) | Substrate temp. (°C.) | Layer thickness (μm) |
|---|---|---|---|---|---|---|
| First photoconductive layer | $SiH_4$ | 500 | 1,000 | 4 | 250 | 20 |
| | $CH_4$ | 30 → 0 | | | | |
| | $SiF_4/SiH_4$ | Varied | | | | |
| | He | 500 | | | | |
| Second photoconductive | $SiH_4$ | 300 | 1,000 | 7 | 250 | 3 |
| | He | 1,500 | | | | |
| Surface layer | $SiH_4$ | 30 | | | | |
| | $CH_4$ | 500 | 1,000 | 8 | 250 | 0.5 |
| | $SiF_4$ | 10 | | | | |
| | He | 1,000 | | | | |

TABLE 88

Figure 31:
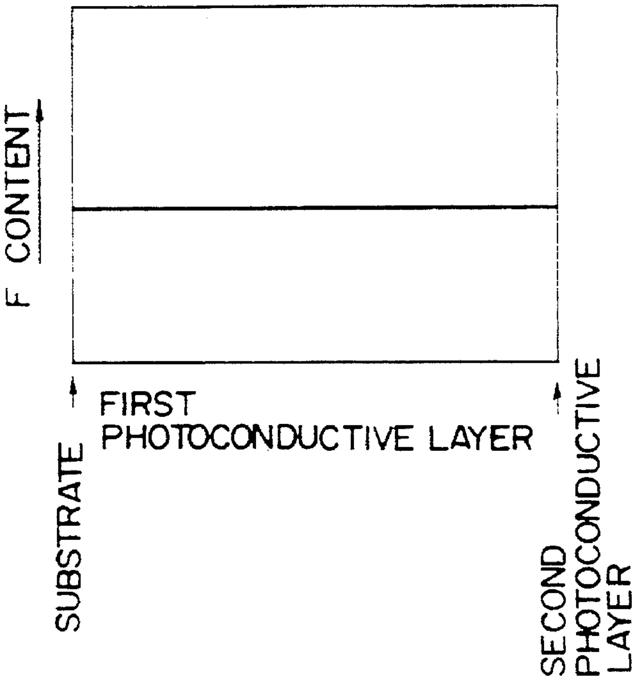
FIGS. 31 to 34 are each a graph to show a pattern of changes in fluorine content in a photoconductive layer according to an example of the present invention.
Figure 32:
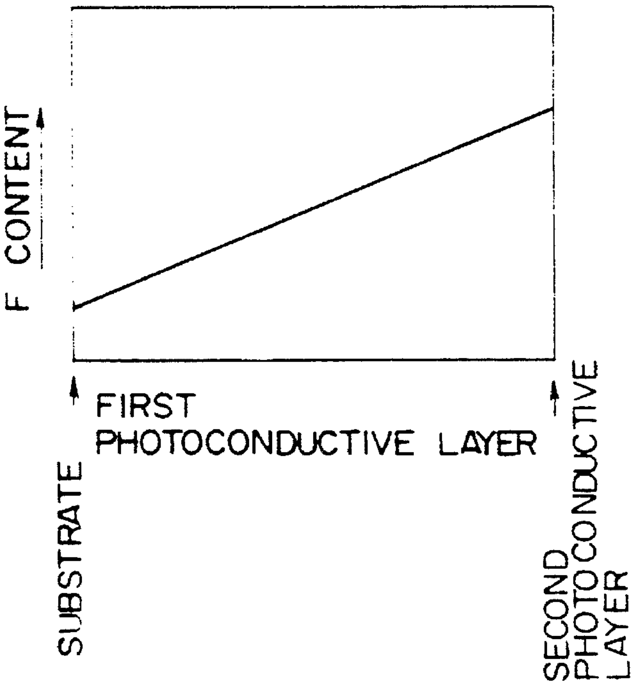
Figure 33:
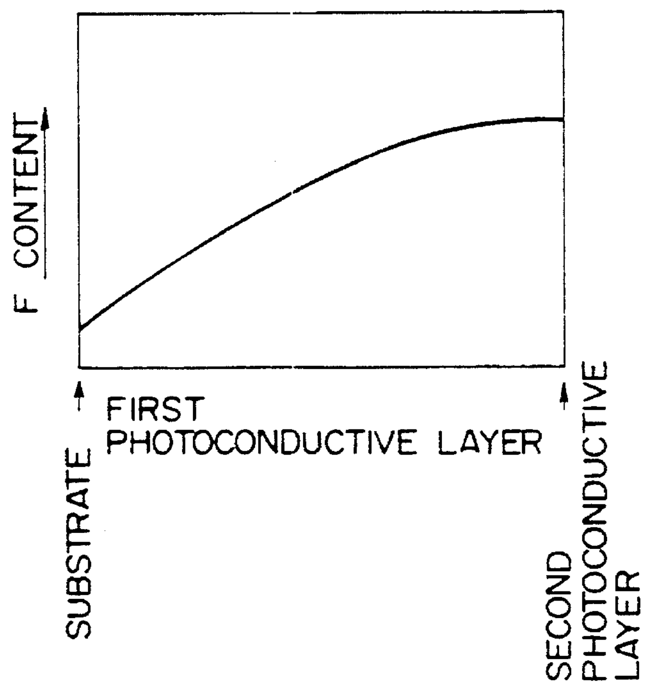
Figure 34:
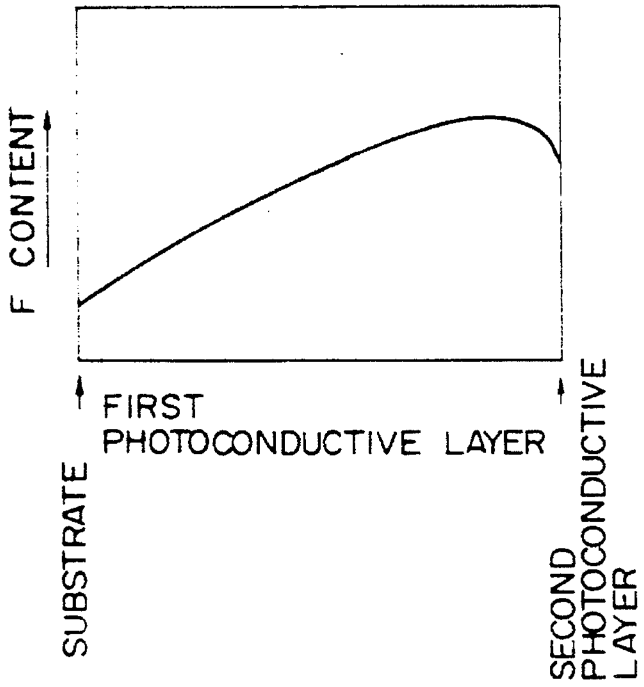

| Fluorine distribution (at.%) | Surface haze | Charge performance | Sensitivity | (1) | Residual potential | (2) | Halftone unevenness | Ghost | (3) |
|---|---|---|---|---|---|---|---|---|---|
| FIG. 31 | AA | AA | AA | AA | AA | AA | AA | AA | A |
| FIG. 32 | AA | AA | AA | AA | AA | AA | AA | AA | AA |
| FIG. 33 | AA | AA | AA | AA | AA | AA | AA | AA | AA |
| FIG. 34 | AA | AA | AA | AA | AA | AA | AA | AA | AA |
| None | AA | AA | AA | AA | AA | AA | AA | A | B |

(1): Uneven sensitivity
(2): White dots
(3): Temperature characteristics

TABLE 86

| Treatment conditions | Precleaning | Water treatment | Drying |
|---|---|---|---|
| Treating agent: | Water Surfactant (sodium dodecanol sulfate) | Pure water (resistivity: 12 MΩ · cm) | Air |
| Temp.: | 45° C. | 25° C. | 80° C. |
| Pressure: | — | 50 kg · f/cm² | 5 kg · f/cm² |
| Treating time: | 3 min | 20 sec | 1 min |
| Others: | Ultrasonic treatment (28 kHz, 400 W) | | |

What is claimed is:

1. A method of manufacturing an electrophotographic photosensitive member having a substrate provided thereon with at least a photoconductive layer, by a process comprising the steps of:

(a) cutting the surface of said substrate;

(b) cleaning the cut substrate with water;

(c) in 30 minutes or less after said water- cleaning step, bringing the water-cleaned substrate into contact with an alcohol medium, said alcohol medium at a temperature from 10° C. to 50° C. and said alcohol medium contact step conducted over a period from 10 seconds to 10 minutes; and (d) forming said photoconductive layer on the substrate having been contacted with said alcohol medium.

2. The method according to claim 1, wherein said alcohol medium is selected from the group consisting of methyl alcohol, ethyl alcohol, propyl alcohol and isopropyl alcohol.

3. The method according to claim 1, wherein said alcohol is of second grade or higher.

4. The method according to claim 1, wherein in said step of cutting the substrate surface an oxide film present on the substrate surface is removed.

5. The method according to claim 1, wherein said alcohol medium contact step is carried out after the substrate is rinsed with pure water after said water cleaning step.

6. The method according to claim 1, wherein an ultrasonic wave is used in said water cleaning step.

7. The method according to claim 1, wherein said photoconductive layer comprises a non-monocrystalline material containing at least a silicon atom.

8. The method according to claim 1, wherein said process further comprises the step of forming a surface layer on said photoconductive layer.

9. The method according to claim 8, wherein said surface layer comprises a non-monocrystalline material containing at least a silicon atom.

10. The method according to claim 1, wherein at least one of an infrared absorbing layer and/or a charge injection blocking layer is formed on the substrate having been subjected to said water-contact step, followed by said step of forming said photoconductive layer.

11. The method according to claim 10, wherein at least one of said infrared absorbing layer and/or said charge injection blocking layer comprises a non-monocrystalline material containing a silicon atom.

12. The method according to claim 11, wherein said infrared absorbing layer further contains a germanium atom.

13. The method according to claim 11, wherein said charge injection blocking layer further contains a Group III atom or a Group V atom of the periodic table.

14. The method according to claim 9, wherein said surface layer further contains a carbon atom.

15. A method of treating a substrate for an electrophotographic photosensitive member by a process comprising the steps of:

(a) cutting the surface of said substrate;

(b) cleaning the cut substrate with water; and (c) in 30 minutes or less after said water-cleaning step, bringing the water-cleaned substrate into contact with an alcohol medium, said alcohol medium at a temperature from 10° C. to 50° C. and said alcohol medium contact step conducted over a period from 10 seconds to 10 minutes.

16. The method according to claim 15, wherein said alcohol medium is selected from the group consisting of methyl alcohol, ethyl alcohol, propyl alcohol and isopropyl alcohol.

17. The method according to claim 15, wherein said alcohol is of second grade or higher.

18. The method according to claim 15, wherein in said step of cutting the substrate surface an oxide film present on the substrate surface is removed.

19. The method according to claim 15, wherein said alcohol medium contact step is carried out after the substrate is rinsed with pure water after said water cleaning step.

20. The method according to claim 15, wherein an ultrasonic wave is used in said water cleaning step.

* * * * *

UNITED STATES PATENT AND TRADEMARK OFFICE

CERTIFICATE OF CORRECTION

PATENT NO. : 5,480,627

DATED : January 2, 1996

INVENTOR(S) : TAKEI ET AL.

It is certified that error appears in the above-identified patent and that said Letters Patent is hereby corrected as shown below:

Item

[57] Abstract, column 2, line 2,
"steps:" should read --steps of:--.

COLUMN 2

Line 2, "the" should be deleted.
Line 22, "Technique" should read --technique--.
Line 36, "can not" should read --cannot--.
Line 37, "can not" should read --cannot--.

COLUMN 3

Line 21, "degreesing action)" should read --degreasing action).--.

COLUMN 4

Line 44, "en" should read --an--.

COLUMN 5

Line 17, "to" should be deleted.

COLUMN 8

Line 27, "environmental." should read "environment.--.

COLUMN 13

Line 56, "dying" should read --drying--.

COLUMN 15

Line 5, "can not be of no" should read --cannot be of any--.
Line 59, "pure-water" should read --pure water--.

UNITED STATES PATENT AND TRADEMARK OFFICE
CERTIFICATE OF CORRECTION

PATENT NO. : 5,480,627

DATED : January 2, 1996

INVENTOR(S) : TAKEI ET AL.

It is certified that error appears in the above-identified patent and that said Letters Patent is hereby corrected as shown below:

COLUMN 16

Line 47, "100 liter/minute" should read --100 liters/minute--.

Line 48, "50 liter/minute" should read --50 liters/minute--.

COLUMN 17

Line 10, "can not" should read --cannot--.

Line 16, "the" (third occurrence) should be deleted.

Line 19, "can not" should read --cannot--.

Line 22, "hours" should read --hours,--.

COLUMN 18

Line 11, "has" should read --have--.

Line 41, "that" (second occurrence) should be deleted.

Line 50, "mixed" should read --mixed with--.

COLUMN 21

Line 18, "(MG)," should read --(Mg),--.

COLUMN 23

Line 6, "ends" should read --end--.

COLUMN 32

Line 54, "$\kappa$-type" should read --$\pi$-type--.

COLUMN 33

Line 12, "recongnizable" should read --recognizable--.

Line 15, "from" should read --from the--.

Line 32, "from" should read --from the--.

COLUMN 40

Line 26, "period" should read --period of--.

UNITED STATES PATENT AND TRADEMARK OFFICE

CERTIFICATE OF CORRECTION

PATENT NO. : 5,480,627

DATED : January 2, 1996

INVENTOR(S) : TAKEI ET AL.

It is certified that error appears in the above-identified patent and that said Letters Patent is hereby corrected as shown below:

COLUMN 46

Line 40, "Thereafter" should read --Thereafter,--.

Line 47, "items;" should read --items,--.

COLUMN 47

Line 34, "preciously" should read --previously--.

Line 49, "items," should read --item,--.

COLUMN 48

Line 57, "potential" should read --Potential--.

COLUMN 49

Line 40, "manufacture" should read --manufactured--.

COLUMN 51

Line 33, "Thereafter" should read --Thereafter,--.

COLUMN 52

Line 13, "potential The" should read --potential ¶ The--.

Line 34, "Inc" should read --Inc.--.

COLUMN 55

Line 28, "100 $cm^2$" should read --100 $cm^2$.--.

COLUMN 56

Line 34, "evaluation." should read --evaluated.--.

COLUMN 57

Line 19, "manufacture" should read --manufactured--.

COLUMN 59

Line 4, "FIG. photosensitive" should read --FIG. 31, 32, 33 or 34. Thus 4 kinds of electrophotographic photosensitive--.

UNITED STATES PATENT AND TRADEMARK OFFICE
CERTIFICATE OF CORRECTION

PATENT NO. : 5,480,627

DATED : January 2, 1996

INVENTOR(S) : TAKEI ET AL.

It is certified that error appears in the above-identified patent and that said Letters Patent is hereby corrected as shown below:

COLUMN 64

Table 13, "Water Precleaning treatment" should read --Water Precleaning treatment--.

COLUMN 65

Table 14, "Water Precleaning treatment" should read --Water Precleaning treatment--.

COLUMN 66

Table 21, "Temperature (°C.) Uneven image Peel-off" should read --Temperature (°C.) Uneven image Peel-off--.

COLUMN 67

Table 21, "Temperature (°C.) Uneven image Peel-off" should read --Temperature (°C.) Uneven image Peel-off--.

COLUMN 76

Table 49, "Example FIG. 18 AA AA A AA AA AA FIG. 19 AA AA A AA AA AA" should read --"Example 16 FIG. 18 AA AA A AA AA AA FIG. 19 AA AA A AA AA AA"--.

UNITED STATES PATENT AND TRADEMARK OFFICE
CERTIFICATE OF CORRECTION

PATENT NO. : 5,480,627

DATED : January 2, 1996

INVENTOR(S) : TAKEI ET AL.

It is certified that error appears in the above-identified patent and that said Letters Patent is hereby corrected as shown below:

COLUMN 77

Table 50, "30 1,000 8 250 0.5" should read --30 1,000 8 250 0.5--.

COLUMN 79

Table 54, "uneveness" should read --unevenness--.

COLUMN 84

Line 68, "(28 kHz, 400 W)" should read

--Others Ultrasonic treatment (28k Hz, 400W)

COLUMN 85

Table 70, "$\mu$F" should read --RF--.

Table 71, "$\mu$F" should read --uW--.

Table 71, "$SiH_4$ 500 1,000 4 250 17" should read --$SiH_4$ 500--. (Delete other figures)

COLUMN 87

Table 74, "$\mu$F" should read --uW--.

COLUMN 89

Table 76, "30 300 0.6 250 0.5" should read --30 300 0.6 250 0.5--.

Table 77, "uneveness" should read --unevenness--.

Table 78, "uneveness" should read --unevenness--.

UNITED STATES PATENT AND TRADEMARK OFFICE

CERTIFICATE OF CORRECTION

PATENT NO. : 5,480,627

DATED : January 2, 1996

INVENTOR(S) : TAKEI ET AL.

It is certified that error appears in the above-identified patent and that said Letters Patent is hereby corrected as shown below:

COLUMN 91

Table 82, "$SiH_4$ 500 1,000 4 250 20
$CH_4$ 30 → 0"
should read
--$SiH_4$ 500
$CH_4$ 30 → 0 1,000 4 250 20--.

Table 82, "$SiH_4$ 30 1,000 8 250 0.5
$CH_4$ 60 → 500"
should read
--$SiH_4$ 30
$CH_4$ 60 → 500 1,000 8 250 0.5--.

Table 83, "$SiH_4$ 30 300 0.6 250 0.5
$CH_4$ 500"
should read
--$SiH_4$ 30
$CH_4$ 500 300 0.6 250 0.5--.

Signed and Sealed this

Ninth Day of July, 1996

Attest:

BRUCE LEHMAN

Attesting Officer

Commissioner of Patents and Trademarks